United States Patent
Takahashi et al.

(10) Patent No.: US 11,644,918 B2
(45) Date of Patent: May 9, 2023

(54) DISPLAY DEVICE AND INPUT/OUTPUT DEVICE

(71) Applicant: SEMICONDUCTOR ENERGY LABORATORY CO., LTD., Atsugi (JP)

(72) Inventors: Kei Takahashi, Kanagawa (JP); Hiroyuki Miyake, Kanagawa (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 0 days.

(21) Appl. No.: 17/717,304

(22) Filed: Apr. 11, 2022

(65) Prior Publication Data
US 2022/0236824 A1    Jul. 28, 2022

Related U.S. Application Data

(63) Continuation of application No. 16/720,040, filed on Dec. 19, 2019, now Pat. No. 11,307,687, which is a (Continued)

(30) Foreign Application Priority Data

May 2, 2014 (JP) .................... 2014-095294
Dec. 1, 2014 (JP) .................... 2014-242782

(51) Int. Cl.
*G06F 3/041* (2006.01)
*G09G 3/3233* (2016.01)

(52) U.S. Cl.
CPC ............ *G06F 3/0412* (2013.01); *G06F 3/041* (2013.01); *G06F 3/04166* (2019.05);
(Continued)

(58) Field of Classification Search
None
See application file for complete search history.

(56) References Cited

U.S. PATENT DOCUMENTS

| | | | |
|---|---|---|---|
| 4,465,370 | A | 8/1984 | Yuasa et al. |
| 5,847,690 | A | 12/1998 | Boie et al. |

(Continued)

FOREIGN PATENT DOCUMENTS

| | | | |
|---|---|---|---|
| EP | 2259172 | A | 12/2010 |
| EP | 2330491 | A | 6/2011 |

(Continued)

OTHER PUBLICATIONS

Hamaguchi.M et al., "A 240Hz-Reporting-Rate 143×81 Mutual-Capacitance Touch-Sensing Analog Front-End IC With 37dB SNR for 1mm-Diameter Stylus", ISSCC 2014 (Digest of Technical Papers. IEEE International Solid-State Circuits Conference), Feb. 11, 2014, pp. 214-216.

(Continued)

*Primary Examiner* — Krishna P Neupane
(74) *Attorney, Agent, or Firm* — Nixon Peabody LLP; Jeffrey L. Costellia

(57) ABSTRACT

A circuit which detects an output current from a pixel and an output current from an input device, and converts the output current into data is provided. The current detection circuit includes an integer circuit, a comparator, a counter, and a latch. The integrator circuit integrates the potential of a first signal during a period determined by a second signal and outputting it as a third signal. The comparator compares the potential of the third signal with a first potential and outputting a fourth signal. The counter outputs the number of pulses included in a fifth signal as a sixth signal during a period determined by the fourth signal. The latch holds the sixth signal. The integrator circuit preferably further includes an operational amplifier and some capacitors. The (Continued)

first signal is supplied from a pixel included in a display device or an input portion included in an input device.

4 Claims, 28 Drawing Sheets

Related U.S. Application Data continuation of application No. 14/695,737, filed on Apr. 24, 2015, now Pat. No. 10,521,032.

(52) U.S. Cl.
CPC . *G09G 3/3233* (2013.01); *G06F 2203/04102* (2013.01); *G09G 2300/0842* (2013.01); *G09G 2300/0876* (2013.01); *G09G 2310/02* (2013.01); *G09G 2320/0295* (2013.01); *G09G 2320/043* (2013.01); *G09G 2380/02* (2013.01)

(56) References Cited

U.S. PATENT DOCUMENTS

| | | | |
|---|---|---|---|
| 6,392,617 B1 | 5/2002 | Gleason | |
| 6,791,129 B2 | 9/2004 | Inukai | |
| 6,809,482 B2 | 10/2004 | Koyama | |
| 7,141,934 B2 | 11/2006 | Osame et al. | |
| 7,173,586 B2 | 2/2007 | Osame et al. | |
| 7,423,639 B2 | 9/2008 | Min | |
| 7,525,165 B2 | 4/2009 | Yamazaki et al. | |
| 7,601,984 B2 | 10/2009 | Sano et al. | |
| 7,714,268 B2 | 5/2010 | Leijssen et al. | |
| 7,868,867 B2 | 1/2011 | Lee et al. | |
| 7,952,565 B2 | 5/2011 | Park et al. | |
| 8,242,986 B2 | 8/2012 | Kimura | |
| 8,243,027 B2 | 8/2012 | Hotelling et al. | |
| 8,259,078 B2 | 9/2012 | Hotelling et al. | |
| 8,367,440 B2 | 2/2013 | Takayama et al. | |
| 8,384,076 B2 | 2/2013 | Park et al. | |
| 8,411,045 B2 | 4/2013 | Futter | |
| 8,415,208 B2 | 4/2013 | Takayama et al. | |
| 8,432,371 B2 | 4/2013 | Hotelling et al. | |
| 8,441,459 B2 | 5/2013 | Chen et al. | |
| 8,451,244 B2 | 5/2013 | Hotelling et al. | |
| 8,552,989 B2 | 10/2013 | Hotelling et al. | |
| 8,610,155 B2 | 12/2013 | Hatano et al. | |
| 8,654,083 B2 | 2/2014 | Hotelling et al. | |
| 8,723,835 B2 | 5/2014 | Chiu et al. | |
| 8,736,162 B2 | 5/2014 | Jin et al. | |
| 8,803,791 B2 | 8/2014 | Sugita et al. | |
| 8,859,304 B2 | 10/2014 | Momma et al. | |
| 9,244,561 B2 | 1/2016 | Hotelling et al. | |
| 9,268,429 B2 | 2/2016 | Hotelling et al. | |
| 9,356,049 B2 | 5/2016 | Ikeda et al. | |
| 9,575,610 B2 | 2/2017 | Hotelling et al. | |
| 9,719,665 B2 | 8/2017 | Hirakata et al. | |
| 9,779,653 B2 | 10/2017 | Ikeda et al. | |
| 9,805,659 B2 | 10/2017 | Ikeda et al. | |
| 10,191,576 B2 | 1/2019 | Hotelling et al. | |
| 10,521,032 B2 | 12/2019 | Takahashi et al. | |
| 11,074,025 B2 | 7/2021 | Hirakata | |
| 2002/0175617 A1* | 11/2002 | Lee | B82Y 10/00 |
| | | | 445/24 |
| 2005/0140607 A1 | 6/2005 | Sato et al. | |
| 2007/0093007 A1 | 4/2007 | Deane | |
| 2007/0097014 A1 | 5/2007 | Solomon et al. | |
| 2007/0285365 A1 | 12/2007 | Lee | |
| 2008/0167526 A1 | 7/2008 | Crank et al. | |
| 2009/0026350 A1 | 1/2009 | Leijssen et al. | |
| 2009/0108892 A1 | 4/2009 | Chen et al. | |
| 2009/0179199 A1 | 7/2009 | Sano et al. | |
| 2010/0156881 A1 | 6/2010 | Kohno et al. | |
| 2010/0163874 A1 | 7/2010 | Koyama et al. | |
| 2011/0007042 A1* | 1/2011 | Miyaguchi | G02F 1/133305 |
| | | | 345/204 |
| 2011/0148847 A1* | 6/2011 | Ikeda | G09G 3/3233 |
| | | | 345/212 |
| 2011/0267293 A1 | 11/2011 | Noguchi et al. | |
| 2011/0285679 A1 | 11/2011 | Oh et al. | |
| 2012/0075240 A1 | 3/2012 | Kida et al. | |
| 2012/0104233 A1 | 5/2012 | Mori et al. | |
| 2012/0169798 A1* | 7/2012 | Ebisuno | G09G 3/325 |
| | | | 345/77 |
| 2012/0217516 A1 | 8/2012 | Hatano et al. | |
| 2012/0256869 A1 | 10/2012 | Walsh et al. | |
| 2013/0181947 A1 | 7/2013 | Kwon et al. | |
| 2013/0201173 A1 | 8/2013 | Chaji et al. | |
| 2013/0214324 A1 | 8/2013 | Takayama et al. | |
| 2013/0277672 A1 | 10/2013 | Sano et al. | |
| 2014/0015772 A1 | 1/2014 | Tung et al. | |
| 2014/0021966 A1 | 1/2014 | Shahrokhi et al. | |
| 2014/0028534 A1 | 1/2014 | Park et al. | |
| 2014/0034954 A1 | 2/2014 | Yamazaki et al. | |
| 2014/0042432 A1 | 2/2014 | Yamazaki | |
| 2014/0043546 A1 | 2/2014 | Yamazaki et al. | |
| 2014/0063368 A1 | 3/2014 | Yamazaki et al. | |
| 2014/0098040 A1 | 4/2014 | Kwon et al. | |
| 2014/0152642 A1 | 6/2014 | Kim et al. | |
| 2014/0357019 A1 | 12/2014 | Koyama et al. | |
| 2015/0022561 A1* | 1/2015 | Ikeda | G09G 3/20 |
| | | | 345/77 |
| 2015/0121520 A1 | 4/2015 | Tsien et al. | |
| 2015/0242049 A1 | 8/2015 | Tsukahara et al. | |
| 2015/0301415 A1 | 10/2015 | Sawada et al. | |
| 2019/0146623 A1 | 5/2019 | Hotelling et al. | |
| 2019/0196634 A1 | 6/2019 | Hotelling et al. | |
| 2021/0263619 A1 | 8/2021 | Hirakata | |

FOREIGN PATENT DOCUMENTS

| | | |
|---|---|---|
| EP | 2330492 A | 6/2011 |
| EP | 2330493 A | 6/2011 |
| EP | 2330494 A | 6/2011 |
| EP | 3264240 A | 1/2018 |
| JP | 56-114769 A | 9/1981 |
| JP | 57-014726 A | 1/1982 |
| JP | 63-123227 A | 5/1988 |
| JP | 06-152422 A | 5/1994 |
| JP | 2004-145197 A | 5/2004 |
| JP | 2006-133786 A | 5/2006 |
| JP | 2007-226248 A | 9/2007 |
| JP | 2007-304342 A | 11/2007 |
| JP | 2007-334358 A | 12/2007 |
| JP | 2009-508102 | 2/2009 |
| JP | 2009-168508 A | 7/2009 |
| JP | 2009-265459 A | 11/2009 |
| JP | 2009-540374 | 11/2009 |
| JP | 2011-015365 A | 1/2011 |
| JP | 2012-022329 A | 2/2012 |
| JP | 2012-234475 A | 11/2012 |
| JP | 2013-140373 A | 7/2013 |
| JP | 2013-205325 A | 10/2013 |
| JP | 2013-214327 A | 10/2013 |
| JP | 2014-063484 A | 4/2014 |
| JP | 2016-109660 A | 6/2016 |
| WO | WO-2007/029191 | 3/2007 |
| WO | WO-2007/146779 | 12/2007 |
| WO | WO-2007/146780 | 12/2007 |
| WO | WO-2007/146783 | 12/2007 |
| WO | WO-2007/146785 | 12/2007 |
| WO | WO-2015/166376 | 11/2015 |

OTHER PUBLICATIONS

International Search Report (Application No. PCT/IB2015/052896) dated Aug. 18, 2015.

Written Opinion (Application No. PCT/IB2015/052896) dated Aug. 18, 2015.

* cited by examiner

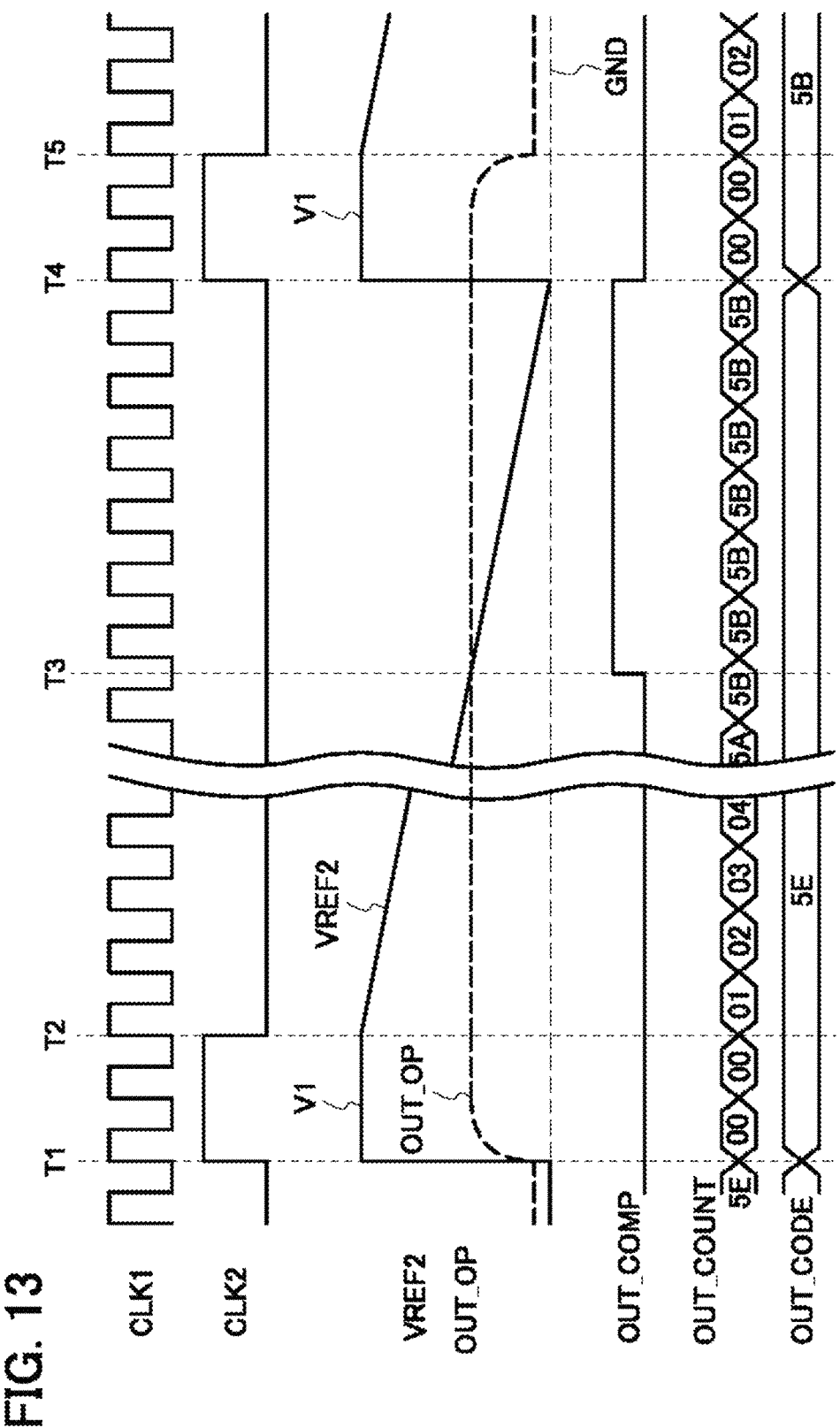

FIG. 16A
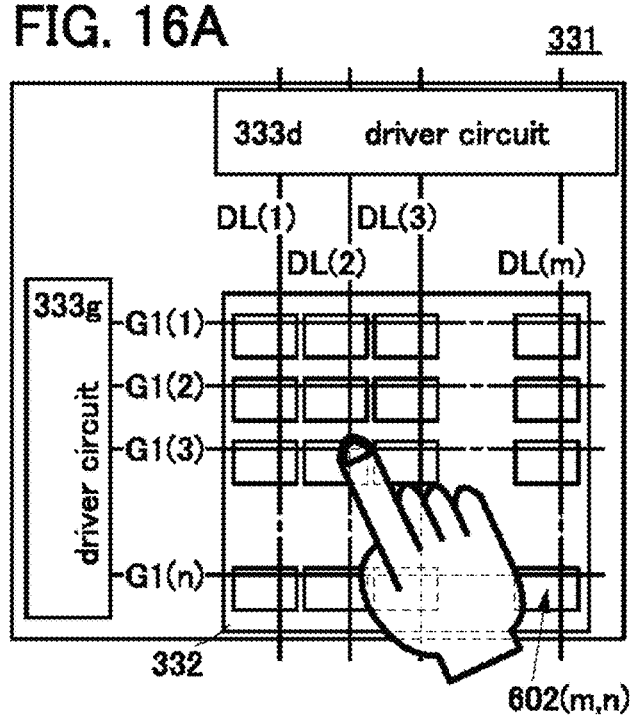
FIG. 16B
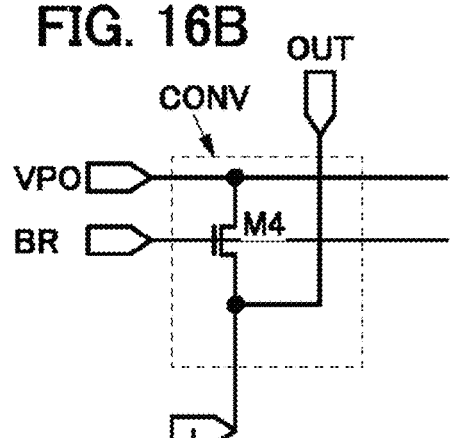
FIG. 16C
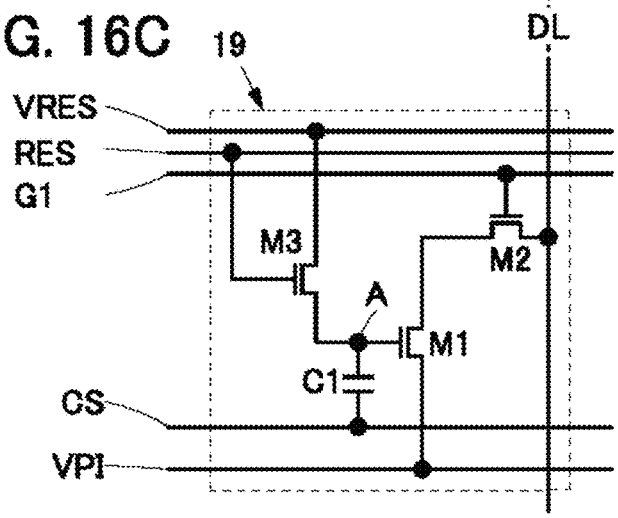
FIG. 16D1
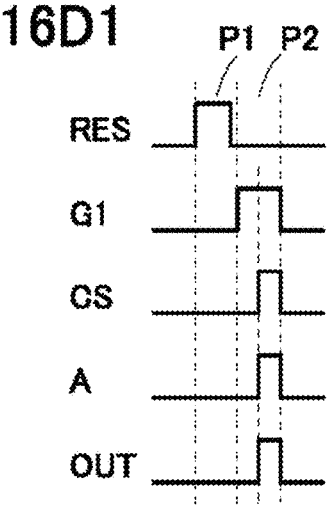
FIG. 16D2
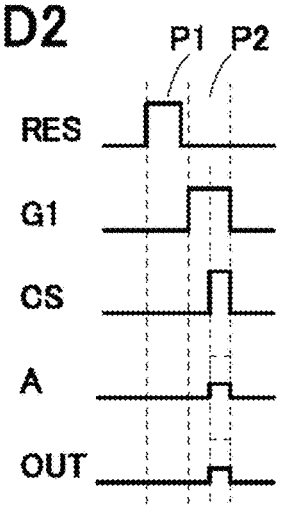

DISPLAY DEVICE AND INPUT/OUTPUT DEVICE

TECHNICAL FIELD

The present invention relates to an object, a method, or a manufacturing method. In addition, the present invention relates to a process, a machine, manufacture, or a composition of matter. In particular, one embodiment of the present invention relates to a semiconductor device, light-emitting device, a display device, a memory device, a driving method thereof, or a manufacturing method thereof. In particular, one embodiment of the present invention relates to a semiconductor device, light-emitting device, a display device, a power storage device, a memory device, a driving method thereof, or a manufacturing method thereof. The present invention relates to, for example, a display device in which, for each pixel, transistors among semiconductor devices are provided.

In this specification and the like, a semiconductor device generally means a device that can function by utilizing semiconductor characteristics. A display device, an electro-optical device, a semiconductor circuit, and an electronic device include a semiconductor device in some cases.

BACKGROUND ART

In recent years, portable information terminals such as smartphones and tablet terminals have been widespread. Most of the portable information terminals are provided with active matrix display devices and input devices such as touch panels.

In an active matrix display device including light-emitting elements such as organic light-emitting diodes (OLEDs), variation in the threshold voltages of transistors that control the value of current supplied to the light-emitting elements in accordance with image signals (such transistors are also referred to as driving transistors) is likely to influence the luminance of the light-emitting elements. In order to prevent variation in the threshold voltage from influencing luminance of the light-emitting elements, Patent Document 1 discloses a display device which determines threshold voltage and mobility from a source voltage of a driving transistor and sets a program data signal based on the determined threshold voltage and mobility depending on a display image.

Many touch panels used in portable information terminals are capacitive touch panels. In a capacitive touch panel, a change in electrostatic capacitance which is caused when a finger of a user touches the touch panel is output as a current value. As a means for detecting the current value, a detection circuit with an operational amplifier is proposed (Non-Patent Document 1).

REFERENCE

Patent Document

[Patent Document 1] Japanese Published Patent Application No. 2009-265459

Non-Patent Document

[Non-Patent Document 1] M. Hamaguchi, A. Nagao, and M. Miyamoto, "A 240 Hz-Reporting-Rate 143×81 Mutual-Capacitance Touch-Sensing Analog Front-End IC with 37 dB SNR for 1 nm-Diameter Stylus", *IEEE ISSCC Dig. Tech. Papers*, pp. 293-295, February 2014.

DISCLOSURE OF INVENTION

In an active matrix display device including a light-emitting element such as an organic EL element, an output current from a pixel used for detecting the electrical characteristics of a driving transistor has an extremely small value in a range from several tens of nanoamperes to several hundreds of nanoamperes. Furthermore, in an input device such as a touch panel, an output current used for detecting an input position has a larger value than the output current from a pixel. To detect the two output currents having different values, each of the display device and the input device is provided with a dedicated detection circuit in many cases.

In consideration of the above technical background, an object of one embodiment of the present invention is to provide a circuit which detects an output current from a pixel, and a display device including the detection circuit.

Another object of one embodiment of the present invention is to provide a circuit which detects an output current from a pixel and an output current from an input device, and an input/output device including the detection circuit.

Another object of one embodiment of the present invention is to provide a novel display device. Another object of one embodiment of the present invention to provide a novel input/output device. Another object of one embodiment of the present invention is to provide a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a current detection circuit including an integrator circuit, a comparator, a counter, and a latch. The integrator circuit has a function of integrating the potential of a first signal during a period determined by a second signal and outputting the integrated potential as a third signal. The comparator has a function of comparing the potential of the third signal with a first potential and outputting a fourth signal. The counter has a function of outputting the number of pulses included in a fifth signal as a sixth signal during a period determined by the fourth signal. The latch has a function of holding the sixth signal.

In the above embodiment, the integrator circuit preferably includes an operational amplifier and one or a plurality of capacitors.

In the above embodiment, the first signal is supplied from a pixel included in a display device or an input portion included in an input device.

One embodiment of the present invention is an input/output device in which the current detection circuit described in the above embodiment and a driver circuit of the display device are included in one IC.

One embodiment of the present invention is an input/output device in which the current detection circuit described in the above embodiment and a driver circuit of the input device are included in one IC.

In this specification and the like, a transistor is an element having at least three terminals: a gate, a drain, and a source. The transistor includes a channel region between the drain (a drain terminal, a drain region, or a drain electrode) and the source (a source terminal, a source region, or a source electrode) and current can flow through the drain, the channel region, and the source. Here, since the source and the drain of the transistor change depending on the structure, the operating condition, and the like of the transistor, it is difficult to define which is a source or a drain. Thus, a portion that functions as a source, or a portion that functions as a drain is not referred to as a source or a drain in some cases. In that case, one of the source and the drain might be referred to as a first electrode, and the other of the source and the drain might be referred to as a second electrode.

In addition, in this specification, "node" refers to any point on a wiring provided to connect elements electrically.

Note that in this specification, ordinal numbers such as "first", "second", and "third" are used in order to avoid confusion among components, and thus do not limit the number of the components.

Note that in this specification, the phrase "A and B are connected" or "A is connected to B" means the case where A and B are electrically connected to each other as well as the case where A and B are directly connected to each other. Here, the phrase "A and B are electrically connected" or "A is electrically connected to B" means the following case: when an object having any electrical function exists between A and B, an electric signal can be transmitted and received between A and B.

Note that the positional relations of circuit blocks in a drawing are specified for description. Even when a drawing shows that different functions are achieved by different circuit blocks, an actual circuit or region may be configured so that the different functions are achieved in the same circuit block. Further, the function of each circuit block in a drawing is specified for description. Thus, even when one circuit block is illustrated, an actual circuit or region may be configured so that processing which is illustrated as being performed in the one circuit block is performed in a plurality of circuit blocks.

According to one embodiment of the present invention, a circuit which detects an output current from a pixel, and a display device including the detection circuit can be provided.

According to one embodiment of the present invention, a circuit which detects an output current from a pixel and an output current from an input device, and an input/output device including the detection circuit can be provided.

According to one embodiment of the present invention, a novel display device can be provided. According to one embodiment of the present invention, a novel input/output device can be provided. According to one embodiment of the present invention, a novel semiconductor device can be provided.

Note that the description of these effects does not disturb the existence of other effects. One embodiment of the present invention does not necessarily have all of these effects. Other effects will be apparent from and can be derived from the description of the specification, the drawings, the claims, and the like.

BRIEF DESCRIPTION OF DRAWINGS

FIG. 13 is a timing chart showing operation of a current detection circuit.
FIGS. 16A, 16B, 16C, 16D1, and 16D2 illustrate the configuration and driving methods of a sensor circuit and a converter of one embodiment.

BEST MODE FOR CARRYING OUT THE INVENTION

Figure 1:
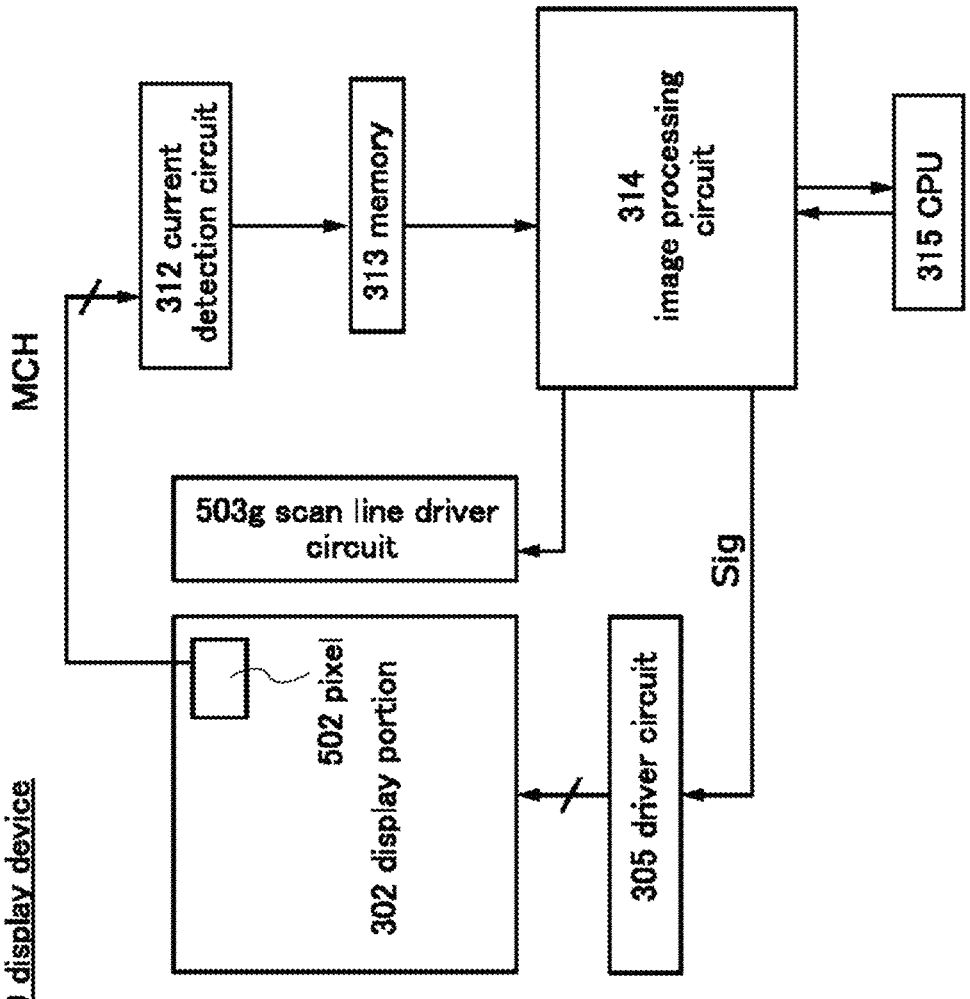
FIG. 1 illustrates a configuration of a display device.

Embodiments of the present invention will be described below in detail with reference to the drawings. Note that the present invention is not limited to the following description. Note that the present invention is not limited to the description below, and it is easily understood by those skilled in the art that modes and details of the present invention can be modified in various ways without departing from the spirit and scope of the present invention. Therefore, the embodiments of the present invention should not be construed as being limited to the description of the embodiments below. In addition, in the following embodiments, the same portions or portions having similar functions are denoted by the same reference numerals in different drawings, and description thereof will not be repeated.

In the drawings, the size, the layer thickness, or the region is exaggerated for clarity in some cases. Therefore, embodiments of the present invention are not limited to such a scale. Note that the drawings are schematic views showing ideal examples, and embodiments of the present invention are not limited to shapes or values shown in the drawings. For example, the following can be included: variation in signal, voltage, or current due to noise or difference in timing.

Embodiment 1

In this embodiment, configurations of a display device and an input/output device of one embodiment of the present invention are described with reference to FIG. 1, FIG. 2, FIG. 3, FIG. 4, FIG. 5, FIG. 6, FIG. 7, FIG. 8, and FIG. 9.
<Structure Example of Display Device>

An example of the structure of the display device of one embodiment or the present invention is described. FIG. 1 is an example of a block diagram illustrating the structure of a display device 300 of one embodiment of the present invention. Although the block diagram shows elements classified according to their functions in independent blocks, it may be practically difficult to completely separate the elements according to their functions and, in some cases, one element may be involved in a plurality of functions.

The display device 300 illustrated in FIG. 1 includes a display portion 302 including a plurality of pixels 502, a driver circuit 305, a scan line driver circuit 503g, a CPU 315, an image processing circuit 314, a memory 313, and a current detection circuit 312.

The CPU 315 has a function of decoding an instruction input from the outside or an instruction stored in a memory provided in the CPU 315 and executing the instruction by controlling the overall operations of various circuits included in the display device 300.

A signal MCH supplied from the pixel 502 to the current detection circuit 312 has the value of a current which is output from the pixel 502. The current detection circuit 312 has a function of converting the value or the current included in the signal MCH into data.

The memory 313 has a function of storing the data generated in the current detection circuit 312. As the memory 313, for example, memory circuits such as a dynamic random access memory (DRAM) or a static random access memory (SRAM) can be used. Furthermore, the memory 313 may be included in the current detection circuit 312 or included in the image processing circuit 314.

The image processing circuit 314 has a function of generating an image signal Sig in response to an instruction from the CPU 315. In addition, the image processing circuit 314 has a function of reading the data stored in the memory 313 in response to an instruction from the CPU 315 and correcting the image signal Sig using the data. Furthermore, the image processing circuit 314 has a function of performing, signal processing on the image signal Sig in accordance with the specifications of the display device 300 and supplying the processed signal to the driver circuit 305.

The scan line driver circuit 503g has a function of selecting the plurality of pixels 502 included in the display portion 302 row by row. The driver circuit 305 has a function of supplying the image signal Sig which has been supplied from the image processing circuit 314 to the pixels 502 in a row selected by the scan line driver circuit 503g.

Note that the image processing circuit 314 has a function of supplying variety of driving signals used for driving the driver circuit 305, the scan line driver circuit 503g, and the like, to the driver circuit 305 and the scan line driver circuit 503g. As driving signals for controlling the driver circuit 305, a start pulse signal SSP, a clock signal SCK, a latch signal LP, and the like are given. Similarly, as driving signals for controlling the operation of the scan line driver circuit 503g, a start pulse signal GSP, a clock signal GCK, and the like are given.

The driver circuit 305 may be provided over the same substrate as the display portion 302 and the scan line driver circuit 503g, or may be provided over another substrate. The driver circuit 305 may be Formed using thin film transistors (TFTs). The driver circuit 305 may be formed by chip-on-glass (COG).

The current detection circuit 312, the memory 313, the image processing circuit 314, and the CPU 315 may be included in one integrated circuit (IC). In addition, the driver circuit 305 may further be included in the IC. When a plurality of circuits are formed in one IC in such a manner, an occupation area of the whole circuit can be reduced, leading to miniaturization of the display device 300.

Various display elements can be used in the display portion 302. For example, organic electroluminescent elements, display elements (electronic ink) that perform display by an electrophoretic method, an electrowetting method, or the like, MEMS shutter display elements, optical interference type MEMS display elements, and liquid crystal elements can be given.

Note that display device 300 may include an input device which has a function of giving data or an instruction to the CPU 315. As the input device, a keyboard, a pointing device, a touch panel, a sensor, or the like can be used.
Configuration Example of Current Detection Circuit Next, a specific configuration example of the current detection circuit 312 included in the display device 300 illustrated in FIG. 1 is described.

Note that in this embodiment, in the case where two values, a high potential and a low potential, are applied to a terminal, a node, a wiring, or an electrode, the high potential may be referred to as an H level, and the low potential may be referred to as an L level.

Figure 2:
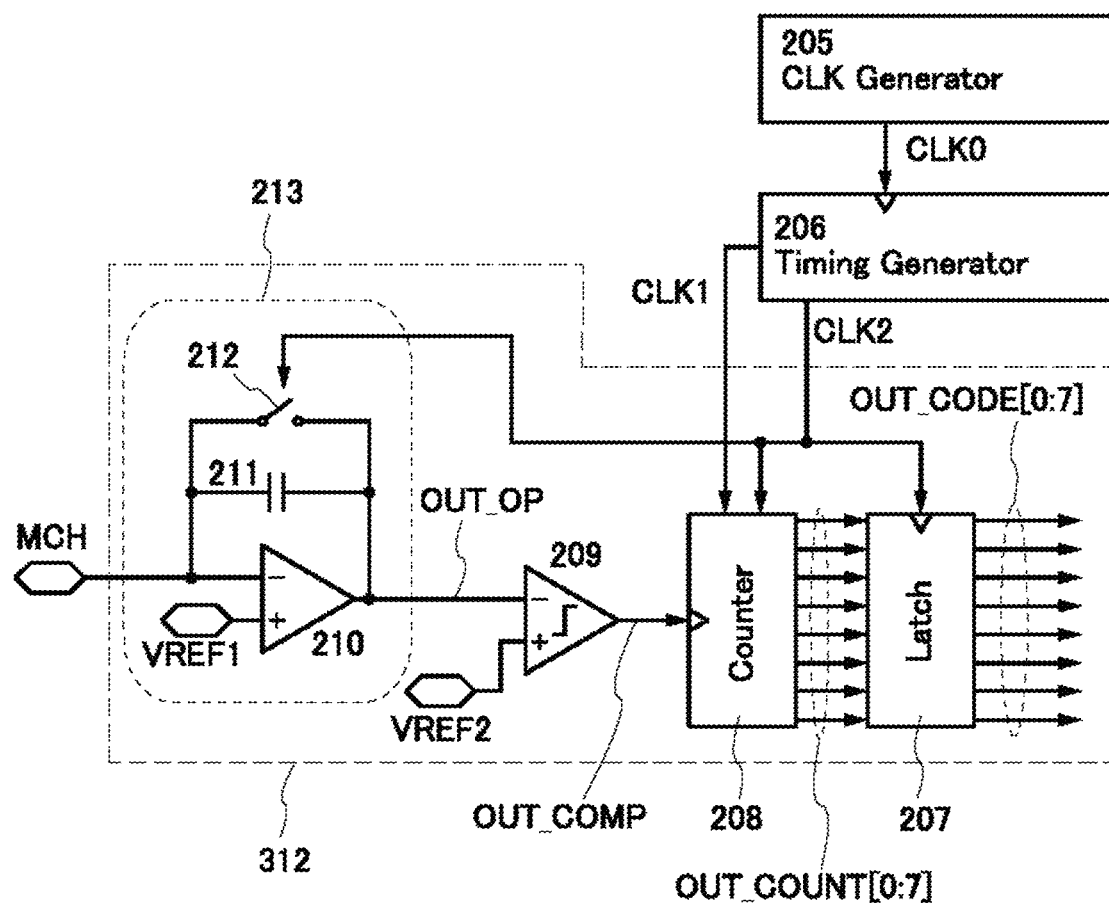
FIG. 2 illustrates a configuration of a current detection circuit.

FIG. 2 illustrates an example of a circuit diagram of the current detection circuit 312. The current detection circuit 312 includes a latch 207, counter 208, a comparator 209, and an integrator circuit 213. The integrator circuit 213 includes an operational amplifier 210, a capacitor 211, and a switch 212.

A timing generator 206 is electrically connected to the current detection circuit 312, and a clock generator 205 is electrically connected to the liming generator 206.

The clock generator 205 has a function of generating a signal CLK0 having a certain frequency. The clock generator 205 may generate the signal CLK0 with the use of a quartz oscillator or a ceramic oscillator, for example.

The timing generator 206 has a function of generating a signal CLK1 and a signal CLK2 from the signal CLK0. The frequency of the signal CLK1 is different from that of the signal CLK2 and is preferably higher than that of the signal CLK2.

The signal CLK1 generated by the timing generator 206 is input to the counter 208. The signal CLK2 generated by the timing generator 206 is input to the switch 212, the counter 208, and the latch 207.

A first terminal of the capacitor 211 is electrically connected to an inverting input terminal (−) of the operational amplifier 210, and a second terminal of the capacitor 211 is electrically connected to an output terminal of the operational amplifier 210.

The switch 212 has a function of controlling conduction between the first terminal and the second terminal of the capacitor 211. The switch 212 is turned on or off in response to the signal CLK2. The switch 212 may be formed using a transistor.

The signal MCH is input to the inverting input terminal of the operational amplifier 210, a potential VREF1 is input to a non-inverting input terminal (+) of the operational amplifier 210, and the output terminal of the operational amplifier 210 outputs a signal OUT_OP.

The operational amplifier 210 is an amplifier circuit and has a function of amplifying and outputting a potential difference between the inverting input terminal and the non-inverting input terminal.

An inserting input terminal of the comparator 209 is electrically connected to the output terminal of the operational amplifier 210. The signal OUT_OP is input to the inverting input terminal of the comparator 209, a potential VREF2 is input to a non-inverting input terminal of the comparator 209, and an output terminal of the comparator 209 outputs a signal OUT_COMP.

The comparator 209 has a function of comparing a first potential applied to the non-inverting input terminal with a second potential applied to the inverting input terminal, outputting an H-level potential in the case where the first potential is higher than the second potential, and outputting an L-Level potential in the case where the first potential is lower than the second potential.

The counter 208 has a function of counting the number of times when the potential of the signal CLK1 is changed from the H level to the L level (or from the L level to the H level), and a function of outputting the number (the number of counts as a signal OUT_COUNT. Furthermore, the counter 208 includes a latch circuit and has a function of holding the number of counts obtained just before the potential of the signal OUT_COMP is changed from the L level to the H level. Moreover, the counter 208 has a function of initializing the number of counts of the signals OUT_COUNT to zero when supplied with the signal CLK2. Note that the number of times when the potential of the signal CLK1 is changed from the H level to the L level (or from the L level to the H level) may be referred to as the number of pulses of the signal CLK1.

The latch 207 has a function of storing the signal OUT_COUNT input just before the potential of the signal CLK2 is changed from the L level to the H level, and has a function of outputting the signal as a signal OUT_CODE.

Note that in this embodiment, the signal OUT_COUNT and the signal OUT_CODE are each represented by 8-bit data.

<Operation Example of Current Detection Circuit>

Figure 3:
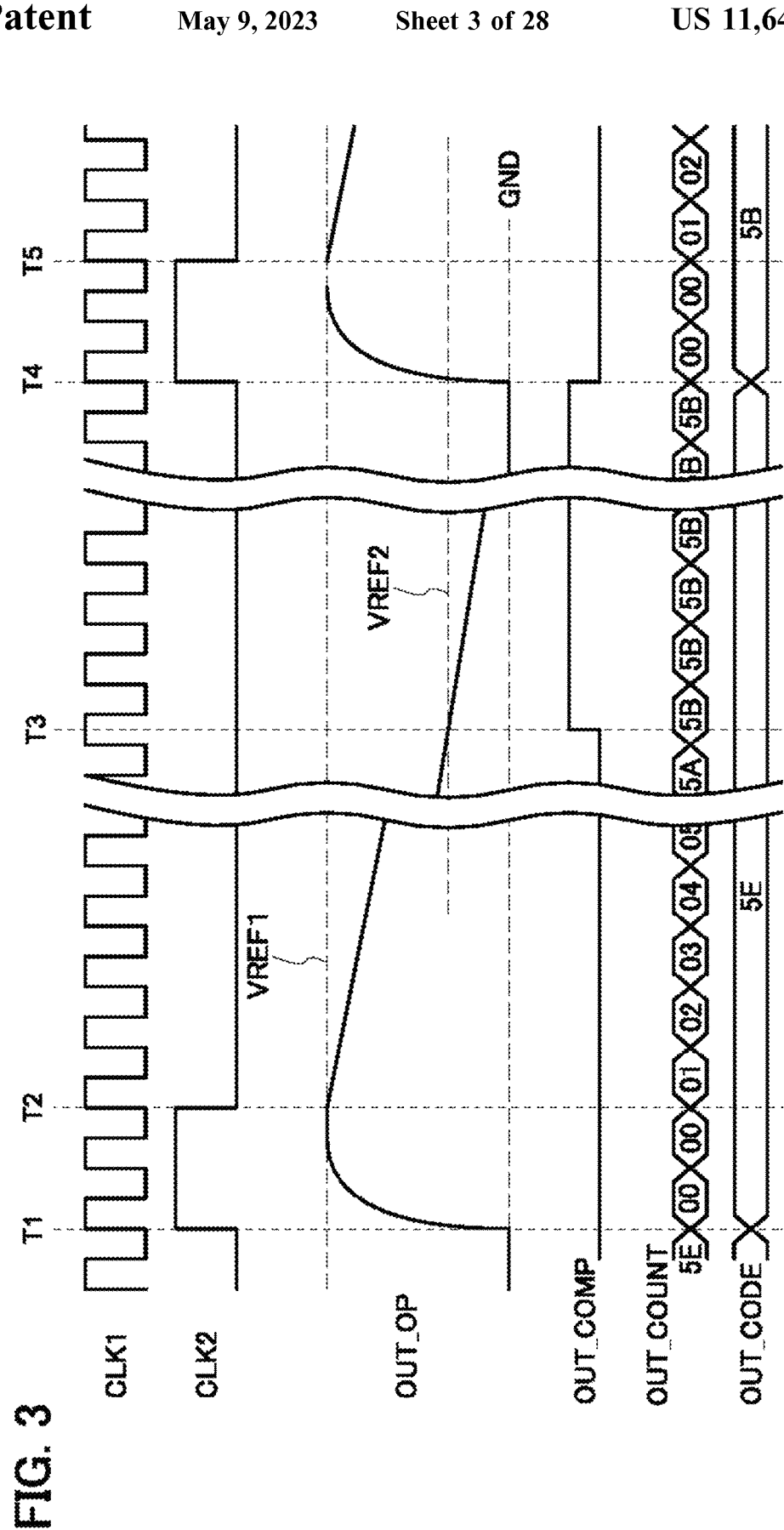
FIG. 3 is a timing chart showing operation of a current detection circuit.

Next, an example of the operation of the current detection circuit 312 is described using a timing chart shown in FIG. 3.

The timing chart in FIG. 3 shows changes in the potentials of the signals CLK1, CLK2, OUT_OP, OUT_COMP, OUT_COUNT, and OUT_CODE. Times T1 to T5 in FIG. 3 are used to describe operation timing.

As described above, the number of counts of the signals CLK1 is given as the signal OUT_COUNT and the signal OUT_CODE, and FIG. 3 shows an example in which the number of counts is represented by a 8-bit hexadecimal number.

First, at Time T1, the potential of the signal CLK2 is changed from the L level to the H level. At this time, the switch 212 is turned on, so that discharge of the capacitor 211 is started. After that, the potential of the signal OUT_OP is initialized to the potential VREF1.

Furthermore, at Time T1, the counter 208 is reset, so that "00" is supplied as the signal OUT_COUNT. At the same time, the latch 207 stores the signal OUT_COUNT just before Time T1 and outputs the signal OUT_COUNT as the signal OUT_CODE. FIG. 3 shows that data (5E) supplied as the signal OUT_COUNT before Time T1 is supplied as the signal OUT_CODE after Time T1.

Next, at Time T2, the potential of the signal CLK2 is changed from the H level to the L level. At this time, the switch 212 is turned off, so that charging of the capacitor 211 begins and integration of the integrator circuit 213 is started. A potential obtained by integrating the signal MCH with time is supplied as the signal OUT_OP, so that the potential of the signal OUT_OP gradually decreases.

Furthermore, at Time T2, the counter 208 starts counting of the number of times when the potential of the signal CLK1 changes from the H level to the L level (or from the L level to the H level), and outputs the number of counts as the signal OUT_COUNT.

Next, at Time T3, the potential of the signal OUT_OP becomes equal to the potential VREF2, and the potential of the signal OUT_COMP is changed from the L level to the H level. At this time, the latch circuit included in the counter 208 functions, so that the number of counts at Time T3 (5B in FIG. 3) is held as the signal OUT_COUNT.

After that, the potential of the signal OUT_OP keeps decreasing to reach a potential GND.

Next, at Time T4, like at Time T1, the potential of the signal CLK2 is changed from the L level to the H level, so that discharge of the capacitor 211 is started. After that, the potential of the signal OUT_OP is initialized to the potential VREF1.

Furthermore, at Time T4, the potential of the signal OUT_COMP is changed from the H level to the L level, so that a latch of the counter 208 is released. At the same time, the signal OUT_COUNT is initialized to "00" owing to the signal CLK2, and the number of counts just before Time T4 (5B in FIG. 3) is held as the signal OUT_CODE. This number of counts corresponds to a current value of the signal MCH, and thus it is possible to monitor the current of the signal MCH by reading the number of counts.

After that, the above operation is repeated, whereby the current value of the signal MCH can be monitored each time.

In this manner, the above structure enables the current detection circuit 312 to detect an output current from the pixel 502. Furthermore, monitoring the current value from the pixel 502 allows the display device 300 to correct an image which is to be displayed on the display portion 302.

<Configuration Example of Input/Output Device>

Figure 4:
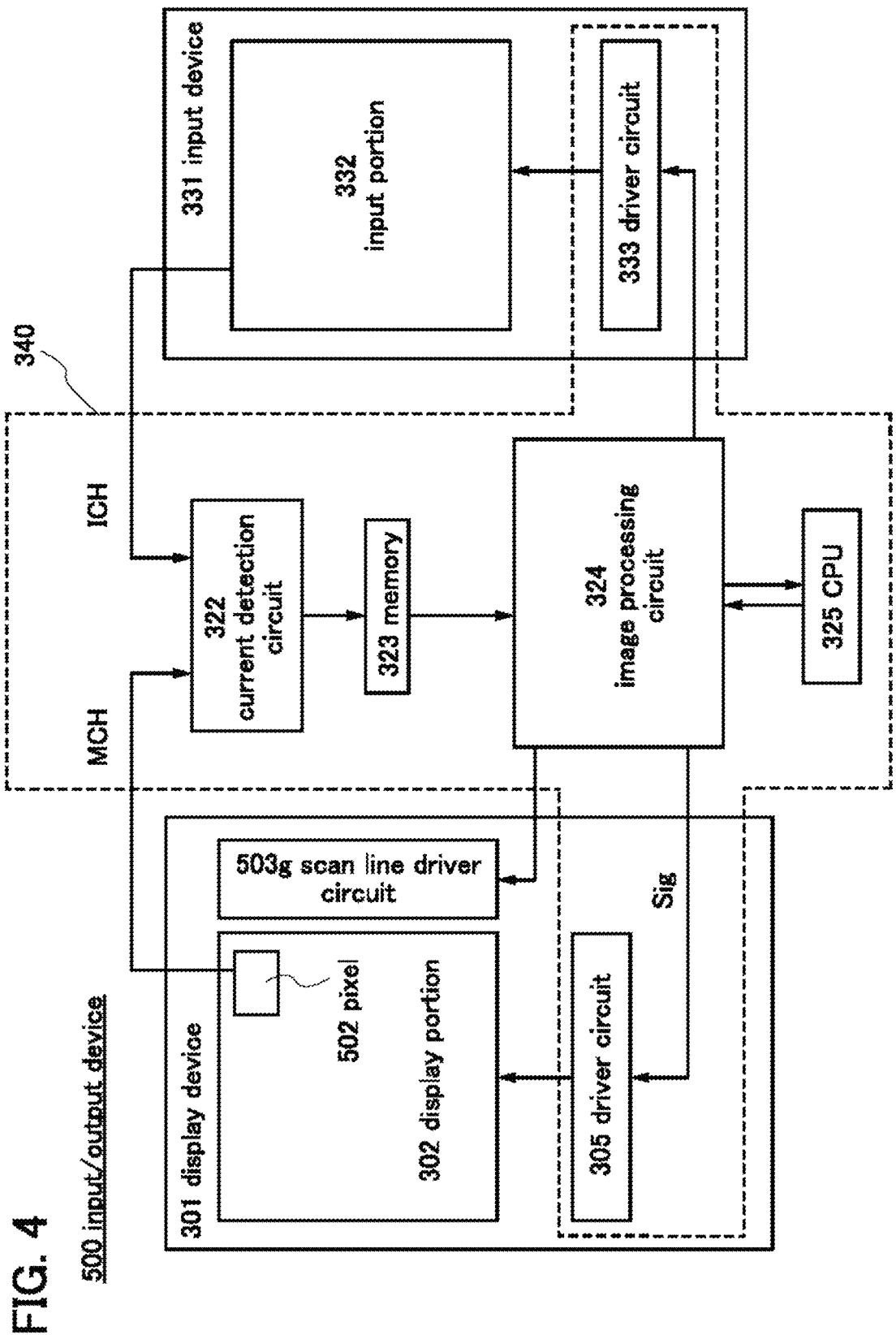
FIG. 4 illustrates a configuration of an input/output device.

FIG. 4 is a block diagram illustrating an example of the configuration of an input/output device 500 of one embodiment of the present invention. The input/output device 500 illustrated in FIG. 4 includes a display device 301, an input device 331, a CPU 325, an image processing circuit 324, a memory 323, and a current detection circuit 322.

For details of the pixel 502, the display portion 302, the scan line driver circuit 503g, and the driver circuit 305 in FIG. 4, the description of FIG. 1 is referred to.

The input device 331 includes an input portion 332 and a driver circuit 333.

The input device 331 can have a variety of forms, such as a touch panel, a pointing device, a keyboard, and a sensor. For example in the case where the input device 331 is a touch panel, the input portion 332 includes an electrical circuit which converts contact of a finger into an electrical signal, such as a wiring or a capacitor. Furthermore, in the case where the input device 331 is a touch panel, the driver circuit 333 has a function of supplying a signal to a wiring provided in the input portion 332.

The input device 331 supplies a signal ICH to the current detection circuit 322. A value of a current included in the signal ICH includes information relating to an input position (coordinates in the input portion).

As illustrated in FIG. 4, the current detection circuit 322 is capable of detecting the current value of the signal MCH supplied from the display device 301 and the current value of the signal ICH supplied from the input device 331 and converting them into data.

The memory 323 has a function of storing the data generated by the current detection circuit 322. As the memory 323, a memory circuit, e.g., a DRAM or an SRAM, can be used. Furthermore, the memory 323 may be included in the current detection circuit 322 or may be included in the image processing circuit 324.

The CPU 325 has a function of decoding an instruction input from the outside or an instruction stored in a memory provided in the CPU 325 and executing the instruction by controlling the overall operations of various circuits included in the input/output device 500.

The image processing circuit 324 has a function of generating the image signal Sig in response to an instruction from the CPU 325, in addition to the function of the image processing circuit 314 in FIG. 1. Furthermore, the image processing circuit 324 has a function of supplying a variety of driving signals used for driving the driver circuit 333 to the driver circuit 333.

The drivel circuit 305 can be formed over the same substrate as the display portion 302 and the scan line driver circuit 503g. In this case, the driver circuit 305 may be formed using TFTs. The driver circuit 305 may be formed by chip-on-glass (COG).

The driver circuit 305, the current detection circuit 322, the memory 323, the image processing circuit 324, the CPU 325, and the driver circuit 333 may be included in one IC (a dashed line 340 in FIG. 4). By integrating a plurality of circuits in one IC in this manner, it is possible to reduce an occupation area of the whole circuit, leading to miniaturization of the input/output device 500. Furthermore, it is possible to lower the manufacturing cost of the input/output device 500.

Figure 5:
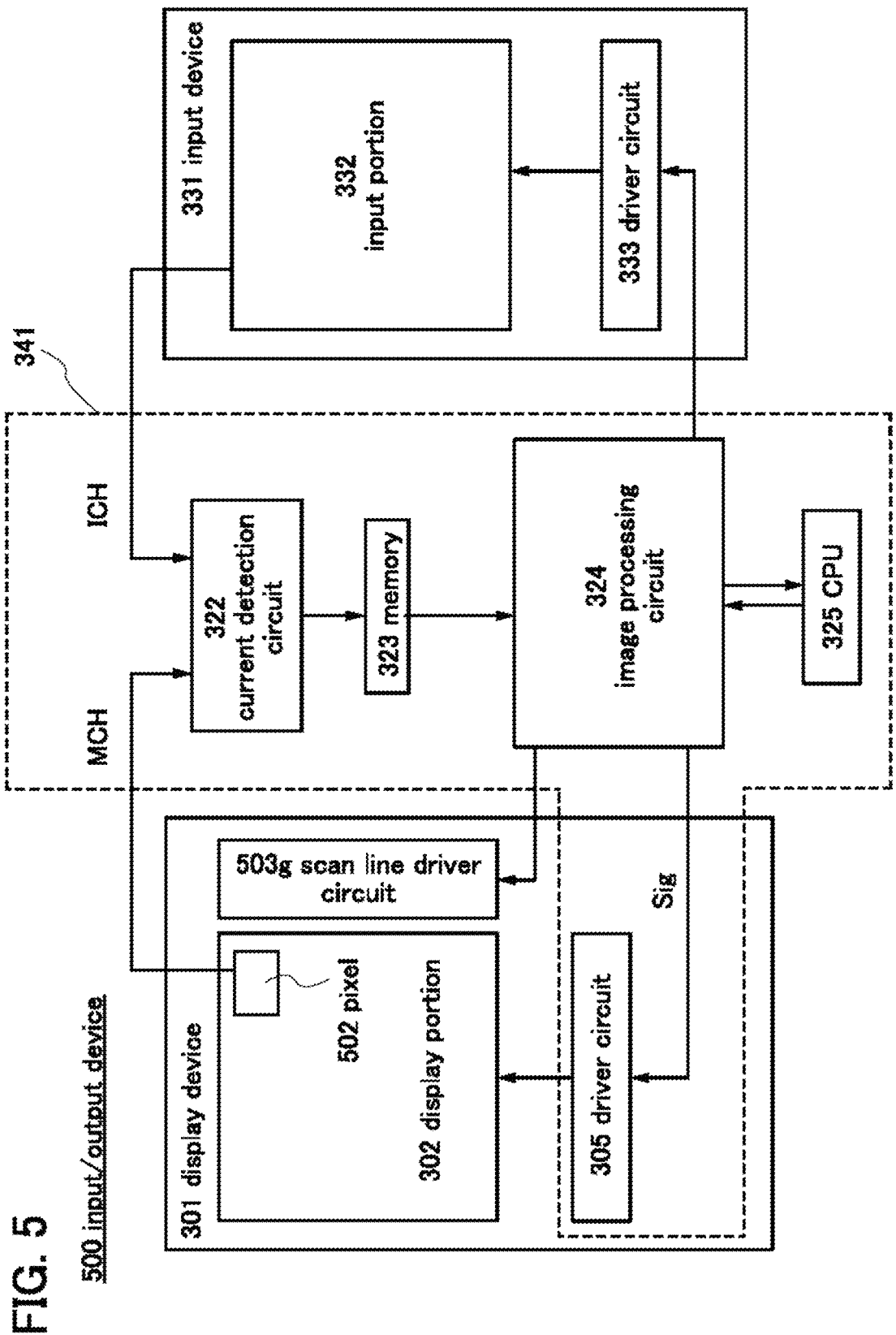
FIG. 5 illustrates a configuration of an input/output device.

Alternatively, as in the input/output device 500 illustrated in FIG. 5, the driver circuit 305, the current detection circuit 322, the memory 323, the image processing circuit 324, and the CPU 325 may be included in one IC (a dashed line 341 in FIG. 5). In the case where the input device 331 is a touch panel, the driver circuit 333 may be formed over the same substrate as the input portion 332. In this case, the driver circuit 333 may be formed using TFTs or may be formed by COG.

Figure 6:
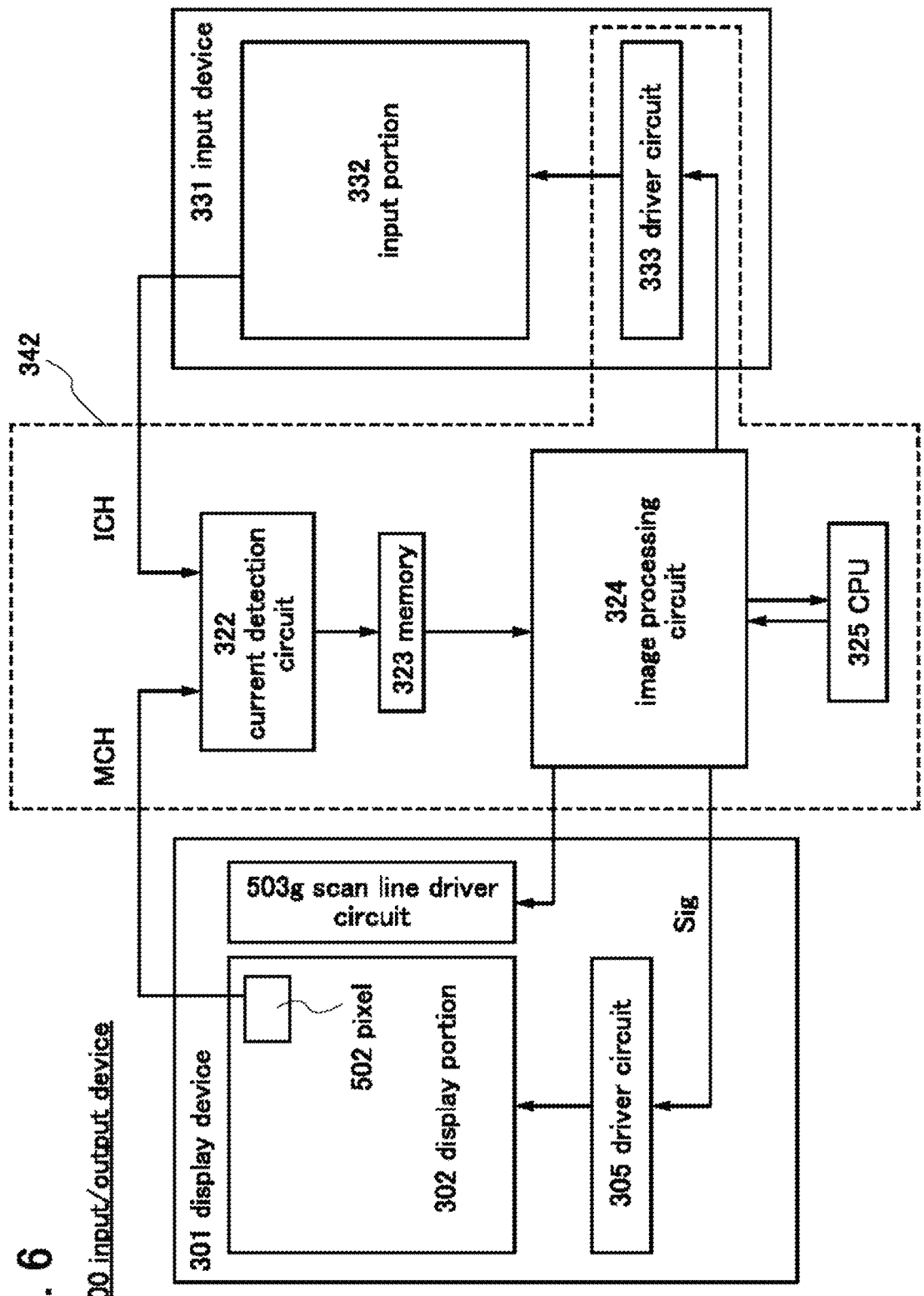
FIG. 6 illustrates a configuration of an input/output device.

As in the input/output device 500 illustrated in FIG. 6, the driver circuit 333, the current detection circuit 322, the memory 323, the mage processing circuit 324, and the CPU 325 may be included in one IC (a dashed line 342 in FIG. 6).

Figure 7:
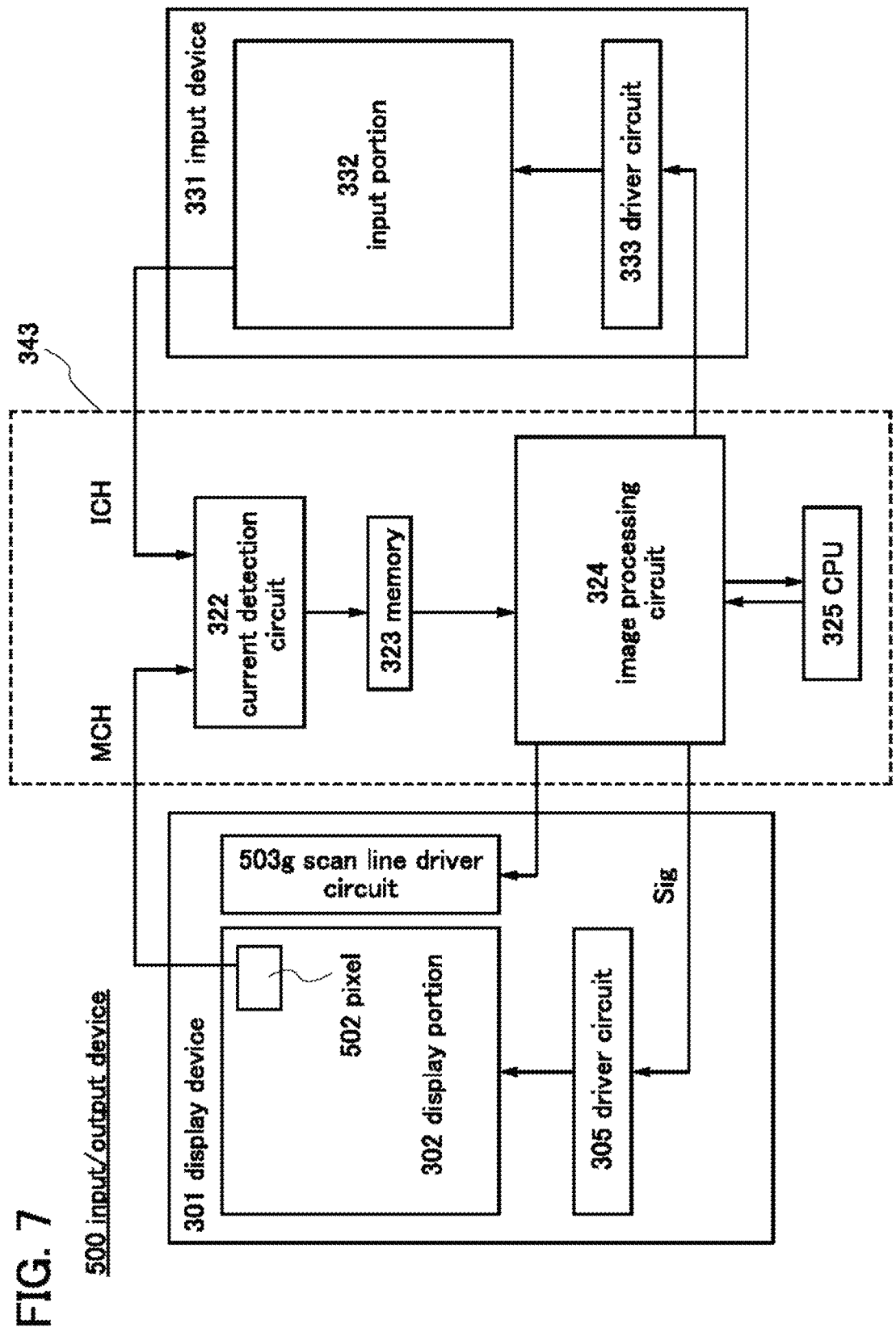
FIG. 7 illustrates a configuration of an input/output device.

As in the input/output device 500 illustrated in FIG. 7, the current detection circuit 322, the memory 323, the image processing circuit 324, and the CPU 325 may be included in one IC (a dashed line 343 in FIG. 7).

One circuit detects two or more signals in a manner similar to that of the current detection circuit 322 in FIG. 4, whereby the manufacturing cost can be lower than that in the case where circuits detecting respective signals are provided. Furthermore, the occupation area of the whole circuit can be reduced, which can miniaturize the input/output device 500.

<<Configuration Example of Current Detection Circuit>>

Next, a specific configuration example of the current detection circuit 322 included in the input/output device 500 in FIG. 4 is described.

Figure 8:
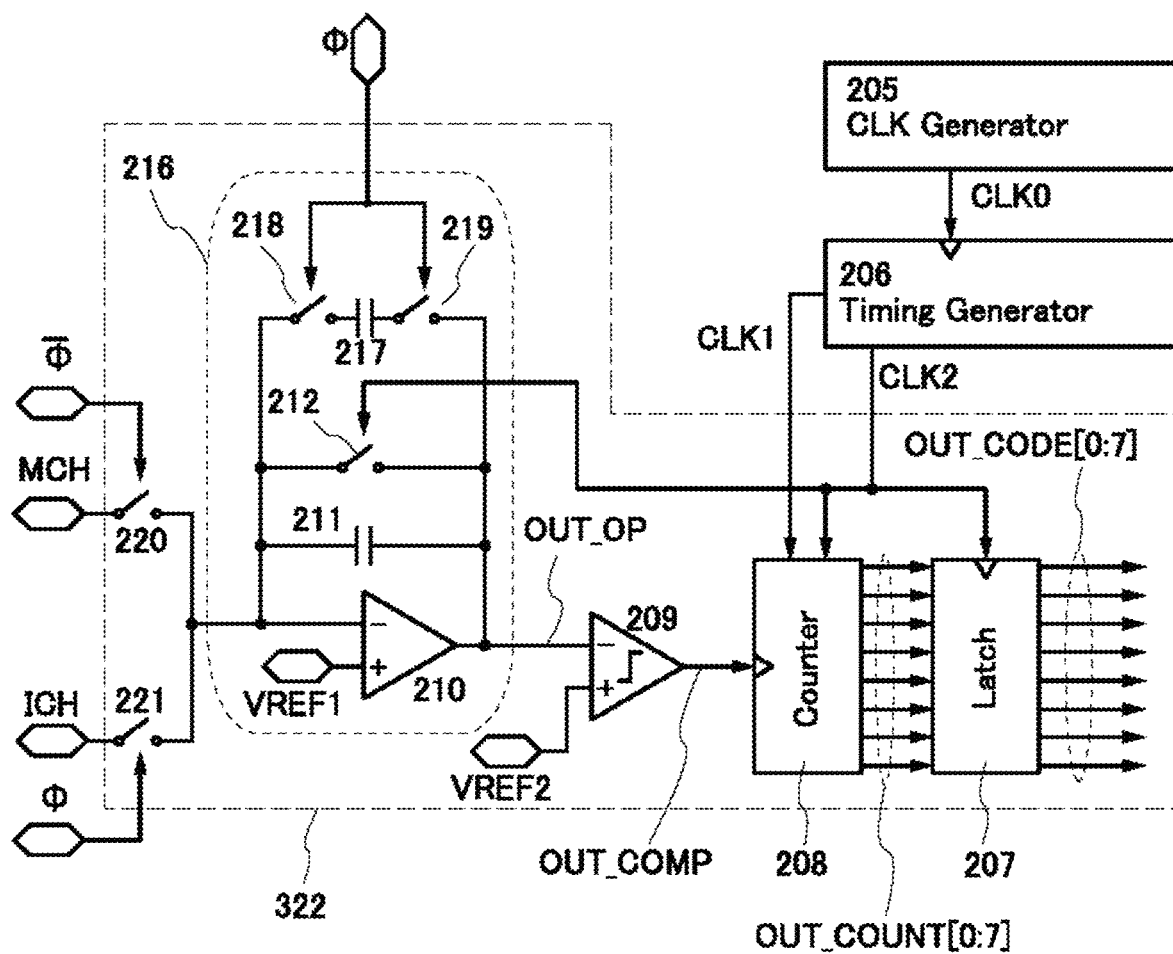
FIG. 8 illustrates a configuration of a current detection circuit.

FIG. 8 illustrates an example or a circuit, diagram of the current detection circuit 322. The current detection circuit 322, includes the latch 207, the counter 208, the comparator 209, an integrator circuit 216, a switch 220, and a switch 221. The integrator circuit 216 includes the operational amplifier 210, the capacitor 211, the switch 212, a capacitor 217, a switch 218, and a switch 219.

The current detection circuit 322 in FIG. 8 is obtained in such a manner that the capacitor 217, the switch 218, the switch 219, the switch 220, and the switch 221 are added to the current detection circuit 312 in FIG. 2. As a signal for controlling the switch 218, the switch 219, the switch 220, and the switch 221, a signal Φ is input to the current detection circuit 322.

The switch 220 has a function of controlling conduction between a terminal to which the signal MCH is input and the inverting input terminal of the operational amplifier 210. The switch 221 has a function of controlling conduction between a terminal to which the signal ICH is input and the inverting input terminal of the operational amplifier 210. The switch 218 has a function of controlling conduction between a first terminal of the capacitor 217 and the inverting input terminal of the operational amplifier 210. The switch 219 has a function of controlling conduction between a second terminal of the capacitor 217 and the output terminal of the operational amplifier 210. The switches 220, 221, 218, and 219 may be formed using transistors.

In FIG. 8, the signal MCH supplied from the display device 301 or the signal ICH supplied from the input device 331 is input to the inverting input terminal of the operational amplifier 210 in response to the signal Φ.

When the signal MCH is input, the signal Φ functions to turn off the switch 218, the switch 219, and the switch 721 and turn on the switch 220. At this time, the capacitor 217 is electrically separated from the integrator circuit 216, in which case the current detection circuit 322 can be regarded as having the same structure as the current detection circuit 312 in FIG. 2.

When the signal ICH is input, the signal Φ functions to turn on the switch 218, the switch 219, and the switch 221 and turn off the switch 220. At this time, the capacitor 217 and the capacitor 211 are connected in parallel. In the case where the signal ICH has a higher current value than the signal MCH, a capacitance value needed for the integrator circuit 216 cannot be satisfied only by the capacitor 211; therefore, when the signal ICH is to be detected, it is necessary to add the capacitor 217 to the integrator circuit 216.

Note that the signal MCH may have a higher current value than the signal ICH. In this case, in FIG. 8, the input terminal of the MCH and the input terminal of the signal ICH are be replaced with each other.

The switch 220 and the switch 221 may be formed in the same IC as the current detection circuit 322 or may be formed in a position different from that of the current detection circuit 322. For example, the switch 220 may be formed in the display deuce 301 by COG. For example, in the case where the input device 331 is a touch panel, the switch 221 may be formed in the input device 331 by COG.

For details of the other components in the current detection circuit 322, the description of the current detection circuit 312 in FIG. 2 may be referred to. Furthermore, for the operation of the current detection circuit 322, the operation of the current detection circuit 312 shown in FIG. 3 may be referred to.

As described above, the use of the current detection circuit 322 in FIG. 8 enables one circuit to detect two signals having different current values. The manufacturing cost can be lower than that in the case where circuits detecting respective signals are provided. Furthermore, the occupation area of the whole circuit can be reduced, which can miniaturize the input/output device 500.

Thus, the above structure allows the current detection circuit 322 to detect the output current from the pixel 502 and the output current from the input device 331. Furthermore, by monitoring the value of the current from the pixel 502, the input/output device 500 can correct an image displayed on the display portion 302. In addition, the input/output device 500 can detect a signal which has been input to the input portion 332 to output an image to the display portion 302.

Figure 9:
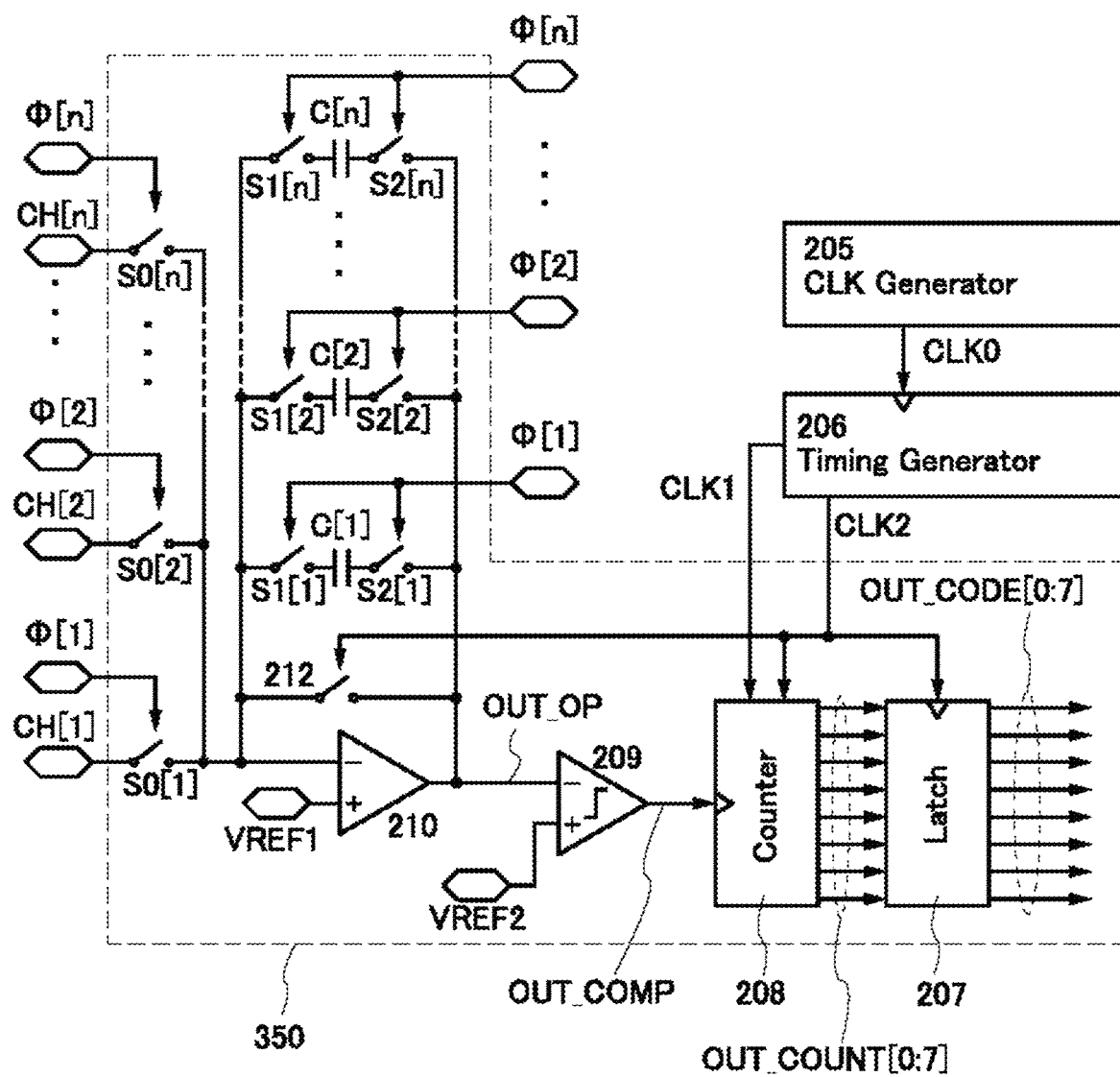
FIG. 9 illustrates a configuration of a current detection circuit.

A current detection circuit 350 illustrated in FIG. 9 is configured such that the current detection circuit 322 in FIG. 8 can detect current values of n different signals (n is a natural number greater than or equal to 2). The current detection circuit 350 includes switches S0[1] to S0[n], switches S1[1] to S1[n], switches S2[1] to S2[n], and capacitors C[1] to C[n]. The current detection circuit 350 has the same structure as the current detection circuit 322 except for the above structure.

For example, in the case of detecting the current value of a signal CH[n], a signal Φ[n] functions to turn on the switch S0[n], the switch S1[n], and the switch S2[n], and signals Φ[1] to Φ[n-1] function to turn off the switches S0[1] to S0[n-1], the switches S1[1] to S1[n-1], and the switches S2[1] to S2[n-1]. The capacitor C[n] is electrically connected to the operational amplifier 210, and the capacitors C[1] to C[n-1] are electrically disconnected from the operational amplifier 210.

For example, in the case of detecting the current value of a signal CH[k] (k is a natural number satisfying 1≤k≤n), a signal Φ[k] functions to turn on the switch S0[k], the switch S1[k], and the switch S2[k], and a signals Φ[m] (m is a natural number except for k and satisfies 1≤m≤n) functions to turn off the switch S0[m], the switch S1[m], and the switch S2[m]. The capacitor C[k] is electrically connected to the operational amplifier 210, and the capacitor C[m] is electrically disconnected from the operational amplifier 210.

The number of capacitors which are electrically connected to the operational amplifier 210 at the same time is not limited to one. For example, to detect the current value of a signal CH[3], the capacitors C[1] to C[3] may be electrically connected to the operational amplifier 210.

Note that the structure described in this embodiment can be used in appropriate combination with the structure described in any of the other embodiments.

Embodiment 2

In this embodiment, other configuration examples of the current detection circuit 312 in FIG. 1 or the current detection circuit 322 in FIG. 4 are described with reference to FIG. 10, FIGS. 11A and 11B, FIGS. 12A to 12C, and FIG. 13.

Figure 10:
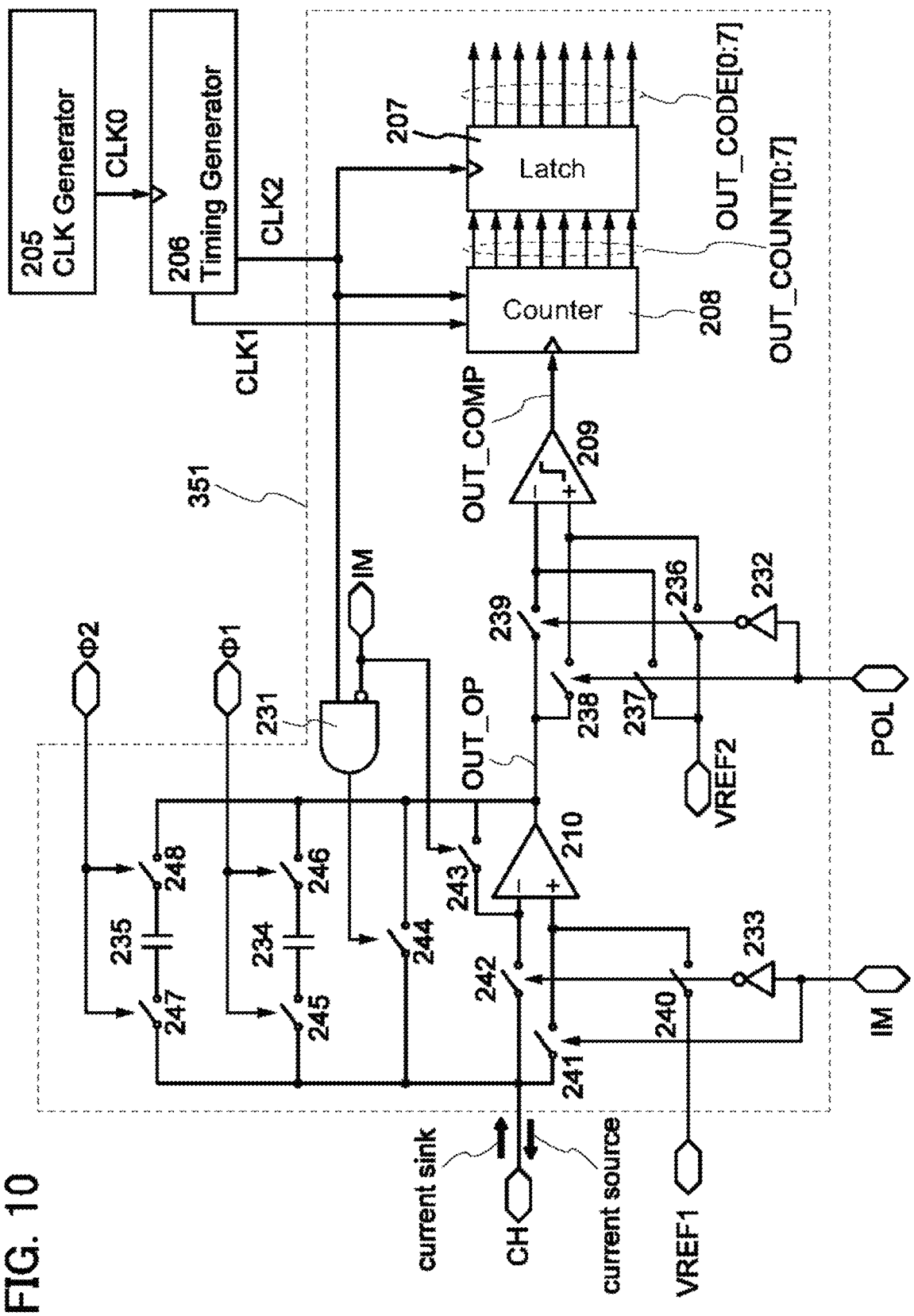
FIG. 10 illustrates a configuration of a current detection circuit.

FIG. 10 illustrates a configuration example of a current detection circuit 351. The current detection circuit 351 in FIG. 10 includes the operational amplifier 210, the comparator 209, an AND gate 231, an inverter 232, an inverter 233, a capacitor 234, a capacitor 235, a switch 236, a switch 237, a switch 238, a switch 239, a switch 240, a switch 241, a switch 242, a switch 243, a switch 244, a switch 245, a switch 246, a switch 247, a switch 248, the counter 208, and the latch 207.

A signal CH, a signal POL, a signal IM, a signal Φ1, a signal Φ2, the potential VREF1, and the potential VREF2 are input to the current detection circuit 351. The signal CH includes the signal MCH output from the pixel 502, the signal ICH output from the input portion 332, and the like in FIG. 4.

The signal POL has a function of controlling the switches 236 to 239, each of which is turned on when the signal having the H level is input and turned off when the signal having the L level is input.

The signal IM has a function of controlling the switches 240 to 244, each of which is turned on when the signal having the H level is input and turned off when the signal having the L level is input.

The signal Φ1 has a function of controlling the switches 245 and 246, each of which is turned on when the signal having the H level is input and turned off when the signal having the L level is input.

The signal Φ2 has a function of controlling the switches 247 and 248, each of which is turned on when the signal having the H level is input and turned off when the signal having the L level is input.

The switches 236 to 248 may be formed using transistors.

For the other structures in FIG. 10, the description for FIG. 2 may be referred to.

The current detection circuit 351 may detect a current with two modes: a current sinking mode in which a current flowing from the outside to the current detection circuit 351 is detected; and a current source mode in which a current flowing from the current detection circuit 351 to the outside is detected. Alternatively, the current detection circuit 351 may be a voltage detection circuit which detects voltage (or potential). Selection of the mode can be performed by control of the signal Φ1, the signal Φ2, the signal POL, and the signal IM (see Table 1).

TABLE 1

|  | Φ1 | Φ2 | POL | IM |
| --- | --- | --- | --- | --- |
| Current sinking mode (A) | H | L | L | L |
| Current sinking mode (B) | L | H | L | L |
| Current source mode (A) | H | L | H | L |
| Current source mode (B) | L | H | H | L |
| Voltage follower mode | L | L | H | H |

Table 1 shows ways to supply the signal Φ1, the signal Φ2, the signal POL, and the signal IM using the detection modes. Note that "H" represents the case of supplying an H-level potential as a signal, and "L" represents the case of supplying an L-level potential as a signal.

Figure 11A:
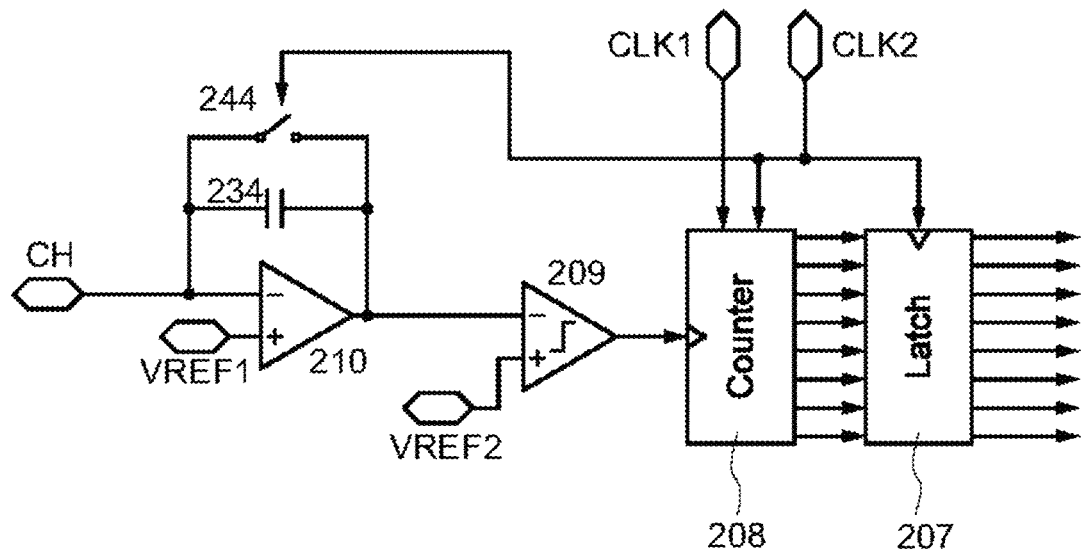
FIGS. 11A and 11B each illustrate a configuration of a current detection circuit.

In Table 1, a current sinking mode (A) corresponds to a circuit configuration in which a current flowing from a pixel of a display device is detected (an equivalent circuit thereof is shown in FIG. 11A). In the case where the current sinking mode (A) is selected, the signal CH is input to the inverting input terminal of the operational amplifier 210, and the potential VREF1 is input to the non-inverting input terminal of the operational amplifier 210. Furthermore, the capacitor 234 is electrically connected to the operational amplifier 210, whereby an integrator circuit including the capacitor 234 and the operational amplifier 210 is formed.

Figure 11B:
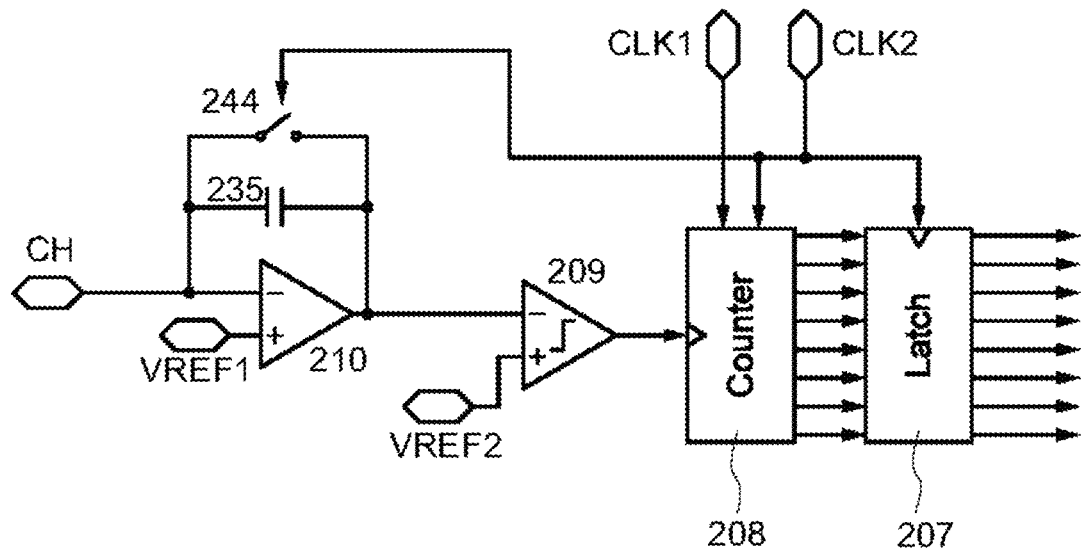

In Table 1, a current sinking mode (B) corresponds to a circuit configuration in which a current flowing from an input portion of an input device is detected (an equivalent circuit thereof is shown in FIG. 11B). In the case where the current sinking mode (B) is selected, the signal CH is input to the inverting input terminal of the operational amplifier 210, and the potential VREF1 is input to the non-inverting input terminal of the operational amplifier 210. Furthermore, the capacitor 235 is electrically connected to the operational amplifier 210, whereby an integrator circuit including the capacitor 234 and the operational amplifier 210 is formed.

Figure 12A:
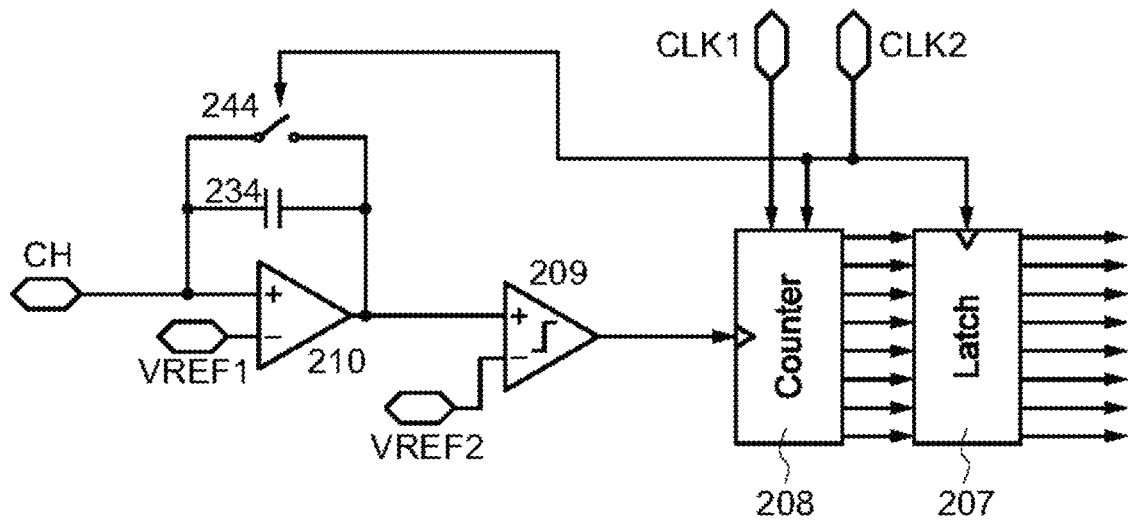
FIGS. 12A to 12C each illustrate a configuration or a current detection circuit.

In Table 1, a current source mode (A) corresponds to a circuit configuration in which a current flowing to a pixel of a display device is detected (an equivalent circuit thereof is shown in FIG. 12A). In the case where the current source mode (A) is selected, the potential VREF1 is input to the inverting input terminal of the operational amplifies 210, and the signal CH is input to the non-inverting input terminal of the operational amplifier 210. Furthermore, the capacitor 234 is electrically connected to the operational amplifier 210, whereby an integrator circuit including the capacitor 234 and the operational amplifier 210 is formed.

Figure 12B:
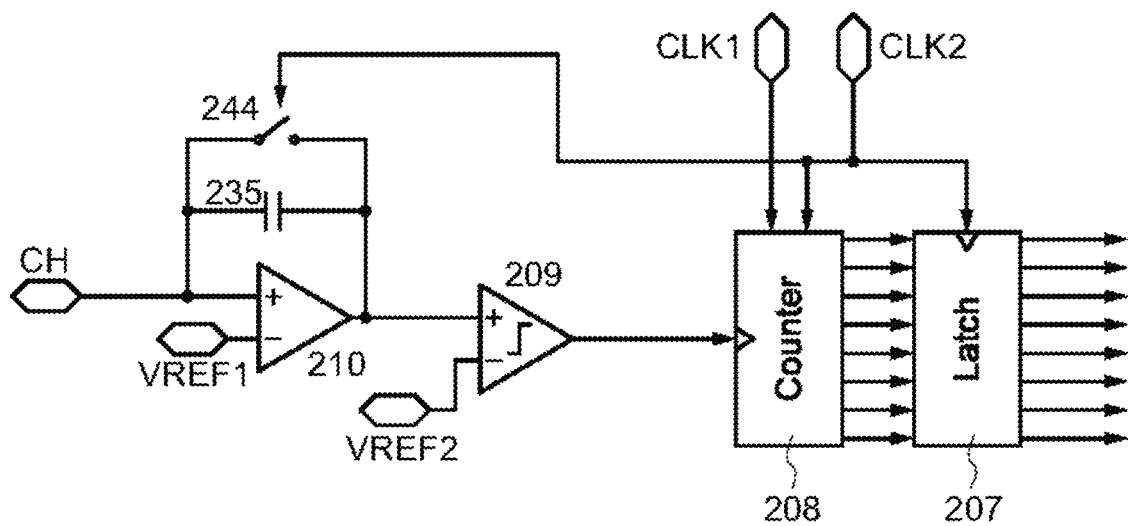

In Table 1, a current source mode (B) corresponds to a circuit configuration in which a current flowing to an input portion of an input device is detected (an equivalent circuit thereof is shown in FIG. 12B). In the case where the current source mode (B) is selected, the potential VREF1 is input to the inverting input terminal of the operational amplifier 210, and the signal CH is input to the non-inverting input terminal of the operational amplifier 210. Furthermore, the capacitor 235 is electrically connected to the operational amplifier 210, whereby an integrator circuit including the capacitor 234 and the operational amplifier 210 is formed.

Figure 12C:
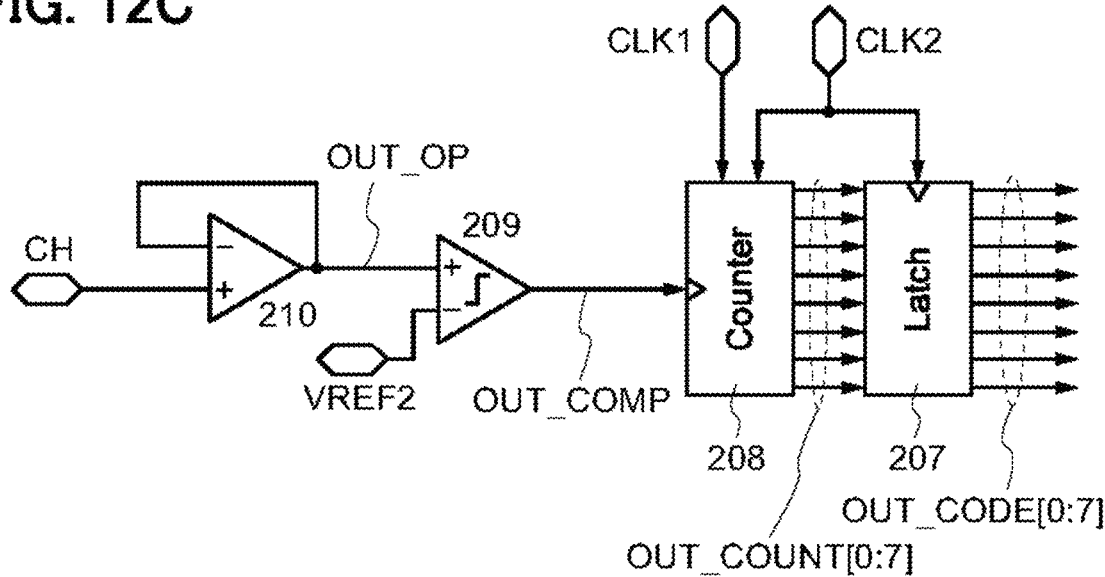

The voltage follower mode in Table 1 corresponds to a circuit configuration in which the voltage (or potential) of the signal CH is detected (an equivalent circuit thereof is shown in FIG. 12C). In the case where the voltage follower mode is selected, the output terminal of the operational amplifier 210 is electrically connected to the inverting input terminal of the operational amplifier 210, and the signal CH is input to the non-inverting input terminal of the operational amplifier 210. At this time, the operational amplifier 210 functions as a voltage follower which outputs a potential which is the same as that of the signal CH as the signal OUT_OP.

A timing chart of FIG. 13 shows an example of the operation of the voltage follower circuit in FIG. 12C. The timing chart in FIG. 13 shows changes in the potential VREF2 and the potentials of the signals CLK1, CLK2, OUT_OP, OUT_COMP, OUT_COUNT, and OUT_CODE. The potential VREF2 is varied with time in the timing chart in FIG. 13, whereas the potential VREF2 is always constant in the timing chart in FIG. 3. Times T1 to T5 are used to describe operation timing.

First, at Time T1, the potential of the signal CLK2 is changed from an L level to an H level. At this time, the counter 208 is reset, so that "00" is supplied as the signal OUT_COUNT. At the same time, the latch 207 stores the signal OUT_COUNT just before Time T1 and outputs the signal OUT_COUNT as the signal OUT_CODE.

Furthermore, at Time T1, the potential of the signal CH is output as the signal OUT_OP, and at the same time, the potential VREF2 is changed to a potential V1. The potential V1 is preferably higher than a maximum value of a potential which the signal OUT_OP can have (a potential which the signal CH can have).

Next, at Time T2, the potential of the signal CLK2 is changed from the H level to the L level. From this time, the potential VREF2 begins to decrease.

Furthermore, at Time T2, the counter 208 starts counting of the number of times when the potential of the signal CLK1 changes from the H level to the L level (or from the L level to the H level), and outputs the number of counts as the signal OUT_COUNT.

Next, at Time T3 the potential VREF2 becomes equal to the potential of the signal OUT_OP, and the potential of the signal OUT_COMP is changed from the L level to the H level. At this time, the latch circuit included in the counter 208 functions, so that the number of counts at Time T3 is held as the signal OUT_COUNT.

Then, at Time T4, like at Time T1, the potential of the signal CLK2 is changed from the L level to the H level, and the potential VREF2 is changed to the potential V1. At this time, a latch of the counter 208 is released. At the same time, the signal OUT_COUNT is initialized to "00" owing to the signal CLK2, and the number of counts just before Time T4 (5B in FIG. 13) is held the signal OUT_CODE. This number of counts corresponds to the potential of the signal CH, and thus it is possible to detect the potential of the signal CH by reading the number of counts.

Subsequently, the above operation is repeated, whereby the potential of the signal CH can be detected each time.

This embodiment can be combined with any of the other embodiments in this specification as appropriate.

Embodiment 3

In this embodiment, a structure of an input/output device that can be used for one embodiment of the present invention is described with reference to FIG. 14 and FIGS. 15A to 15C.

Figure 14:
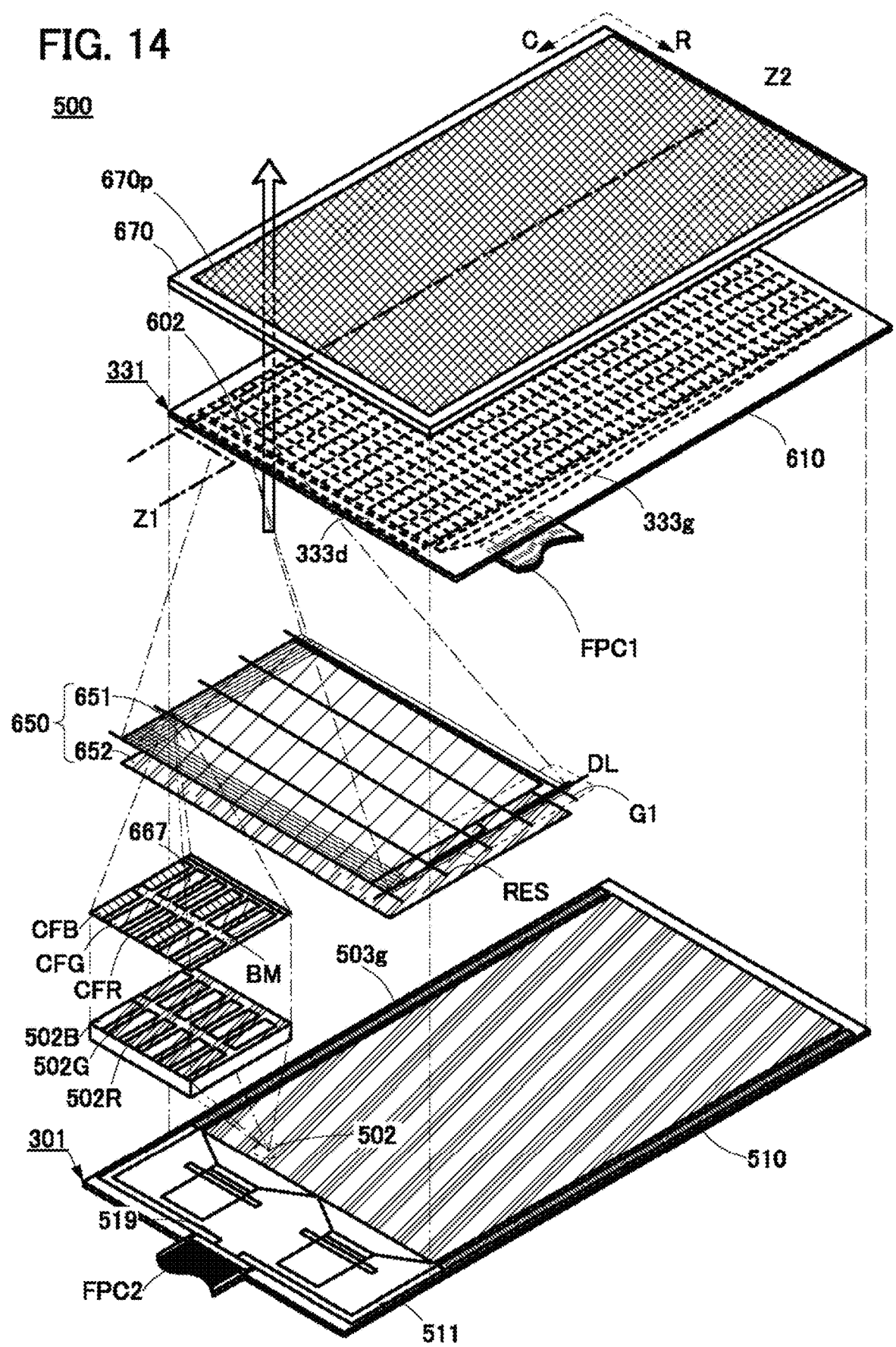
FIG. 14 is a projection view illustrating a structure of an input/output device of one embodiment.

FIG. 14 is a projection view illustrating the structure of the input/output device 500 of one embodiment of the present invention. Note that some of sensor units 602 and some of the pixels 502 are enlarged in FIG. 14 for convenience of explanation.

Figure 15A:
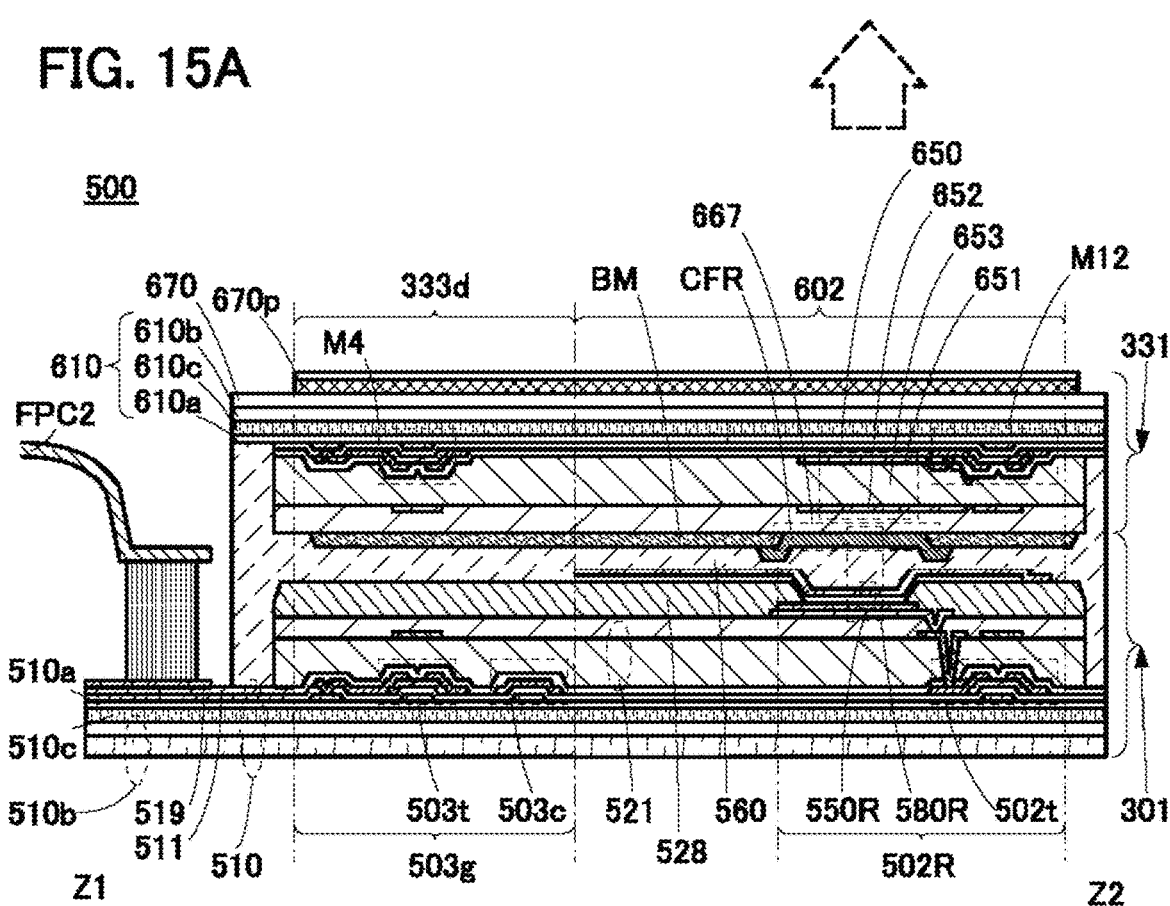
FIGS. 15A to 15C are cross-sectional views illustrating the structure of an input/output device of one embodiment.
Figure 15B:
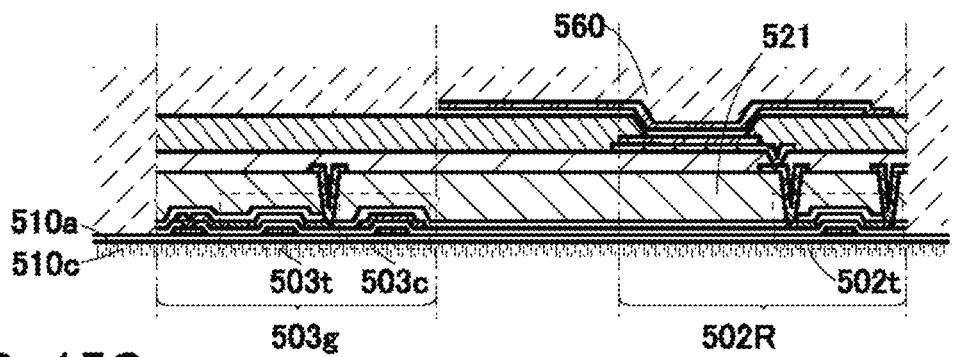
Figure 15C:
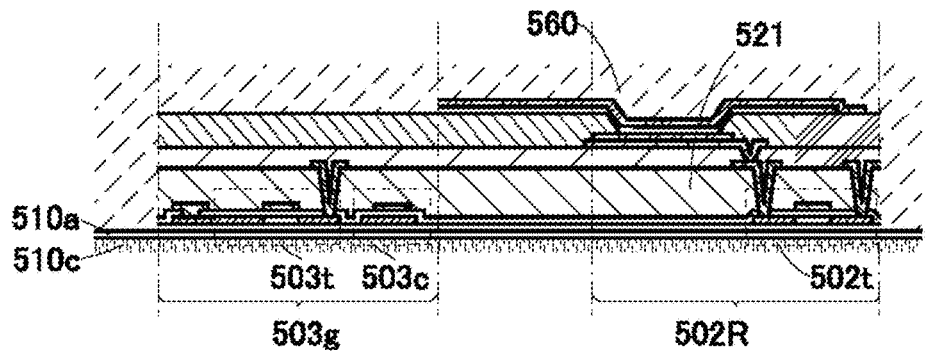

FIG. 15A is a cross-sectional view illustrating a cross-sectional structure of the input/output device 500 of one embodiment of the present invention along line Z1-Z2 in FIG. 14, and FIGS. 15B and 15C are each a cross-sectional view illustrating a cross-section of a structure obtained by replacing part of the structure in FIG. 15A.

<Structure Example of Input/Output Device>

The input/output device 500 described in this embodiment includes the display device 301 and the input device 331 overlapping the display device 301 (see FIG. 14).

The input device 331 includes the plurality of sensor units 602 arranged in matrix.

The input device 331 further includes a wiring G1, a wiring RES, and the like to which a plurality of sensor units 602 which are arranged in a row direction (denoted by an arrow R in FIG. 14) are electrically connected.

The input device 331 further includes a wiring DL and the like to which a plurality of sensor units 602 which are arranged in a column direction (denoted by an arrow C in FIG. 14) are electrically connected.

The sensor unit 602 is provided with a sensor circuit. The sensor circuit is electrically connected to the wiring G1, the wiring RES, the wiring DL, and the like.

A transistor, a sensor element, and/or the like can be used for the sensor circuit. For example, a conductive film and a capacitor electrically connected to the conductive film can be used for the sensor element. A capacitor and a transistor electrically connected to the capacitor can be used.

A capacitor 650 including an insulating layer 653, and a first electrode 651 and a second electrode 652 between which the insulating layer 653 is provided can be used (see FIG. 15A).

Furthermore, the sensor unit 602 includes a plurality of window portions 667 arranged in matrix. The window portions 667 transmit visible light. A light-blocking layer BM may be provided between the window portions 667.

A coloring layer is provided in a position overlapping the window portion 667. The coloring layer transmits light of a predetermined color. Note that the coloring layer can be referred to as a color filter. For example, a coloring layer CFB that transmits blue light, a coloring layer CFG that transmits green light, and a coloring layer CFR that transmits red light can be used. Furthermore, a coloring layer that transmits yellow light and a coloring layer that transmits white light can be used.

The display device 301 includes the plurality of pixels 502 arranged in a matrix. The pixel 502 is provided to be positioned below the window portions 667 of the input device 331.

The pixels 502 may be arranged at a high density as compared with the sensor units 602.

The input/output device 500 described in this embodiment includes the input device 331 including the plurality of sensor units 602 which are provided with the window portions 667 transmitting visible light and are arranged in matrix, the display device 301 including the plurality of pixels 502 provided below the window portions 667, and the coloring layer between the window portion 667 and the pixel 502. Furthermore, each sensor unit is provided with a switch capable of reducing an interference with another sensor unit.

Thus, sensing data obtained by each sensor unit can be supplied together with the positional information of the sensor unit. In addition, the sensing data associated with the positional information of pixels for displaying an image can be supplied. In addition, the sensor unit which does not supply the sensing data is not electrically connected to a signal line, whereby interference with the sensor unit which supplies a sensing signal can be reduced. Thus, the novel input/output device 500 with high convenience or reliability can be provided.

For example, the input device 331 of the input/output device 500 can sense sensing data and supplies the sensing data together with the positional information. Specifically, a user of the input/output device 500 can make a various gestures (e.g., tap, drag, swipe, and pinch in) using his/her finger or the like as a pointer on the input device 331.

The input device 331 is capable of sensing approach or contact of a finger or the like to the input device 331 and supplying sensing data including the obtained position, track, or the like.

An arithmetic unit determines whether or not supplied data satisfies a predetermined condition on the basis of a program or the like and executes an instruction associated with a predetermined gesture. Furthermore, the arithmetic unit has a function of supplying a result of executing the instruction as display data to the display device 301.

Thus, a user of the input device 331 can make the predetermined gesture with his/her finger and make the arithmetic unit execute an instruction associated with the predetermined gesture.

For example, the input device 331 of the input/output device 500 is capable of selecting one of a plurality of sensor units that can supply sensing data to a signal line to cause a non-conduction state between the signal line and all sensor units except the selected one. Therefore, interference of the sensor units which are not selected with the selected sensor unit can be reduced.

Specifically, interference of the sensor elements of the sensor units which are not selected with the sensor element of the selected sensor unit can be reduced.

For example, in the case where a capacitor and a conductive film to which one electrode of the capacitor is electrically connected are used in a sensor element, interference of the potential of a conductive film of a sensor unit which is not selected with the potential of a conductive film of a selected sensor unit can be reduced.

Thus, without dependence on the size, the input/output device 500 can drive the sensor units and supply sensing data. For example, it is possible to provide the input/output devices 500 with various sizes ranging from the one which can be used for a handheld type device to the one which can be used for an electric blackboard.

In addition, the input/output device 500 can drive the sensor units and supply sensing data, without depending on its state. Specifically, the input/output device 500 in various states, such as a folded state and an unfolded state, can be obtained.

In addition to the above structure, the following structure can be included in the input/output device 500.

The input device 331 of the input/output device 500 may include a driver circuit 333g and a driver circuit 333d. The input device 331 may be electrically connected to a flexible primed board FPC1.

The display device 301 of the input/output device 500 may include the scan line driver circuit 503g, a wiring 511, and a terminal 519. The display device 301 may be electrically connected to a flexible printed board FPC2.

Furthermore, to protect the input/output device 500 and prevent generation of a flaw, a protective layer 670 may be provided. For example, a ceramic coat layer or a hard coat layer can be used as the protective layer 670. Specifically, a layer containing aluminum oxide or an UV curable resin can be used. Furthermore, an antireflective layer 670p which weakens the intensity of external light which is reflected by the input/output device 500 can be used. Specifically, a circularly polarizing plate can be used, for example.

Individual components included in the input/output device 500 are described below. Note that these components cannot be clearly distinguished and one component also serves as another component or include part of another component in some cases.

For example, the input device 331 including the coloring layers overlapping the plurality of window portions 667 also serves as a color filter.

For example, the input/output device 500 where the input device 331 overlaps the display device 301 serves as the input device 331 and the display device 301. Note that the input/output device 500 in which the input device 331 overlaps the display device 301 is also referred to as a touch panel.

<<Overall Structure>>

The input/output device 500 described in this embodiment includes the input device 331 and the display device 301.

<Input Portion>

The input device 331 includes the sensor unit 602, the wiring G1, the wiring DL, and a base material 610.

Note that the input device 331 may be formed in such a manner that films for forming the input device 331 are deposited over the base material 601 and the films are processed.

Alternatively, the input device 331 may be formed in such a manner that part of the input device 331 is formed over another base material, and the part is transferred to the base material 610.

<<Sensor Unit>>

The sensor unit 602 senses an object which approaches or touches the sensor unit 602 and supplies a sensing signal. For example, the sensor unit 602 senses electrostatic capacitance, illuminance, magnetic force, an electric wave, a pressure, or the like and supplies data based on the obtained physical value. Specifically, a capacitor, a photoelectric conversion element, a magnetic sensor element, a piezoelectric element, a resonator, and the like can be used as a sensor element of the sensor unit.

For example, the sensor unit 602 senses a change in electrostatic capacitance between the sensor unit 602 and what approaches or touches the sensor unit 602. Specifically, a conductive film and a sensor circuit electrically connected to the conductive film may be used.

Note that when an object which has a higher dielectric constant than the air, such as a finger, approaches the conductive film in the air, electrostatic capacitance between the finger and the conductive film changes. The change in the electrostatic capacitance can be sensed, and sensor data can be supplied. Specifically, a sensor circuit including a conductive film and a capacitor one electrode or which is connected to the conductive film can be used for the sensor unit 602.

For example, distribution of charge occurs between the conductive film and the capacitor owing to the change in the electrostatic capacitance, so that the voltage across the capacitor is changed. The change in voltage can be used for a sensing signal. Specifically, the voltage between the electrodes of the capacitor 650 changes when an object approaches the conductive film which is electrically connected to one electrode of the capacitor 650 (see FIG. 15A).

<<Switch, Transistor>>

The sensor unit 602 includes a switch which can be turned on or off on the basis of a control signal. For example, a transistor M4 can be used as the switch.

A transistor winch amplifies a sensing signal can be used in the sensor unit 602.

Transistors which can be formed by the same process can be used as the transistor which amplifies a sensing signal and the switch. Thus, the input device 331 which can be manufactured by simplified process can be provided.

The transistor includes a semiconductor layer. For example, a Group 4 element, a compound semiconductor, or an oxide semiconductor can be used for the semiconductor layer. Specifically, a semiconductor containing silicon, a semiconductor containing gallium arsenide, an oxide semiconductor containing indium, or the like can be used for the semiconductor layer.

A semiconductor layer having any of various crystallinities can be used in the transistor. For example, a layer of a semiconductor including an amorphous region, a layer of a semiconductor including a microcrystalline region, a layer of a semiconductor including a polycrystalline region, a layer of a semiconductor including a single crystal region, or the like can be used. Specifically, amorphous silicon, polycrystalline silicon crystallized by process such as laser annealing, a semiconductor layer formed using a silicon-on-insulator (SOI) technique, and the like can be used.

For example, the oxide semiconductor used for the semiconductor layer preferably includes a film represented by an In-M-Zn oxide that contains at least indium (In), zinc (Zn), and M (metal such as Al, Ga, Ge, Y, Zr, Sn, La, Ce, or Hf). Alternatively, both In and Zn are preferably contained.

As a stabilizer, gallium (Ga), tin (Sn), hafnium (Hf), aluminum (Al), zirconium (Zr), and the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm) ytterbium (Yb), or lutetium (Lu) can be given.

As an oxide semiconductor included in an oxide semiconductor film, any of the followings can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

The input device 331 includes the wiring G1, the wiring RES, the wiring DL, and the like.

A conductive material can be used for the wiring G1, the wiring RES, the wiring DL, and the like.

For example, an inorganic conductive material, an organic conductive material, a metal material, a conductive ceramic material, or the like can be used for the wirings.

Specifically, a metal element selected from aluminum, gold, platinum, silver, chromium, tantalum, titanium, molybdenum, tungsten, nickel, iron, cobalt, yttrium, zirconium, palladium, and manganese; an alloy containing any of the above-described metal elements; an alloy including any of the above-described metal elements in combination: or the like can be used for the wirings and the like. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a stacked-layer structure in which an alloy film or a nitride film which Contains one or more elements selected from titanium, tantalum, tungsten, molybdenum, chromium, neodymium, and scandium is stacked over an aluminum film can be used.

Alternatively, a conductive oxide such as indium oxide, indium tin oxide, indium zinc oxide, zinc oxide, or zinc oxide to which gallium is added can be used.

Alternatively, graphene or graphite can be used. A film including graphene can be formed, for example, by reducing a film containing graphene oxide. As a reducing method, a method using heat, a method using a reducing agent, or the like can be employed.

Alternatively, a conductive macromolecule can be used.

<<Driver Circuit>>

The driver circuit 333g can supply a selection signal at predetermined timing, for example. Specifically, the driver circuit 333g supplies selection signals to the wirings G1 in a predetermined order. Various circuits can be used as the driver circuit 333g. A combination circuit such as a shift register, a flip-flop circuit, and the like can be used, for example.

The driver circuit 333d supplies sensing data on the basis of a sensing signal supplied by the sensor unit. Variety circuits can be used as the driver circuit 333d. For example, a circuit which can form a source follower circuit or a current mirror circuit by being electrically connected to a sensor circuit included in a sensor unit can be used as the driver circuit 333d. Furthermore, a digital-analog conversion circuit which converts a sensing signal into a digital signal may be provided <<Base Material>>

There is no particular limitation on the base material 610 as long as the base material 610 has heat resistance high enough to withstand a manufacturing process and a thickness and a size which can be used in a manufacturing apparatus. In particular, use of a flexible material as the base material 610 enables the input device 331 to be folded or unfolded. Note that in the case where the input device 331 is positioned on a side where the display device 301 displays an image, a light-transmitting material is used as the base material 610.

For the base material 610, an organic material, an inorganic material, a composite material of an organic material and an inorganic material, or the like can be used.

For example, an inorganic material such as glass, a ceramic, or a metal can be used for the base material 610.

Specifically, non-alkali glass, soda-lime glass, potash glass, crystal glass, or the like can be used for the base material 610.

Specifically, a metal oxide film, a metal nitride film, a metal oxynitride film, or the like can be used for the base material 610. For example, silicon oxide, silicon nitride, silicon oxynitride, an alumina film, or the like can be used for the base material 610.

For example, an organic material such as a resin, a resin film, or plastic can be used for the base material 610.

Specifically, a resin film or resin plate of polyester, polyamide, polyimide, polycarbonate, an acrylic resin, or the like can be used for the base material 610.

For example, a composite material such as a resin film to which a thin glass plate or a film of an inorganic material is attached can be used as the base material 610.

For example, a composite material formed by dispersing a fibrous or particulate metal, glass, inorganic material, or the like into a resin film can be used as the base material 610.

For example, a composite material formed by dispersing a fibrous or particulate resin, organic material, or the like into an inorganic material can be used as the base material 610.

A single-layer material or a stacked-layer material in which a plurality of layers are stacked can be used for the base material 610. For example, a stacked-layer material including a base material and an insulating layer that prevents diffusion of impurities contained in the base material can be used for the base material 610.

Specifically, a stacked-layer material in which glass and one or a plurality of films that prevent diffusion of impurities contained in the glass and that are selected from a silicon oxide film, a silicon nitride film, a silicon oxynitride film, and the like are stacked can be used for the base material 610.

Alternatively, a stacked-layer material in which a resin and a film that prevents diffusion of impurities contained in the resin, such as a silicon oxide film, a silicon nitride film, a silicon oxynitride film, and the like are stacked can be used for the base material 610.

Specifically, a stack including a base material 610b having flexibility, a barrier film 610a inhibiting diffusion of impurities, and a resin layer 610c attaching the base material 610b to the barrier film 610a can be used (see FIG. 15A).

<<Flexible Printed Board>>

The flexible printed circuit board FPC1 supplies a timing signal, a power supply potential, and the like, and is supplied with a sensing signal (FIG. 14).

<<Display Portion>>

The display device 301 includes the pixel 502, scan lines, signal lines, and a base material 510 (see FIG. 14).

Note that the display device 301 may be formed in such a manner that films for forming the display device 301 are deposited over the base material 510 and the films are processed.

The display device 301 may be formed in such a manner that part of the display device 301 is formed over another base material and the part is transferred to the base material 510.

<<Pixel>>

The pixel 502 includes a sub-pixel 502B, a sub-pixel 502G, and a sub-pixel 502R, and each sub-pixel includes a display element and a pixel circuit for driving the display element.

<<Pixel Circuit>>

An active matrix method in which an active element is included in a pixel or a passive matrix method in which an active element is not included in a pixel can be employed for the display portion.

In an active matrix method, as an active element (a non-linear element), not only a transistor but also various active elements (non-linear elements) can be used. For example, an MIM (metal insulator metal), a TFD (thin film diode), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

The pixel circuit includes a transistor 502t, for example.

The display device 301 includes an insulating film 521 covering the transistor 502t. The insulating film 521 can be used as a layer for planarizing unevenness caused by the pixel circuit. A stacked-layer film including a layer that can prevent diffusion of impurities can be used as the insulating film 521. This can prevent the reliability of the transistor 502t or the like from being lowered by diffusion of unintentional impurities.

<<Display Element>>

Various display elements can be used for the display device 301. For example, display elements (electronic ink) that perform display by an electrophoretic method, an electrowetting method, or the like, MEMS shutter display elements, optical interference type MEMS display elements, and liquid crystal elements can be used.

Alternatively, display elements which can be used for a transmissive liquid crystal display, a transflective liquid crystal display, a reflective liquid crystal display, a direct-view liquid crystal display, and the like can be used.

For example, organic electroluminescent elements that emit light of different colors may be included in sub-pixels.

For example, an organic electroluminescence element which emits white light can be used.

For example, a light-emitting element 550R includes a lower electrode, an upper electrode, and a layer containing a light-emitting organic compound between the lower electrode and the upper electrode.

The sub-pixel 502R includes a light-emitting module 580R. The sub-pixel 502R includes the light-emitting element 550R and the pixel circuit that can supply power to the light-emitting element 550R and includes the transistor 502t. Furthermore, the light-emitting module 580R includes the light-emitting element 550R and an optical element (e.g., the coloring layer CFR).

Note, that to efficiently extract light having a predetermined wavelength, a microresonator structure may be provided in the light-emitting module 580R. Specifically, a layer containing a light-emitting organic compound may be provided between a film which reflects visible light and a semi-transmissive and semi-reflective film which are arranged to efficiently extract the predetermined light.

The light-emitting module 580R includes the coloring layer CFR on the light extraction side. The coloring layer transmits light of a particular wavelength and is, for example, a layer that selectively transmits light of red, green, or blue color. Note that other sub-pixels may be provided so as to overlap with the window portions, which are not provided with the coloring layers, so that light from the light-emitting element can be emitted without passing through the coloring layers.

The coloring layer CFR is positioned in a region overlapping with the light-emitting element 550R. Accordingly, part of light emitted from the light-emitting element 550R passes through the coloring layer CFR and is emitted to the outside of the light-emitting module 580R as indicated by an arrow in FIG. 15A.

The light-blocking layer BM is located so as to surround the coloring layer (e.g., the coloring layer CFR).

Note that in the case where a sealant 560 is provided on a side from which light is extracted, the sealant 560 may be in contact with the light-emitting element 550R and the coloring layer CFR.

The lower electrode is provided over the insulating film 521. A partition 528 with an opening overlapping the lower electrode is provided. Note that part of the partition 528 overlaps an end portion of the lower electrode.

The lower electrode is included in the light-emitting element (e.g., the light-emitting element 550R); the layer containing a light-emitting organic compound is provided between the upper electrode and the lower electrode. The pixel circuit supplies power to the light-emitting element.

Over the partition 528, a spacer that controls the gap between the base material 610 and the base material 510 is provided.

In the case of a transflective liquid crystal display or a reflective liquid crystal display, some of or all of pixel electrodes function as reflective electrodes. For example, some or all of pixel electrodes are formed to contain aluminum, silver, or the like.

A memory circuit such as an SRAM can be provided under the reflective electrodes. Thus, the power consumption can be further reduced. A structure suitable for employed display elements can be selected from among a variety of structures of pixel circuits.

<<Base Material>>

A flexible material can be used for the base material 510. For example, a material which is similar to the material that can be used for the base material 610 can be used for the base material 510.

Note that in the case where the base material 510 need not have a light-emitting property, for example, a material which does not have a light-emitting property, specifically, SUS, aluminum, or the like, can be used.

A stack in which a flexible base 510b, a barrier film 510a that prevents diffusion of impurities, and a resin layer 510c that bonds the barrier film 510a to the base 510b are stacked can be favorably used for the base 510, for example (see FIG. 15A).

<<Sealant>>

The sealant 560 bonds the base material 610 to the base material 510. The sealant 560 has a refractive index higher than that of air.

Note that the pixel circuits and the light-emitting elements (e.g., a light-emitting element 550R) are provided between the base material 510 and the base material 610.

<<Structure or Scan Line Driver Circuit>>

The scan line driver circuit 503g supplies a selection signal. The scan line driver circuit 503g includes a transistor 503t and a capacitor 503c. Note that transistors used in the pixel circuit and the driver circuit can be formed in the same process and over the same substrate.

<<Wiring>>

The display device 301 includes wirings such as scan lines, signal lines, and power supply lines. Various conductive films can be used. For example, a material similar to that of the conductive film that can be used for the input device 331 can be used.

The display device 301 includes the wiring 511 through which a signal can be supplied. The wiring 511 is provided with the terminal 519. Note that the flexible printed substrate FPC2 through which a signal such as an image signal or a synchronization signal can be supplied is electrically connected to the terminal 519.

Note that a printed wiring board (PWB) may be attached to the flexible printed substrate FPC2.

<<Other Component>>

The input/output device 500 includes the antireflective layer 670*p* positioned in a region overlapping the pixel. As the antireflective layer 670*p*, a circular polarizing plate can be used, for example.

<Modification Example of Input/Output Device>

Various transistors can be used for the input device 331 and/or the display device 301.

FIG. 15A illustrates a structure in which a bottom-gate transistor is used for the input device 331.

A structure of the case of using bottom-gate transistors in the display device 301 is illustrated in FIGS. 15A and 15B.

For example, a semiconductor layer containing an oxide semiconductor, amorphous silicon, or the like can be used in the transistor 502*t* and the transistor 503*t* illustrated in FIG. 15A.

For example, a semiconductor layer containing polycrystalline silicon that is obtained by crystallization process such as laser annealing can be used in the transistor 502*t* and the transistor 503*t* illustrated in FIG. 15B.

A structure in the case of using top-gate transistors in the display device 301 is illustrated in FIG. 15C.

For example, a semiconductor layer containing polycrystalline silicon, a single crystal silicon film that is transferred from a single crystal silicon substrate, or the like can be used in the transistor 502*t* and the transistor 503*t* illustrated in FIG. 15C.

This embodiment can be combined with any of the other embodiments in this specification as appropriate.

Embodiment 4

In this embodiment, the configuration and a driving method of an input device that can be used for the input/output device of one embodiment of the present invention are described with reference to FIGS. 16A to 16D2 and FIG. 17.

FIGS. 16A to 16D2 illustrate a configuration of the input device 331 of one embodiment of the present invention.

FIG. 16A is a block diagram illustrating the configuration of the input device 331 of one embodiment of the present invention. FIG. 16B is a circuit diagram illustrating the configuration of a converter CONV, and FIG. 16C is a circuit diagram illustrating the configuration of the sensor unit 602. FIGS. 16D1 and 16D2 are each a timing chart showing a method for driving the sensor unit 602.

<Configuration Example of Input Device>

The input device 331 described in this embodiment includes the sensor units 602, the input portion 332 in which the sensor units 602 are arranged in matrix, the wirings G1 arranged in a row direction, the wirings DL arranged in a column direction, the driver circuit 333*g* to which the wirings G1 are electrically connected, and the driver circuit 333*d* to which the wirings DL are electrically connected (see FIG. 16A). For example, the sensor units 602 may be arranged in a matrix of n rows and m columns (n and m are natural numbers greater than or equal to 1).

<<Sensor Circuit 19>>

The sensor unit 602 includes a sensor circuit 19. The sensor circuit 19 includes a transistor M1, a transistor M2, a transistor M3, a sensor element C1, and a node A (FIG. 16C). In addition, the sensor circuit 19 is electrically connected to a wiring VRES, the wiring RES, the wiring G1, the wiring DL, a wiring CS, and a wiring VPI.

A first electrode of the sensor element C1 is electrically connected to the node A, and a second electrode of the sensor element C1 is electrically connected to the wiring CS. A gate of the transistor M1 is electrically connected to the node A, one of a source and a drain of the transistor M1 is electrically connected to the wiring VPI, and the other of the source and the drain of the transistor M1 is electrically connected to the wiring DL through the transistor M2. The node A is electrically connected to the wiring VRES through the transistor M3. A gate of the transistor M2 is electrically connected to the wiring G1. A gate of the transistor M3 is electrically connected to the wiring RES.

The capacitance of the sensor element C1 is changed, for example, when an object approaches the first electrode or the second electrode of the sensor element C1 or when the distance between the first electrode and the second electrode of the sensor element C1 is changed. Thus, the sensor circuit 19 has a function of supplying a sensing signal DATA based on the change in the capacitance of the sensor element C1.

The wiring CS has a function of supplying a signal which controls the potential of the second electrode of the sensor element C1.

The wiring VPI has a function of supplying a predetermined potential. For example, the wiring VPI has a function of supplying a ground potential, a low power supply potential, or a high power supply potential.

The wiring VRES has a function of supplying, for example, a potential which enables the transistor M1 to be turned on.

The wiring VRES has a function of supplying a reset signal.

The wiring G1 has a function of supplying a selection signal.

The wiring DL has a function of supplying the sensing signal DATA to the converter CONV.

The driver circuit 333*g* has a function of supplying selection signals to the wirings G1 in a predetermined order. The driver circuit 333*d* includes a converter circuit. The converter circuit has a function of converting a change in current flowing in the wiring DL into a change in voltage.

<<Converter CONV>>

The driver circuit 333*d* includes a plurality of converters CONV. Each converter CONV preferably has a function of converting the sensing signal DATA supplied from the wiring DL and supplying the converted signal to a terminal OUT. For example, a source follower circuit, a current mirror circuit, or the like may be formed by the electrical connection between the converter CONV and the sensor circuit 19.

Specifically, a source follower circuit may be formed using the converter CONV including the transistor M4 (see FIG. 16B). For example, it is preferable that a wiring VPO and a wiring BR supply a potential that is high enough to drive the transistors included in the converter circuit and the sensor circuit.

Figure 17:
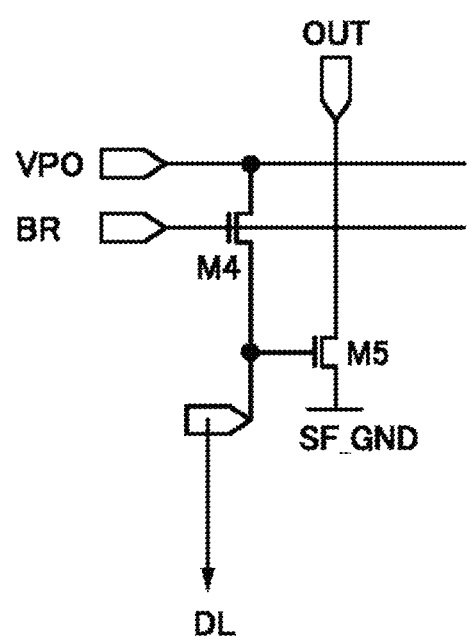
FIG. 17 illustrates a configuration of a converter of one embodiment.

As illustrated in FIG. 17, the converter CONV may include the transistors M4 and M5. Note that the transistor M4 and the transistors M1 to M3 may be formed by the same process.

The transistors M1 to M3 each include a semiconductor layer. For example, a Group 4 element, a compound semiconductor, or an oxide semiconductor is preferably used for the semiconductor layer. Specifically, a semiconductor containing silicon, a semiconductor containing gallium arsenide, an oxide semiconductor containing indium, or the like is preferably used.

<Driving Method of Sensor Circuit 19>

Next, a method for driving the sensor circuit 19 is described.

<<First Step>>

At a first step, the transistor M3 is turned on, and then a reset signal for turning off a transistor is supplied to the gate or the transistor M3, so that the potential of the node A is set to a predetermined potential. Specifically, the reset signal is supplied to the wiring RES, and the potential of the node A is set to a potential at which the transistor M1 can be turned on, for example (see Period P1 in FIG. 16D1).

<<Second Step>>

At a second step, a selection signal for turning on the transistor M2 is supplied to the gate of the transistor M2, so that the other of the source and the drain of the transistor M1 is electrically connected to the wiring DL. Specifically, the selection signal is supplied to the wiring G1 (see Period P2 in FIG. 16D1).

<<Third Step>>

At a third step, a control signal is supplied to the second electrode of the sensor element C1, so that the potential that varies depending on the control signal and the capacitance of the sensor element C1 is supplied to the node A. Specifically, a rectangular control signal is supplied to the wiring CS. The sensor element C1 raises the potential of the node A on the basis of the capacitance of the sensor element C1 (see the latter half of Period P2 in FIG. 16D1).

For example, in the case where the sensor element C1 is put in the air, when an object whose dielectric constant is higher than that of the air is placed in the proximity of the second electrode of the sensor element C1, the apparent capacitance of the sensor element C1 is increased. Specifically, when an object such as a finger approaches the sensor element C1, the apparent capacitance of the sensor element C1 is increased. As a result, a change in the potential of the node A is smaller than that when an object having a higher dielectric constant than the air is not placed in the proximity of the second electrode of the sensor element C1 (see a solid line in FIG. 16D2).

<<Fourth Step>>

At a fourth step, a signal due to the change in the potential of the node A is supplied to the wiring DL. For example, a change in a current due to the change in the potential of the node A is supplied to the wiring DL.

The converter CONV converts the change in the current flowing through the wiring DL into a change in voltage and supplies the voltage.

<<Fifth Step>>

At a fifth step, a selection signal for turning off the transistor M2 is supplied to the wiring G1.

The first to fifth steps are repeated for every row of the wiring G1(1) to G1(n).

This embodiment can be combined with any of the other embodiments in this specification as appropriate.

Embodiment 5

In this embodiment, an example of an optical touch sensor which can be used for the input device 331 is described with reference to FIGS. 18A to 18D.

FIGS. 18A to 18D illustrate a configuration of the input device 331 of one embodiment of the present invention.

Figure 18A:
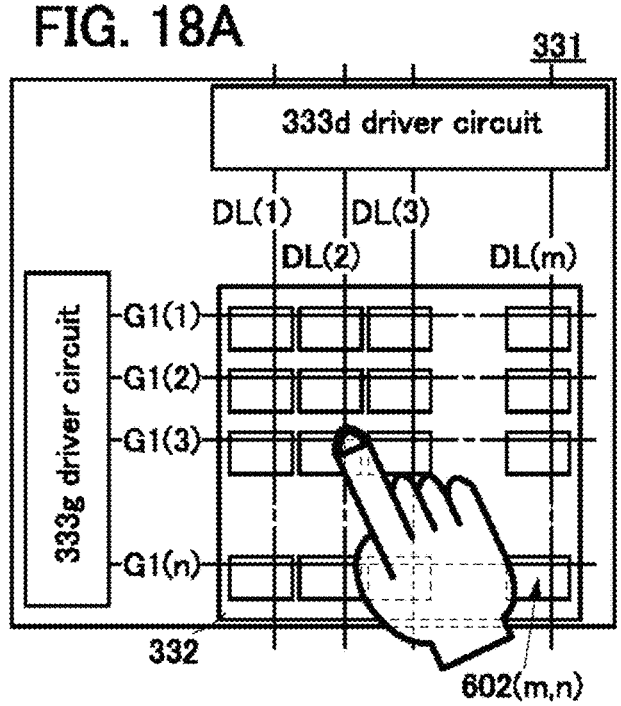
FIGS. 18A to 18D illustrate the configuration and driving methods of a sensor circuit and a converter of one embodiment.
Figure 18B:
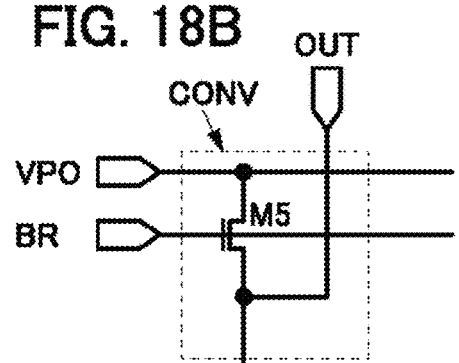
Figure 18C:
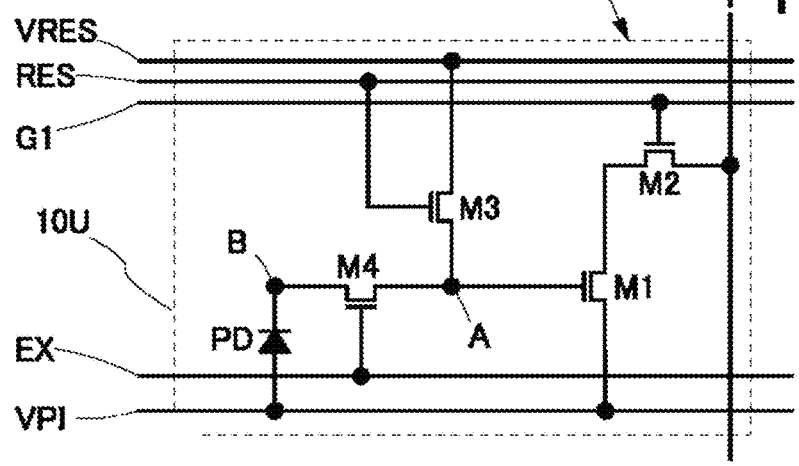
Figure 18D:
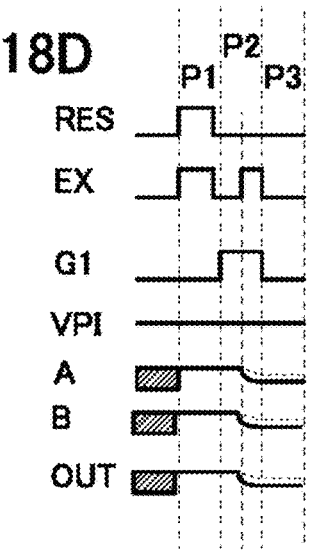

FIG. 18A is a block diagram illustrating a configuration of the input device 331 of one embodiment of the present invention. FIG. 18B is a circuit diagram illustrating a configuration of the converter CONV which can be used in the input device 331. FIG. 18C is a circuit diagram illustrating a configuration of the sensor circuit 19 which can be used in the input device 331. FIG. 18D is a timing chart showing a method of driving the sensor circuit 19.

<Configuration Example of Input Device>

The input device 331 described in this embodiment includes the sensor units 602, the input portion 332 in which the sensor units 602 are arranged in matrix, the wirings G1 arranged in a row direction, the wirings DL arranged in a column direction, the driver circuit 333g to which the wirings G1 are electrically connected, and the driver circuit 333d to which the wirings DL are electrically connected (see FIG. 18A). For example, the sensor units 602 may be arranged in a matrix of n rows and m columns (n and m are natural numbers greater than or equal to 1).

<<Sensor Circuit 19>>

The sensor unit 602 is provided with the sensor circuit 19. The sensor circuit 19 includes the transistor M1, the transistor M2, the transistor M3, the transistor M4, a sensor element PD, the node A, and a node B. In addition, the sensor circuit 19 is electrically connected to the wiring DL, the wiring VPI, the wiring G1, the wiring RES, the wiring VRES, and a wiring EX.

A first electrode of the sensor element PD is electrically connected to the node B, and a second electrode of the sensor element PD is electrically connected to the wiring VPI. The node B is electrically connected to the node A through the transistor M4. A gate of the transistor M4 is electrically connected to the wiring EX. The node A is electrically connected to the wiring VRES through the transistor M3. The gate of the transistor M3 is electrically connected to the wiring RES. The gate of the transistor M1 is electrically connected to the node A, one the source and the drain of the transistor M1 is electrically connected to the wiring VPI, and the other of the source and the drain of the transistor M1 is electrically connected to the wiring DL through the transistor M2. The gate of the transistor M2 is electrically connected to the wiring G1.

The sensor element PD includes a photoelectric conversion element. For example, a photodiode may be used as the sensor element PD. Specifically, silicon may be used for a semiconductor layer. In particular, a photodiode in which p-type amorphous silicon, i-type amorphous silicon, and n-type amorphous silicon are stacked is preferably used.

The wiring G1 has a function of supplying a selection signal.

The wiring DL has a function of supplying a sensing signal.

The wiring VRES has a function of supplying a predetermined potential. For example, the wiring VRES has a function of supplying a potential at which the transistor M1 is turned on to the node A.

The wiring RES has a function of supplying a reset signal.

The wiring VPI has a function of supplying a predetermined potential. For example, the wiring VPI has a function of supplying a ground potential, a low power supply potential, or a high power supply potential.

The wiring EX has a function of supplying a light exposure control signal.

The driver circuit 333g has a function of supplying selection signals to the wirings G1 in a predetermined order. The driver circuit 333d includes a converter circuit. The converter circuit has a function of converting a change in current flowing in the wiring DL into a change in voltage.

<<Converter CONV>>

The driver circuit 333d includes a plurality of converters CONV. Each converter CONV preferably has a function of converting the sensing signal DATA supplied from the wiring DL and supplying the converted signal to the terminal OUT. For example, a source follower circuit, a current mirror circuit, or the like may be formed by the electrical connection between the convener CONV and the sensor circuit 19.

Specifically, a source follower circuit may be formed using the converter CONV including the transistor M5 (see FIG. 18B). For example, it is preferable that the wiring VPO and the wiring BR supply a potential that is high enough to drive the transistors included in the converter circuit and the sensor circuit. In addition, the potential supplied by the wiring VPO is preferably lower than the potential supplied by the wiring VPI. Note that the transistor M5 and the transistors M1 to M4 may be formed by the same process.

The transistors M1 to M5 each include a semiconductor layer. For example, a Group 4 element, a compound semiconductor, or an oxide semiconductor is preferably used for the semiconductor layer. Specifically, a semiconductor containing silicon, a semiconductor containing gallium arsenide, an oxide semiconductor containing indium, or the like may be used.

<Driving Method of Sensor Circuit 19>

Next, a method 2 for driving the sensor circuit 19 which can supply the sensing signal DATA on the basis of a change in the electromotive force of the sensor element PD is described.

<<First Step>>

At a first step, a reset signal for turning on the transistor M3 and then turning it off is supplied, so that the potential of the node A is set to a predetermined potential (see Period P1 in FIG. 18D).

Specifically, the reset signal is supplied to the wiring RES. The transistor M3 to which the reset signal is supplied sets the potential of the node A to a potential which enables the transistor M1 to be turned on, for example.

Furthermore, a light exposure control signal for turning on the transistor M4 may be supplied to the wiring EX in synchronization with the reset signal, so that the potential of the node B may be set to a predetermined potential. Specifically, a rectangular light exposure control signal may be supplied to the wiring EX so that the potential of the gate of the transistor M4 is set to a potential sufficiently higher than the threshold voltage of the transistor M4 for a predetermined period.

Note that the first steps in all the sensor units 602 may be performed concurrently.

<<Second Step>>

At a second step, a light exposure control signal for turning off the transistor M4 is supplied to the wiring EX. For example, a ground potential may be supplied to the wiring EX.

<<Third Step>>

At a third step, a selection signal for turning on the transistor M2 is supplied to the wiring G1, so that the other of the source and the drain of the transistor M1 is electrically connected to the wiring DL (see Period P2 in FIG. 18D).

<<Fourth Step>>

At a fourth step, a light exposure control signal turning on the transistor M4 for a predetermined period is supplied to the wiring EX.

The electromotive force of the sensor element PD is changed depending on the intensity of light with which the sensor element PD is irradiated. Furthermore, a current flowing in the sensor element PD is changed depending on the electromotive force of the sensor element PD.

For example, in the case where the sensor element PD is in a bright environment, an electromotive force is generated in the sensor element PD, so that current flows in the sensor element PD. As a result, the potentials of the nodes A and B decrease (solid lines in Periods P2 and P3 in FIG. 18D).

For example, in the case where an object which blocks light for irradiating the sensor element PD is provided near the sensor element PD, the intensity of the irradiation light decreases, so that the electromotive force of the sensor element PD also decreases. Specifically, when an object such as a finger approaches the sensor element PD, the electromotive force of the sensor element PD decreases. As a result, as compared with the case where the sensor element PD is in a bright environment, decrease in the potentials of the nodes A and B is small (dotted lines in Periods P2 and P3 in FIG. 18D).

Furthermore, at the fourth step, a sensing signal DATA due to the change in the potential of the node A is supplied to the wiring DL. Specifically, a selection signal for turning on the transistor M2 is supplied to the wiring G1 (see Period P2 in FIG. 18D).

The converter CONV converts a change in the current flowing through the wiring DL into a change in voltage and outputs the voltage to the terminal OUT.

<<Fifth Step>>

At a fifth step, a selection signal for turning off the transistor M2 is supplied to the wiring G1. Specifically, a ground potential is applied to the wiring G1 (see Period P3 in FIG. 18D).

Subsequently, the wirings G1(1) to G1(*n*) are sequentially selected. In the case where the wiring G1(1) is selected, the first to fifth steps are executed, whereas in the case where the wirings G1(2) to G1(*n*) are selected, the second to fifth steps are executed.

This embodiment can be combined with any of the other embodiments in this specification as appropriate.

Embodiment 6

In this embodiment, electronic appliances and lighting devices to which one embodiment of the present invention can be applied are described with reference to FIGS. 19A to 19F and FIGS. 20A to 20I.

An input/output device (touch panel) of one embodiment of the present invention has flexibility. Therefore, an input/output device of one embodiment of the present invention can be used in electronic appliances and lighting devices having flexibility. Furthermore, according to one embodiment of the present invention, electronic appliances and lighting devices having high reliability and resistance against repeated bending can be manufactured.

Examples of electronic appliances include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a ball machine, and the like.

The input/output device of one embodiment of the present invention has flexibility and therefore can be incorporated along a curved inside/outside wall surface of a house or a building or a curved interior/exterior surface of a car.

Figure 19A:
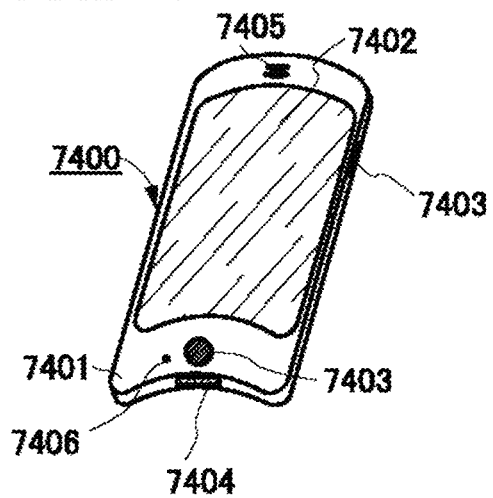
FIGS. 19A to 19F illustrate examples of electronic appliances and lighting devices.

FIG. 19A illustrates an example of a mobile phone. The mobile phone 7400 is provided with a display portion 7402 incorporated in a housing 7401, operation buttons 7403, an external connection port 7404, a speaker 7405, a microphone 7406, and the like. Note that the mobile phone 7400 is manufactured by using the input/output device of one embodiment of the present invention for the display portion 7402. In accordance with one embodiment of the present invention, a highly reliable mobile phone having a curved display portion can be provided at a high yield.

When the display portion 7402 of the mobile phone 7400 illustrated in FIG. 19A is touched with a finger or the like, data can be input into the mobile phone 7400. Further, operations such as making a call and inputting a letter can be performed by touch on the display portion 7402 with a finger or the like.

With the operation buttons 7403, power on or off can be switched. In addition, types of images displayed on the display portion 7402 can be switched; switching images from a mail creation screen to a main menu screen.

Figure 19B:
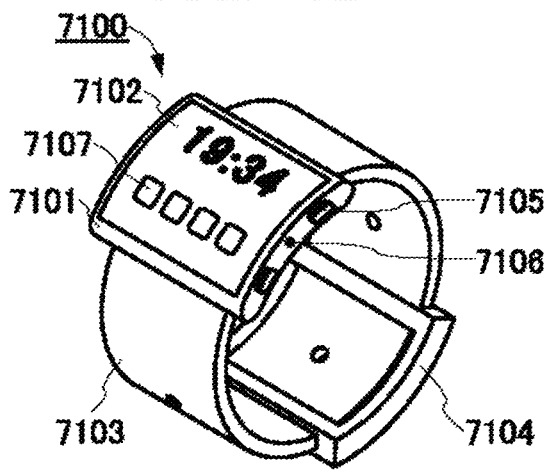

FIG. 19B illustrates an example of a wrist-watch-type portable information terminal. A portable information terminal 7100 includes a housing 7101, a display portion 7102, a band 7103, a buckle 7104, an operation button 7105, an input/output terminal 7106, and the like.

The portable information terminal 7100 is capable of executing a variety of applications such as mobile phone calls, e-mailing, reading and editing texts, music reproduction, Internet communication, and a computer game.

The display surface of the display portion 7102 is bent, and images can be displayed on the bent display surface. Furthermore, the display portion 7102 includes a touch sensor, and operation can be performed by touching the screen with a finger, a stylus, or the like. For example, by touching an icon 7107 displayed on the display portion 7102, an application can be started.

With the operation button 7105, a variety of functions such as time setting, power on/off, on/off of wireless communication, setting and cancellation of manner mode, and setting and cancellation of power saving mode can be performed. For example, the functions of the operation button 7105 can be set freely by setting the operation system incorporated in the portable information terminal 7100.

The portable information terminal 7100 can employ near field communication that is a communication method based on an existing communication standard. In that case, for example, mutual communication between the portable information terminal 7100 and a headset capable of wireless communication can be performed, and thus hands-free calling is possible.

Moreover, the portable information terminal 7100 includes the input/output terminal 7106, and data can be directly transmitted to and received from another information terminal via a connector. Charging through the input/output terminal 7106 is possible. Note that the charging operation may be performed by wireless power feeding without using the input/output terminal 7106.

The display portion 7102 of the portable information terminal 7100 includes the input/output device of one embodiment of the present invention. According to one embodiment of the present invention, a highly reliable portable information terminal having a curved display portion can be provided with a high yield.

Figure 19C:
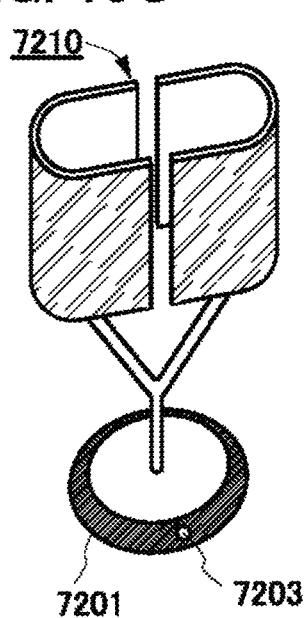

FIG. 19C illustrates an example of a lighting device. A lighting devices 7210 includes a stage 7201 provided with an operation switch 7203 and a light-emitting portion supported by the stage 7201.

The light-emitting portion included in the lighting device 7210 is flexible; thus, the light-emitting portion may be fixed on a plastic member, a movable frame, or the like so that an emission surface of the light-emitting portion can be bent freely depending on the intended use.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a depressed shape, whereby a particular region can be brightly illuminated, or the light-emitting surface is curved to have a projecting shape, whereby a whole room can be brightly illuminated.

Here, the light-emitting portion includes the input/output device of one embodiment of the present invention. In accordance with one embodiment of the present invention, a highly reliable lighting device having a curved display portion can be provided at a high yield of production.

Figure 19D:
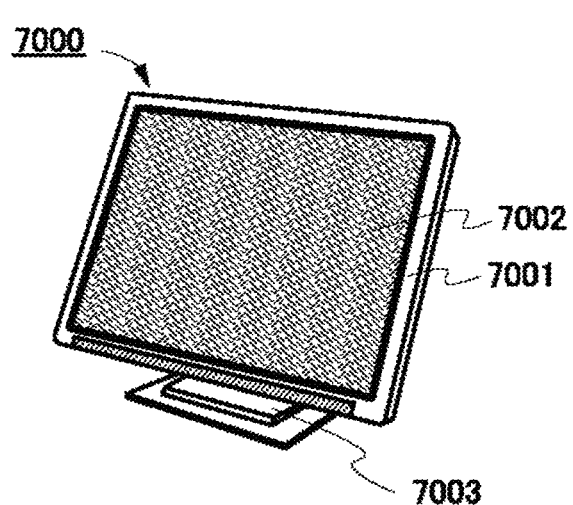

An electronic appliance and a lighting device in which one embodiment of the present invention is used are not limited to those having flexibility. FIG. 19D illustrates an example of a display device. A display device 7000 includes a housing 7001, a display portion 7002, a support base 7003, and the like. The input/output device of one embodiment of the present invention can be incorporated in the display portion 7002. Note that the display device 7000 includes all of display devices for displaying information such as those for personal computers, television broadcast reception, and advertisement display.

Figure 19E:
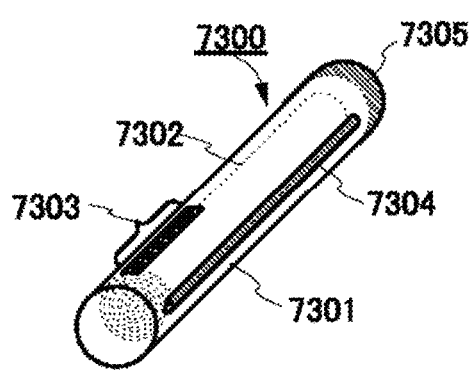

FIG. 19E illustrates an example of a portable touch panel. A touch panel 7300 includes a housing 7301, a display portion 7302, operation buttons 7303, a display portion pull 7304, and a control portion 7305.

The touch panel 7300 includes a rolled flexible display portion 7302 in the cylindrical housing 7301.

The touch panel 7300 can receive a video signal with the control portion 7305 and can display the received video on the display portion 7302. In addition, a battery is included in the control portion 7305. Moreover, a terminal portion for connecting a connector may be included in the control portion 7305 so that a video signal or power can be directly supplied from the outside with a wiring.

By pressing the operation buttons 7303, power on/off, switching of displayed videos, and the like can be performed.

Figure 19F:
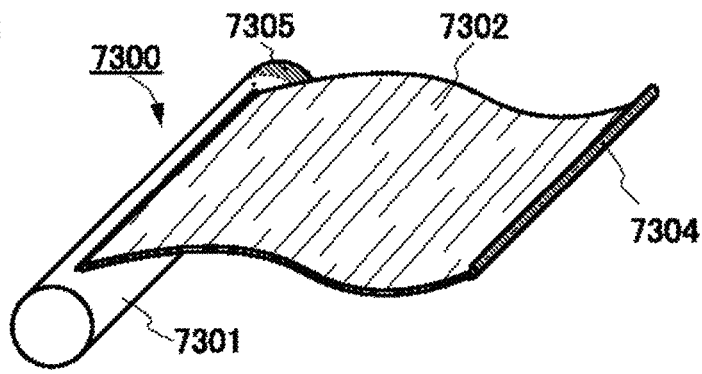

FIG. 19F illustrates a touch panel 7300 in a state where the display portion 7302 is pulled out with the display portion pull 7304. Videos can be displayed on the display portion 7302 in this state. Further, the operation buttons 7303 on the surface of the housing 7301 allow one-handed operation. The operation buttons 7303 are provided not in the center of the housing 7301 but on one side of the housing 7301 as illustrated in FIG. 19E, which makes one-handed operation easy.

Note that a reinforcement frame may be provided for a side portion of the display portion 7302 so that the display portion 7302 has a flat display surface when pulled out.

Note that in addition to this structure, a speaker provided for the housing so that sound is output with an audio signal received together with a video signal.

The display portion 7302 includes the input/output device of one embodiment of the present invention. According to one embodiment of the present invention, a lightweight and highly reliable touch panel can be provided with a high yield of production.

Figure 20A:
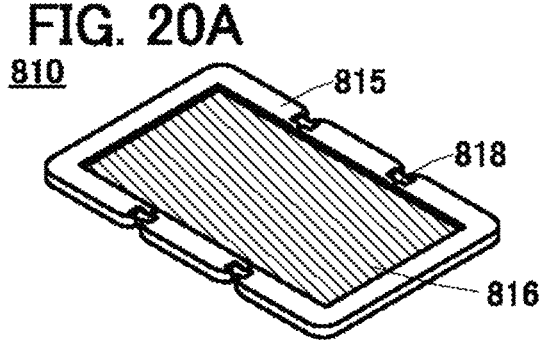
FIGS. 20A to 20I are examples of a lighting device.
Figure 20B:
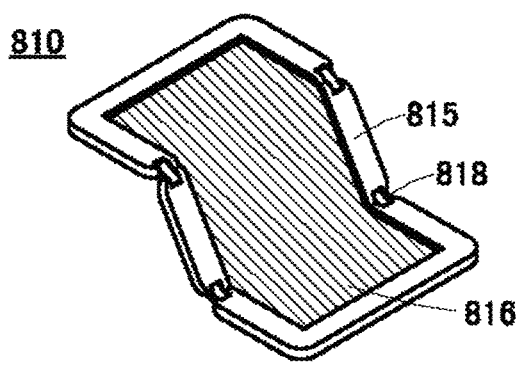
Figure 20C:
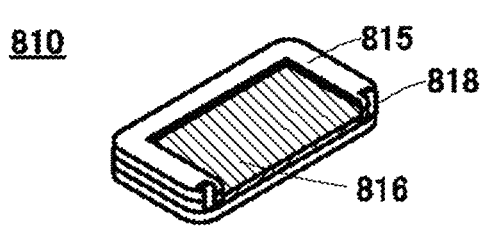

FIGS. 20A to 20C illustrate a foldable portable information terminal 810. FIG. 20A illustrates the portable information terminal 810 that is opened. FIG. 20B illustrates the portable information terminal 810 that is being opened or being folded. FIG. 20C illustrates the portable information terminal 810 that is folded. The portable information terminal 810 is highly portable when folded. When the portable information terminal 810 is opened, a seamless large display region is highly browsable.

A display panel 816 is supported by three housings 815 joined together by hinges 818. By folding the portable information terminal 810 at a connection portion between two housings 815 with the hinges 818, the portable information terminal 810 can be reversibly changed in shape from an opened state to a folded state. The input/output device according to one embodiment of the present invention can be used for the display panel 816. For example, a touch panel that can be bent with a radius of curvature of greater than or equal to 1 mm and less than or equal to 150 mm can be used.

Note that in one embodiment of the present invention, a sensor that senses whether the touch panel is in a folded state or an unfolded state and supplies sensing data may be used. The operation of a folded portion (or a portion that becomes invisible by a user by folding) of the touch panel may be stopped by a control device through the acquisition of data indicating the folded state of the touch panel. Specifically, display of the portion may be stopped, and furthermore, sensing by the touch sensor may be stopped.

Similarly, the control device of the touch panel may acquire data indicating the unfolded state of the touch panel to resume displaying and sensing by the touch sensor.

Figure 20D:
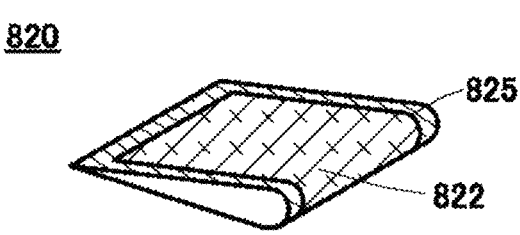
Figure 20E:
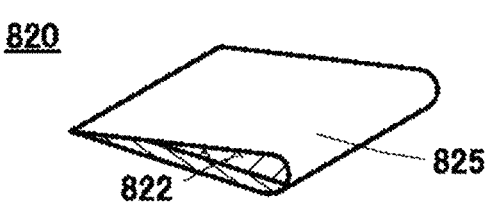

FIGS. 20D and 20E each illustrate a foldable portable information terminal 820. FIG. 20D illustrates the portable information terminal 820 that is folded so that a display portion 822 is on the outside. FIG. 20E illustrates the portable information terminal 820 that is folded so that the display portion 822 is on the inside. When the portable information terminal 820 is not used, the portable information terminal 820 is folded so that a non-display portion 825 faces the outside, whereby the display portion 822 can be prevented from being contaminated or damaged. The input/output device in one embodiment of the present invention can be used for the display portion 822.

Figure 20F:
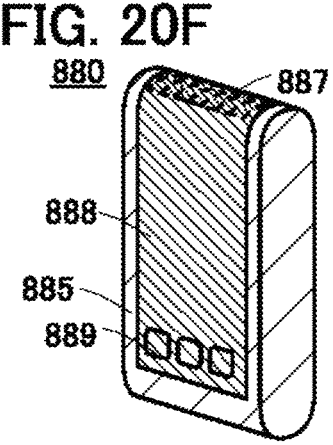
Figure 20G:
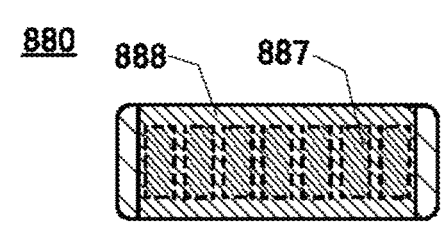
Figure 20H:
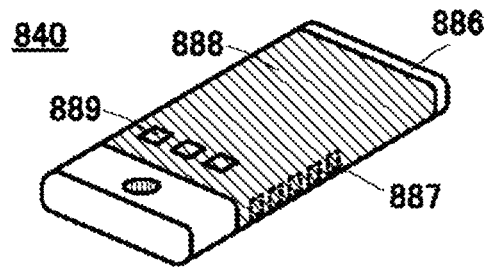

FIG. 20F is a perspective view illustrating an external shape of the portable information terminal 880. FIG. 20G is a top view of the portable information terminal 880. FIG. 20H is a perspective view illustrating an external shape of a portable information terminal 840.

The portable information terminals 880 and 840 each function as, for example, one or more of a telephone set, a notebook, and an information browsing system. Specifically, the portable information terminals 880 and 840 each can be used as a smartphone.

The portable information terminals 880 and 840 can display characters and image information on its plurality of surfaces. For example three operation buttons 889 can be displayed on one surface (FIGS. 20F and 20H). In addition, information 887 indicated by dashed rectangles can be displayed on another surface (FIGS. 20G and 20H). Examples of the information 887 include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation buttons 889, an icon, or the like may be displayed in place or the information 887. Although FIGS. 20F and 20G illustrate an example in which the information 887 is displayed at the top, one embodiment of the present invention is not limited thereto. The information may be displayed, for example, on the side as in the portable information terminal 840 illustrated in FIG. 20H.

For example, a user of the portable information terminal 880 can see the display (here, the information 887) with the portable information terminal 880 put in a breast pocket of his/her clothes.

Specifically, a caller's phone number, name, or the like of an incoming call is displayed in a position that can be seen from above the portable information terminal 880. Thus, the user can see the display without taking out the portable information terminal 880 from the pocket and decide whether to answer the call.

The input/output device of one embodiment of the present invention can be used in a display portion 888 which is included in each of a housing 885 of the portable information terminal 880 and a housing 886 of the portable information terminal 840. According to one embodiment of the present invention, a highly reliable touch panel having a curved display portion can be provided with a high yield.

Figure 20I:
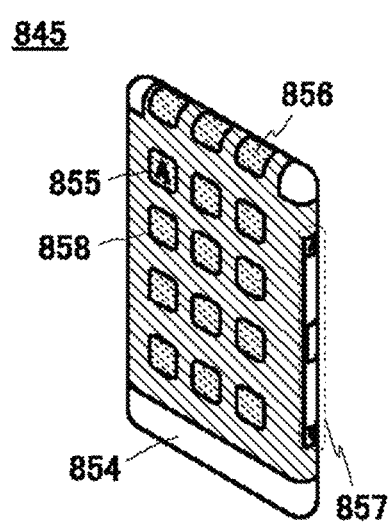

As in a portable information terminal 845 illustrated in FIG. 20I, data may be displayed on three or more surfaces. Here, data 855, data 856, and data 857 are displayed on different surfaces.

The input/output device of one embodiment of the present invention can be used for a display portion 858 included in a housing 854 of the portable information terminal 845. According to one embodiment of the present invention, a highly reliable touch panel having a curved display portion can be provided with a high yield.

The structure described above in this embodiment can be combined as appropriate with any of the structures described in the other embodiments.

Embodiment 7

In this embodiment, a structure of a transistor that can be used in a sensor circuit of one embodiment of the present invention or the like is described with reference to FIGS. 21A to 21C.

Figure 21A:
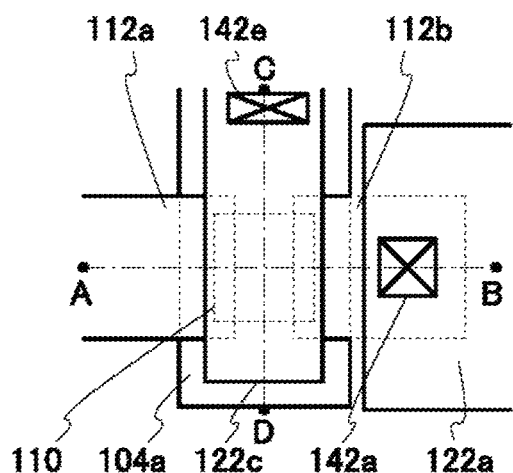
FIGS. 21A to 21C illustrate a top view and cross-sectional views of a transistor as an example.
Figure 21C:
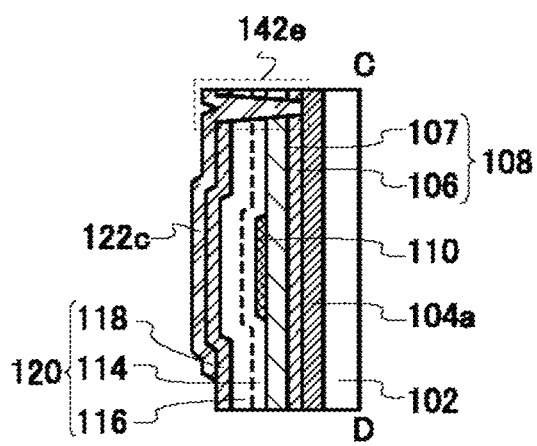
Figure 21B:
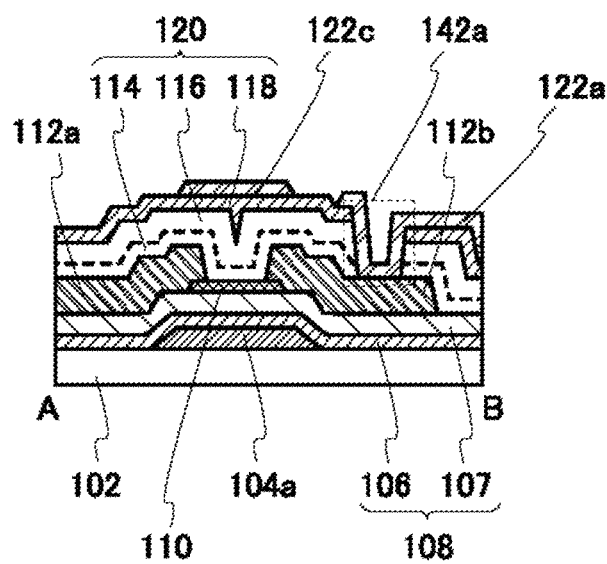

FIGS. 21A to 21C are a top view and cross-sectional views of a transistor 151. FIG. 21A is a top view of the transistor 151, FIG. 21B is a cross-sectional view taken along dashed-dotted line A-B in FIG. 21A, and FIG. 21C is a cross-sectional view taken along dashed-dotted line C-D in FIG. 21A. Note that in FIG. 21A, some components are not illustrated for clarity.

Note that in this embodiment, a first electrode refers to one of a source and a drain of a transistor, and a second electrode refers to the other.

The transistor 151 includes a gate electrode 104a provided over a substrate 102, a first insulating film 108 that includes insulating films 106 and 107 and is formed over the substrate 102 and the gate electrode 104a, an oxide semiconductor film 110 overlapping the gate electrode 104a with the first insulating film 108 provided therebetween, and a first electrode 112a and a second electrode 112b in contact with the oxide semiconductor film 110.

In addition, over the first insulating film 108, the oxide semiconductor film 110, the first electrode 112a, and the second electrode 112b, a second insulating film 120 including insulating films 114, 116, and 118 and a gate electrode 122c formed over the second insulating film 120 are provided.

The gate electrode 122c is connected to the gate electrode 104a in an opening 142e provided in the first insulating film 108 and the second insulating film 120. In addition, a conductive film 122a functioning as a pixel electrode is formed over the insulating film 118. The conductive film 122a is connected to the second electrode 112b through an opening 142a provided in the second insulating film 120.

Note that the gate electrode 122c may be referred to as a second gate electrode or a back gate electrode in this specification.

Note that the first insulating film 108 functions as a first gate insulating film of the transistor 151, and the second insulating film 120 functions as a second gate insulating film of the transistor 151. Furthermore, the conductive film 122a functions as a pixel electrode.

In the transistor 151 of one embodiment of the present invention, in the channel width direction, the oxide semiconductor film 110 between the first insulating film 108 and the second insulating film 120 is provided between the gate electrode 104a and the gate electrode 122c. In addition, as illustrated in FIG. 21A, the gate electrode 104a and side surfaces of the oxide semiconductor film 110 overlaps each other with the first insulating film 108 provided therebetween, when seen from the above.

A plurality of openings is provided in the first insulating film 108 and the second insulating film 120. Typically, as illustrated in FIG. 21B, the opening 142a through which part of the second electrode 112b is exposed is provided. Furthermore, the opening 142e is provided as illustrated in FIG. 21C.

In the opening 142a, the second electrode 112b is connected to the conductive film 122a.

In addition, in the opening 142e, the gate electrode 104a is connected to the gate electrode 122c.

When the gate electrode 104a and the gate electrode 122c are included and the same potential is applied to the gate electrode 104a and the gate electrode 122c, carriers flow in a wide region in the oxide semiconductor film 110. Accordingly, the amount of carriers that move in the transistor 151 increases.

As a result, the on-state current of the transistor 151 is increased, and the field-effect mobility is increased to greater than or equal to 10 cm$^2$/V·s or to greater than or equal to 20 cm$^2$/V·s, for example. Note that here, the field-effect mobility is not an approximate value of the mobility as the physical property of the oxide semiconductor film but is the apparent field-effect mobility in a saturation region of the transistor, which is an indicator of current drive capability.

An increase in field-effect mobility becomes significant when the channel length (also referred to as L length) of the transistor is longer than or equal to 0.5 μm and shorter than or equal to 6.5 μm, preferably longer than 1 μm and shorter than 6 μm, further preferably longer than 1 μm and shorter than or equal to 4 μm, still further preferably longer than 1 μm and shorter than or equal to 3.5 μm, yet still further preferably longer than 1 μm and shorter than or equal to 2.5 μm. Furthermore, with a short channel length longer than or equal to 0.5 μm and shorter than or equal to 6.5 μm, the channel width can also be short.

The transistor includes the gate electrode 104a and the gate electrode 122c, each of which has a function of blocking an external electric field; thus, fixed charges between the substrate 102 and the electrode 104a and over the gate electrode 122c do not affect the oxide semiconductor film 110. Thus, degradation due to a stress test (e.g., a negative gate bias temperature (−GBT) stress test in which a negative potential is applied to a gate electrode) can be reduced, and changes in the rising voltages of on-state current at different drain voltages can be suppressed.

The BT stress test is one kind of accelerated test and can evaluate, in a short time, change in characteristics (i.e., a change over time) of transistors, which is caused by long-term use. In particular, the amount of change in threshold voltage of a transistor between before and after the BT stress test is an important indicator when examining the reliability of the transistor. If the amount of change in the threshold voltage between before and after the BT stress test is small, the transistor has higher reliability.

The substrate 102 and individual components included in the transistor 151 are described below.

<<Substrate 102>>

For the substrate 102, a glass material such as aluminosilicate glass, aluminoborosilicate glass, and barium borosilicate glass is used. In the mass production, for the substrate 102, a mother glass with any of the following sizes is preferably used: the 8th generation (2160 mm×2460 mm), the 9th generation (2400 mm×2800 mm or 2450 mm×3050 mm), the 10th generation (2950 mm×3400 mm), and the like. High process temperature and a long period of process time drastically shrink the mother glass. Thus, in the case where mass production is performed with the use of the mother glass, it is preferable that the heat process in the manufacturing process be performed at a temperature lower than or equal to 600° C., preferably lower than or equal to 450° C., further preferably lower than or equal to 350° C.

<<Gate Electrode 104>>

As a material used for the gate electrode 104a, a metal element selected from aluminum, chromium, copper, tantalum, titanium, molybdenum, and tungsten, an alloy containing any of these metal elements as a component, an alloy containing these metal elements in combination, or the like can be used. The material used for the gate electrode 104a may have a single layer structure or a stacked structure of two or more layers. For example, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film over the titanium film, and a titanium film over the aluminum film are stacked, and the like can be given. Alternatively, an alloy film or a nitride film which contains aluminum and one or more elements selected from titanium, tantalum, tungsten, molybdenum, chromium, neodymium, and scandium may be used. The material used for the gate electrode 104a can be Formed by a sputtering method, for example.

<<First Insulating Film 108>>

An example in which the first insulating film 108 has a two-layer stacked structure of the insulating film 106 and the insulating film 107 is illustrated. Note that the structure of the first insulating film 108 is not limited thereto, and for example, the first insulating film 108 may have a single layer structure or a stacked structure of three or more layers.

The insulating film 106 is formed with a single layer structure or a stacked-layer structure using, for example, any of a silicon nitride oxide film, a silicon nitride film, an aluminum oxide film, and the like with a PE-CVD apparatus. In the case where the insulating film 106 has a stacked-layer structure, it is preferable that a silicon nitride film with fewer defects be provided as a first silicon nitride film, and a silicon nitride film from which hydrogen and ammonia are less likely to be released be provided over the first silicon nitride film, as a second silicon nitride film. As a result, hydrogen and nitrogen contained in the insulating film 106 can be inhibited from moving or diffusing into the oxide semiconductor film 110 to be formed later.

The insulating film 107 is formed with a single-layer structure or a stacked-layer structure using any of a silicon oxide film, a silicon oxynitride film, and the like with a PE-CVD apparatus.

The first insulating film 108 can have a stacked-layer structure, for example, in which a 400-nm-thick silicon nitride film used as the insulating film 106 and a 50-nm-thick silicon oxynitride film used as the insulating film 107 are formed in this order. The silicon nitride film and the silicon oxynitride film are preferably formed in succession in a vacuum, in which case entry of impurities is suppressed. The first insulating film 108 in a position overlapping with the gate electrode 104a serves as a gate insulating film of the transistor 151. Note that silicon nitride oxide refers to an insulating material that contains more nitrogen than oxygen, whereas silicon oxynitride refers to an insulating material that contains more oxygen than nitrogen.

<<Oxide Semiconductor Film 110>>

For the oxide semiconductor film 110 an oxide semiconductor is preferably used. As the oxide semiconductor, a film represented by an In-M-Zn oxide that contains at least indium (In), zinc (Zn), and M (a metal such as Al, Ga, Ge, Y, Zr, Sn, La, Ce, or Hf) is preferably included. Alternatively, both In and Zn are preferably contained. In order to reduce fluctuations in electrical characteristics of the transistors including the oxide semiconductor, the oxide semiconductor preferably contains a stabilizer in addition to In and Zn.

As a stabilizer, gallium (Ga), tin (Sn), hafnium (Hf), aluminum (Al), zirconium (Zr), and the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As the oxide semiconductor included in the oxide semiconductor film 110, any of the following can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

The oxide semiconductor film 110 can be formed by a sputtering method, a molecular beam epitaxy (MBE) method, a CVD method, a pulse laser deposition method, an atomic layer deposition (ALD) method, or the like as appropriate. In particular, the oxide semiconductor film 110 is preferably formed by the sputtering method because the oxide semiconductor film 110 can be dense.

In the formation of an oxide semiconductor film as the oxide semiconductor film 110, the hydrogen concentration in the oxide semiconductor film is preferably reduced as much as possible. To reduce the hydrogen concentration, for example, in the case of a sputtering method, a deposition chamber needs to be highly evacuated and also a sputtering gas needs to be highly purified. As an oxygen gas or an argon gas used for a sputtering gas, a gas which is highly purified to have a dew point of −40° C. or lower, preferably −80° C. or lower, further preferably −100° C. or lower, or still further preferably −120° C. or lower is used, whereby entry of moisture or the like into the oxide semiconductor film can be minimized.

For example, the hydrogen concentration at a certain depth of the oxide semiconductor film 110 or in a certain region of the oxide semiconductor film 110, which is measured by secondary ion mass spectrometry (SIMS), is higher than or equal to $1\times10^{16}$ atoms/cm$^3$ and lower than or equal to $2\times10^{20}$ atoms/cm$^3$, preferably higher than or equal to $1\times10$ atoms/cm$^3$ and lower than or equal to $5\times10^{19}$ atoms/cm$^3$, further preferably higher than or equal to $1\times10^{16}$ atoms/cm$^3$ and lower than or equal to $1\times10^{19}$ atoms/cm$^3$, still further preferably higher than or equal to $1\times10^{16}$ atoms/cm$^3$ and lower than or equal to $5\times10^{18}$ atoms/cm$^3$.

In order to remove moisture remaining in the deposition chamber, an entrapment vacuum pump, such as a cryopump, an ion pump, or a titanium sublimation pump, is preferably used. A turbo molecular pump provided with a cold trap may be alternatively used. When the deposition chamber is evacuated with a cryopump, which has a high capability in removing a compound including a hydrogen atom such as water ($H_2O$) (preferably a compound containing a carbon atom) and the like, the concentration of an impurity to be contained in an oxide semiconductor film formed in the deposition chamber can be reduced.

When the oxide semiconductor film as the oxide semiconductor film 110 is formed by a sputtering method, the relative density (filling factor) of a metal oxide target that is used for the film formation is greater than or equal to 90% and less than or equal to 100%, preferably greater than or equal to 95% and less than or equal to 100%. With the use of the metal oxide target having high relative density, a dense oxide semiconductor film can be formed.

Note that to reduce the impurity concentration of the oxide semiconductor film, it is also effective to form the oxide semiconductor film as the oxide semiconductor film 110 while the substrate 102 is kept at high temperature. The heating temperature of the substrate 102 may be higher than or equal to 150° C. and lower than or equal to 450° C., and preferably the substrate temperature is higher than or equal to 200° C. and lower than or equal to 350° C.

Next, first heat treatment is preferably performed. The first heat treatment may be performed at a temperature higher than or equal to 250° C. and lower than or equal to 650° C., preferably higher than or equal to 300° C. and lower than or equal to 500° C., in an inert gas atmosphere, an atmosphere containing an oxidizing gas at 10 ppm or more, or a reduced pressure state. Alternatively, the First heat treatment may be performed in such a manner that heat treatment is performed in an inert gas atmosphere, and then another heat treatment is performed in an atmosphere containing an oxidizing gas at 10 ppm or more, in order to compensate for desorbed oxygen. By the first heat treatment, the crystallinity of the oxide semiconductor that is used as the oxide semiconductor film 110 can be improved, and in addition, impurities such as hydrogen and water can be removed from the first insulating film 108 and the oxide semiconductor film 110. The first heat treatment may be performed before the oxide semiconductor film 110 is processed into an island shape.

An oxide semiconductor film with low carrier density is preferably used as the oxide semiconductor film 110. For example, the carrier density of the oxide semiconductor film 110 is lower than or equal to $1\times10^{17}/cm^3$, preferably lower than or equal to $1\times10^{15}/cm^3$, further preferably lower than or equal to $1\times10^{13}/cm^3$, particularly preferably lower than or equal to $8\times10^{11}/cm^3$, still further preferably lower than or equal to $1\times10^{11}/cm^3$, yet further preferably lower than or equal to $1\times10^{10}/cm^3$, and is higher than or equal to $1\times10^{-9}/cm^3$.

In addition, as the oxide semiconductor film 110, a CAAC-OS described later is preferably used.

<<First Electrode and Second Electrode>>

The first electrode 112a and the second electrode 112b can be formed using a conductive film 112 having a single-layer structure or a stacked-layer structure with any of metals such as aluminum titanium, chromium, nickel, copper, yttrium, zirconium, molybdenum, silver, tantalum, and tungsten, or an alloy containing any of these metals as its main component. In particular, one or more elements selected from aluminum, chromium, copper, tantalum, titanium, molybdenum, and tungsten are preferably included. For example, a two-layer structure in which a titanium film is stacked over an aluminum film, a two-layer structure in which a titanium film is stacked over a tungsten film, a two layer structure in which a copper film is formed over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. The conductive film can be formed by a sputtering method, for example.

<<Insulating Film 120>>

An example in which the second insulating film 120 has a three-layer structure of the insulating films 114, 116, and 118 is illustrated. Note that the structure of the second insulating film 120 is not limited thereto, and for example, the second insulating film 120 may have a single-layer structure or a stacked-layer structure including two layers or four or more layers.

For the insulating films 114 and 116, an inorganic insulating material containing oxygen can be used in order to improve the characteristics of the interface with the oxide semiconductor used for the oxide semiconductor film 110. As examples of the inorganic insulating material containing oxygen, a silicon oxide film, a silicon oxynitride film, and the like can be given. The insulating films 114 and 116 can be formed by a PE-CVD method, for example.

The thickness of the insulating film 114 can be greater than or equal to 5 nm and less than or equal to 150 nm, preferably greater than or equal to 5 nm and less than or equal to 50 nm, more preferably greater than or equal to 10 nm and less than or equal to 30 nm. The thickness of the insulating film 116 can be greater than or equal to 30 nm and less than or equal to 500 nm, preferably greater than or equal to 150 nm and less than or equal to 400 nm.

Furthermore, the insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present intention is not limited to this. For example, a single-layer structure of the insulating film 114, a single-layer structure of the insulating film 116, or a stacked-layer structure including three or more layers may be used.

The insulating film 118 is a film formed using a material that can prevent an external impurity, such as water, alkali metal, or alkaline earth metal, from diffusing into the oxide semiconductor film 110, and that further contains hydrogen.

For example, a silicon nitride film, a silicon nitride oxide film, or the like having a thickness of greater than or equal to 150 nm and less than or equal to 400 nm can be used as the insulating film 118. In this embodiment, a 150-nm-thick silicon nitride film is used as the insulating film 118.

The silicon nitride film is preferably formed at a high temperature to have an unproved blocking property against impurities or the like; for example, the silicon nitride film is preferably formed at a temperature in the range from the substrate temperature of 100° C. to the strain point of the substrate, more preferably at a temperature in the range from 300° C. to 400° C. When the silicon nitride film is formed at a high temperature, a phenomenon in which oxygen is released from the oxide semiconductor used fix the oxide semiconductor film 110 and the carrier concentration is increased is caused in some cases; therefore, the upper limit of the temperature is a temperature at which the phenomenon is not caused.

<<Conductive Film 122a and Gate Electrode 122c>>

For the conductive film used as the conductive film 122a and the gate electrode 122c, an oxide containing indium may be used. For example, a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added can be used. The conductive film that can be used as the conductive films 122a and 122b can be formed by a sputtering method, for example.

Note that the structures, methods, and the like described in this embodiment can be used as appropriate in combination with any of the structures, methods, and the like described in the other embodiments.

Embodiment 8

In this embodiment, a structure of an oxide semiconductor film which can be used for an oxide semiconductor transistor (OS transistor) described in Embodiment 7 is described.

In this specification, the term "parallel" indicates that the angle formed between two straight lines is greater than or equal to −10° and less than or equal to 10°, and accordingly also includes the case where the angle is greater than or equal to −5° and less than or equal to 5°. The term "substantially parallel" indicates that the angle formed between two straight lines is greater than or equal to −30° and less than or equal to 30°. The term "perpendicular" indicates that the angle formed between two straight lines is greater than or equal to 80° and less than or equal to 100°, and accordingly includes the case where the angle is greater than or equal to 85° and less than or equal to 95°. The term "substantially perpendicular" indicates that the angle formed between two straight lines is greater than or equal to 60° and less than or equal to 120°.

In this specification, trigonal and rhombohedral crystal systems are included in a hexagonal crystal system.

An oxide semiconductor film is classified into a non-single-crystal oxide semiconductor film and a single crystal oxide semiconductor film. Alternatively, an oxide semiconductor is classified into, for example, a crystalline oxide semiconductor and an amorphous oxide semiconductor.

Examples of a non-single-crystal oxide semiconductor include a c-axis aligned crystalline oxide semiconductor (CAAC-OS), a polycrystalline oxide semiconductor, a microcrystalline oxide semiconductor, and an amorphous oxide semiconductor. In addition, examples of a crystalline oxide semiconductor include a single crystal oxide semiconductor, a CAAC-OS, polycrystalline oxide semiconductor, and a microcrystalline oxide semiconductor.

First, CAAC-OS film is described.

The CAAC-OS film is one of oxide semiconductor films having a plurality of c-axis aligned crystal parts.

With a transmission electron microscope (TEM), a combined analysis image (also referred to as a high-resolution TEM image) of a bright-field image and a diffraction pattern of the CAAC-OS film is observed. Consequently, a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor having low impurity concentration. The impurity is an element other than the main components the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancy in the oxide semiconductor film serves as a carrier trap or serves as a carrier generation source when hydrogen is captured therein.

The state in which impurity concentration is low and density of defect states is low (the amount of oxygen vacancy is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has a low density of defect states, and thus has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Next, a microcrystalline oxide semiconductor film is described.

A microcrystalline oxide semiconductor film has a region where a crystal part is observed in a high resolution TEM image and a region where a crystal part is not clearly observed in a high resolution TEM image. In most cases, a crystal part in the microcrystalline oxide semiconductor is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as an nc-OS (nanocrystalline oxide semiconductor) film. In a high resolution TEM image of the nc-OS film, a grain boundary cannot be found clearly in the nc-OS film sometimes for example.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. Note that there is no regularity of crystal orientation between different crystal parts in the nc-OS film. Thus, the orientation of the whole film is not observed. Accordingly in some cases; the nc-OS film cannot be distinguished from an amorphous oxide semiconductor film depending on an analysis method. For example, when the nc-OS film is subjected to structural analysis by an out-of-plane method with an XRD apparatus using an X-ray having a diameter larger than that of a crystal part, a peak which shows a crystal plane does not appear. Further, a diffraction pattern like a halo pattern appears in a selected-area electron diffraction pattern of the nc-OS film which is obtained by using an electron beam having a probe diameter (e.g., larger than or equal to 50 nm) larger than the diameter or a crystal part. Meanwhile, spots are shown in a nanobeam electron diffraction pattern of the nc-OS film obtained by using an electron beam having a probe diameter close to, or smaller than the diameter of a crystal part. Further, in a nanobeam electron diffraction pattern of the nc-OS film, regions with high luminance in a circular (ring) pattern are shown in some cases. Also in a nanobeam electron diffraction pattern of the nc-OS film, a plurality of spots is shown like region in some cases.

The nc-OS film is an oxide semiconductor film that has high regularity as compared to an amorphous oxide semiconductor film. Therefore, the nc-OS film has a lower density of defect states than an amorphous oxide semiconductor film. Note that there is no regularity of crystal orientation between different crystal parts in the nc-OS film. Thus, the nc-OS film has a higher density of defect states than the CAAC-OS film.

Next, an amorphous oxide semiconductor film is described.

The amorphous oxide semiconductor film has disordered atomic arrangement and no crystal part. For example, the amorphous oxide semiconductor film does not have a specific state as in quartz.

In the high-resolution TEM image of the amorphous oxide semiconductor film, crystal parts cannot be found.

When the amorphous oxide semiconductor film is subjected to structural analysis by an out-of-plane method with an XRD apparatus, a peak which shows a crystal plane does not appear. A halo pattern is shown in an electron diffraction pattern of the amorphous oxide semiconductor film. Further, a halo pattern is shown but a spot is not shown in a nanobeam electron diffraction pattern of the amorphous oxide semiconductor film.

Note that an oxide semiconductor film may have a structure having physical properties between the nc-OS film and the amorphous oxide semiconductor film. The oxide semiconductor film having such a structure is specifically referred to as an amorphous-like oxide semiconductor (a-like OS) film.

In a high-resolution TEM image of the a-like OS film, a void may be seen. Furthermore, in the high-resolution TEM image, there are a region where a crystal part is clearly observed and a region where a crystal part is not observed. In the a-like OS film, crystallization occurs by a slight amount of electron beam used for TEM observation and growth of the crystal part is found in some cases. In contrast crystallization by a slight amount of electron beam used for TEM observation is less observed in the nc-OS film having good quality.

Note that the crystal part size in the a-like OS film and the nc-OS film can be measured using high-resolution TEM images. For example, an InGaZnO$_4$ crystal has a layered structure in which two Ga—Zn—O layers are included between In—O layers. A unit cell of the InGaZnO$_4$ crystal has a structure in which nine layers of three In—O layers and six Ga—Zn—O layers are layered in the c-axis direction. Accordingly, the spacing between these adjacent layers is equivalent to the lattice spacing on the (009) plane (also referred to as d value). The value is calculated to 0.29 nm from crystal structure analysis. Thus, focusing on lattice fringes in the high-resolution TEM image, each of lattice fringes in which the lattice spacing therebetween is greater than or equal to 0.28 nm and less than or equal to 0.30 nm corresponds to the a-b plane of the InGaZnO$_4$ crystal.

The density of an oxide semiconductor film might vary depending on its structure. For example, if the composition of an oxide semiconductor film is determined, the structure of the oxide semiconductor film can be estimated from a comparison between the density of the oxide semiconductor film and the density of a single crystal oxide semiconductor film having the same composition as the oxide semiconductor film. For example, the density of the a-like OS film is higher than or equal to 78.6% and lower than 92.3% of the density of the single crystal oxide semiconductor having the same composition. For example, the density of each of the nc-OS film and the CAAC-OS film is higher than or equal to 92.3% and lower than 100% of the density of the single crystal oxide semiconductor having the same composition. Note that it is difficult to deposit an oxide semiconductor film whose density is lower than 78% of the density of the single crystal oxide semiconductor film.

Specific examples of the above description are given. For example, in the case of an oxide semiconductor film with an atomic ratio of In:Ga:Zn=1:1:1, the density of single-crystal InGaZnO$_4$ with a rhombohedral crystal structure is 6.357 g/cm$^3$. Thus, for example, in the case of the oxide semiconductor film with an atomic ratio of In:Ga:Zn=1:1:1, the density of an a-like OS film is higher than or equal to 5.0 g/cm$^3$ and lower than 5.9 g/cm$^3$. In addition, for example, in the case of the oxide semiconductor film with an atomic ratio of In:Ga:Zn=1:1:1, the density of an nc-OS film or a CAAC-OS film is higher than or equal to 5.9 g/cm$^3$ and lower than 6.3 g/cm$^3$.

Note that single crystals with the same composition do not exist in some cases. In such a case, by combining single crystals with different compositions at a given proportion, it is possible to calculate density that corresponds to the density of a single crystal with a desired composition. The density of the single crystal with a desired composition may be calculated using weighted average with respect to the combination ratio of the single crystals with different compositions. Note that it is preferable to combine as few kinds of single crystals as possible for density calculation.

Note that an oxide semiconductor film may be a stacked-layer film including two or more films of an amorphous oxide semiconductor film, an a-like OS film, a microcrystalline oxide semiconductor film, and a CAAC-OS film, for example.

This embodiment can be combined with any of the other embodiments in this specification as appropriate.

EXAMPLE

In this example, a prototype of a foldable organic EL display (foldable OLED display) was fabricated using the transistor and the current detection circuit described in the above embodiments.

Figure 22:
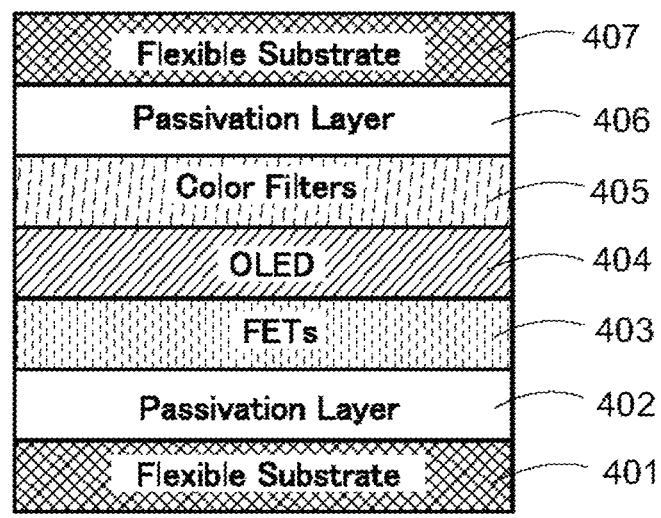
FIG. 22 illustrates a structure of a prototype display device.

FIG. 22 illustrates a display device 400 fabricated in this example. The display device 400 is formed of a stack including a flexible substrate 401, a passivation layer 402, a transistor layer 403, an organic EL layer 404, a color filter layer 405, a protective passivation layer 406, and a flexible substrate 407. While organic EL was employed for the organic EL layer 404. A white EL element had a two-layer tandem structure in which a light-emitting unit formed using a blue fluorescent material and a light-emitting unit formed using green and red phosphorescent materials were connected in series.

The display device 400 was fabricated in such a manner that the transistor layer 403 and the organic EL layer 404 were formed over a glass substrate, and they were separated from the glass substrate and transferred to the flexible substrate 401.

Figure 23:
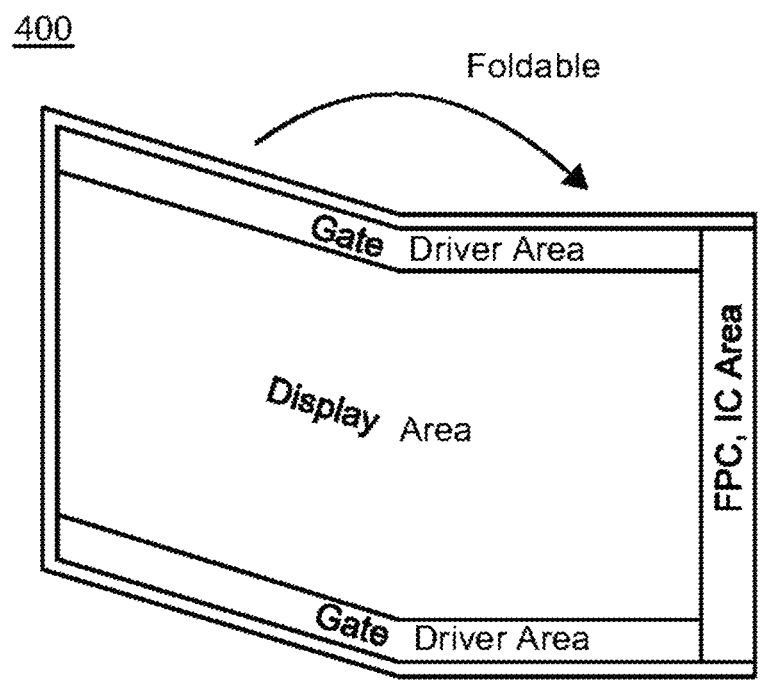
FIG. 23 is a schematic top view of a prototype display device.

FIG. 23 illustrates a schematic top view of the display device 400. The schematic top view of FIG. 23 shows that the display device 400 is foldable.

If an FPC or an IC is provided at a folded portion of the display device, a problem of breakage of the FPC or IC to be peeled off from the display device is caused. As illustrated in FIG. 23, the structure in which gate drivers were provided on both the long sides and an FPC or an IC was provided only on one short side enabled the display device 400 to be folded in a direction parallel to the short side. Such a structure facilitated the design of an appliance and improved the portability and convenience of the appliance.

In an organic EL display, variation in characteristics of transistors influences display. As modes for correcting characteristic variation between driving transistors of pixels, an internal correction mode and an external correction mode are given. The number of transistors in a pixel in an external correction mode is smaller than that in an internal correction mode, and thus, the resolution in an external correction mode is likely to be higher than that in an internal correction mode. Therefore, the display device 400 employed an external correction mode.

Figure 24:
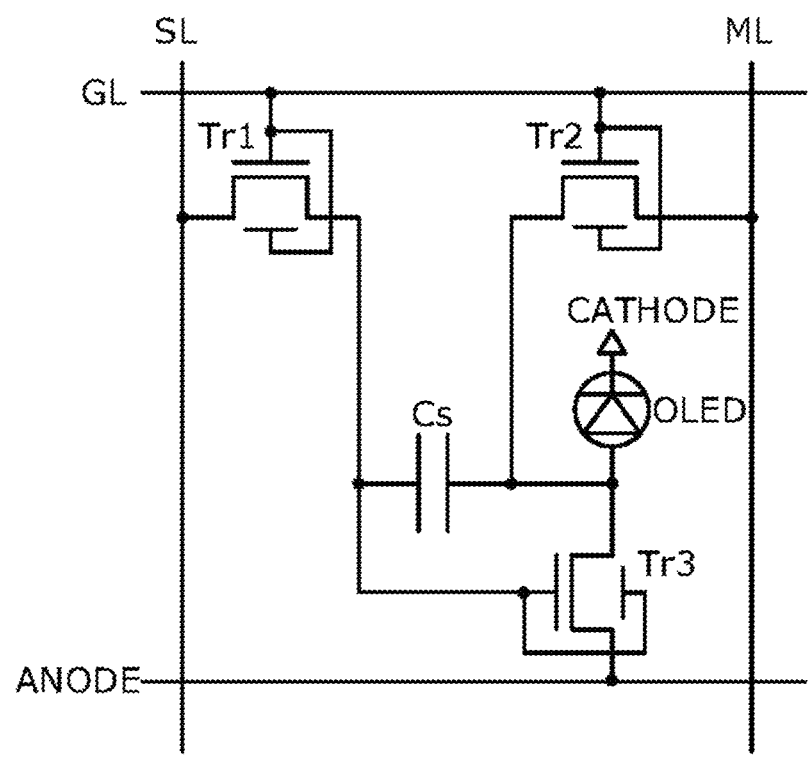
FIG. 24 is a pixel circuit diagram of a prototype display device.

FIG. 24 illustrates a pixel circuit of the display device 400. A pixel 410 in FIG. 24 includes transistors Tr1 to Tr3, a capacitor Cs, a data line SL, a monitor line ML, a power supply line ANODE, a scan line GL, and an OLED.

In the pixel 410, when the potential of the scan line GL is at the H level, data is written in the pixel 410 and a current of the transistor Tr3 flows to the monitor line ML. After that, the potential of the scan line GL is set to the L level, whereby data is held in the capacitor Cs and the current of live transistor Tr3 flows to the OLED.

The pixel 410 and the gate driver were formed using an oxide semiconductor transistor having a back gate illustrated in FIGS. 21A to 21C. An In—Ga—Zn-based oxide was used for the oxide semiconductor transistor. Furthermore, a CAAC-OS described in Embodiment 8 was used as the oxide semiconductor.

One advantage of a transistor having a back gate is improved saturation characteristics of the transistor. In particular, the transistor with a back gate has a small drain induced barrier lowering (DIBL). For example, the channel length modulation coefficient in a transistor without a back gate is approximately 0.05 $V^{-1}$, whereas the channel length modulation coefficient in a transistor with a back gate is approximately 0.009 $V^{-1}$.

Figure 25:
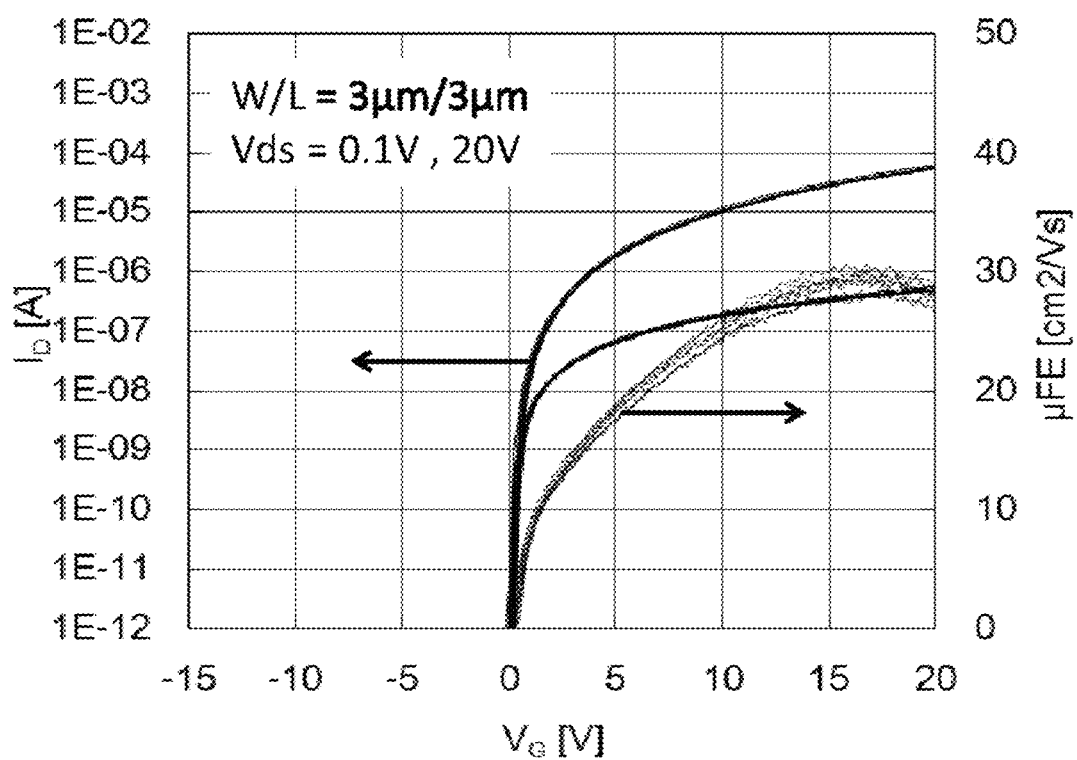
FIG. 25 is a graph showing $V_G$-$I_D$ characteristics of a prototype transistor.

FIG. 25 shows an example of the electrical characteristics (gate voltage-drain current characteristics $V_G$-$I_D$) of an oxide semiconductor transistor used as the transistor Tr3.

FIG. 25 shows transistor characteristics with a channel width of 3.0 μm and a channel length of 3.0 μm. Measurements were performed at drain voltages of 0.1 V and 20 V and a voltage between the back gate and the source of 0 V. The characteristics of 9 transistors are described in FIG. 25. These transistors were arranged over a 3.5th generation mother glass (60 cm×72 cm). FIG. 25 indicates that these transistors were normally off and had little variation, and the field-effect mobility of each transistor is high, i.e., 30 $cm^2$/Vs or higher.

Figure 26:
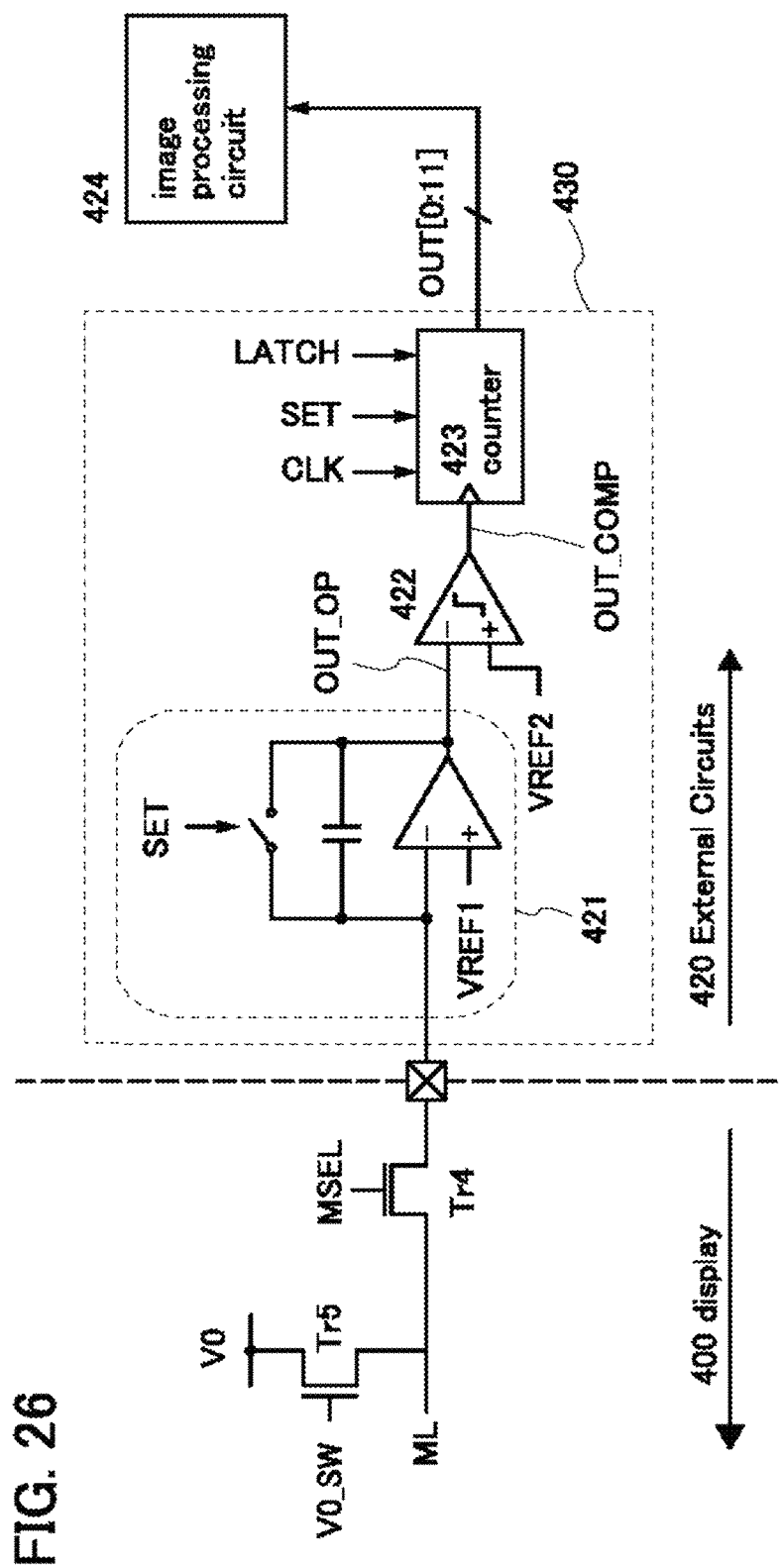
FIG. 26 is a circuit diagram showing an interface portion between a display device and an external correction circuit which were fabricated.

FIG. 26 is a circuit diagram illustrating an interface portion between an external correction circuit 420 and the display device 400 fabricated in this example. The external correction circuit 420 includes a current detection circuit 430 and an image processing circuit 424. The current detection circuit 430 includes an integrator circuit 421, a comparator 422, and a counter 423.

The monitor line ML of the pixel 410 is electrically connected to the external correction circuit 420 through a transistor Tr4. Furthermore, the monitor line ML is electrically connected to a power supply line V0 through a transistor Tr5.

A signal MSEL is supplied to a gate of the transistor Tr4. A signal V0_SW is supplied to a gate of the transistor Tr5. The integrator circuit 421 outputs the signal OUT_OP, the comparator 422 outputs the signal OUT_COMP, and the counter 423 outputs a signal OUT. A signal CLK, a signal SET, and a signal LATCH are supplied to the counter 423. Note that in this example, the counter 423 has a function of processing a 12-bit signal.

The current detection circuit 430 corresponds to the current detection circuit 312 in FIG. 2. For details of the integrator circuit 421, the description of the integrator circuit 213 in FIG. 2 may be referred to. For details of the comparator 422, the description of the comparator 209 in FIG. 2 may be referred to. Furthermore, the counter 423 is a combination of the counter 208 and the latch 207 in FIG. 2.

Figure 27:
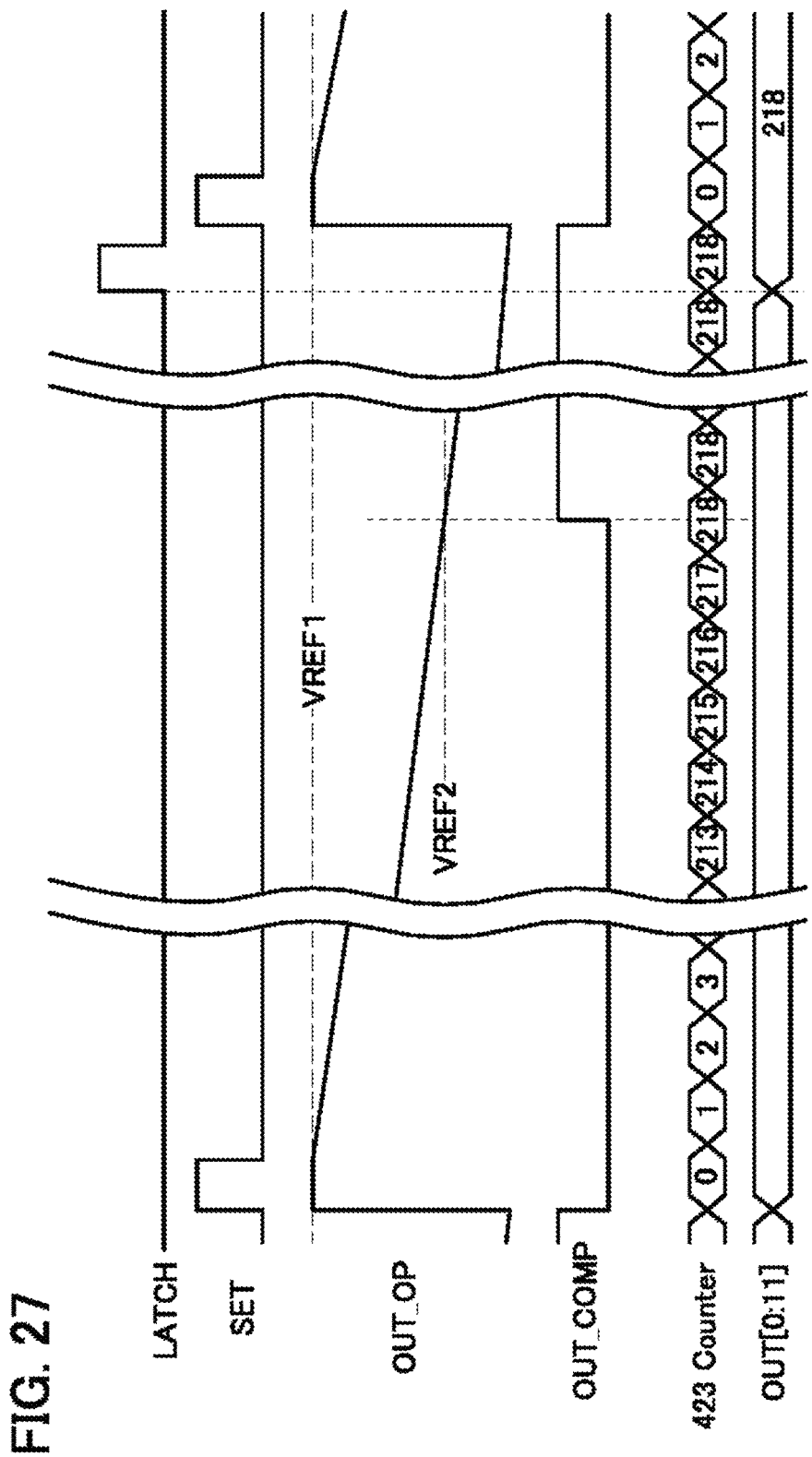
FIG. 27 is a timing chart showing operation of a current detection circuit which was fabricated.

FIG. 27 is a timing chart when the current detection circuit 430 measures a current flowing in the transistor Tr3 The timing chart in FIG. 27 shows the potentials of the signal LATCH, the signal SET, the signal OUT_OP, and the signal OUT_COMP from the above. Furthermore, FIG. 27 shows a counted value of the counter 423 and data included in the signal OUT.

Note that in FIG. 27, an H-level potential is always applied to the scan line GL, an L-level potential is always applied as the signal V0_SW, and an H-level potential is always applied as the signal MSEL. As a result, the current flowing in the transistor Tr3 flows into the external correction circuit 420 through the monitor line ML.

First, the potential of the signal SET becomes at the H level, so that the signal OUT_OP and the counter 423 are reset. After that, the counter 423 begins to count the signals CLK.

Next, when the potential of the signal SET becomes at the L level, the integrator circuit 421 begins to integrate the current of the transistor Tr3, and the voltage of the signal OUT_OP lowers.

When the potential of the signal OUT_OP becomes lower than the potential VREF2, the signal OUT_COMP becomes at the H level and the counting of the counter 423 is stopped.

Then, the counted value (218 in FIG. 27) is output to the image processing circuit by the signal LATCH, and the image processing circuit corrects data on the basis of the counted value.

The specifications of the fabricated display device 400 are shown in Table 2. The fabricated display device 400 was a 13.3-inch 8k4k foldable OLED display. The definition was 664 ppi and the aperture ratio of a pixel was 40.1%.

TABLE 2

| | Specifications |
|---|---|
| Screen Diagonal | 13.3 inches |
| Driving Method | Active Matrix |
| Number of effective pixels | 4320 × RGB × 7680 (8k4k) |
| Pixel Density | 664 ppi |
| Pixel Pitch | 12.75 μm × RGB × 38.25 μm |
| Aperture ratio | 40.10% |
| Pixel Arrangement | RGB Stripe |

TABLE 2-continued

| | Specifications |
|---|---|
| Source Driver | COG |
| Scan Driver | Integrated |

Figure 28A:
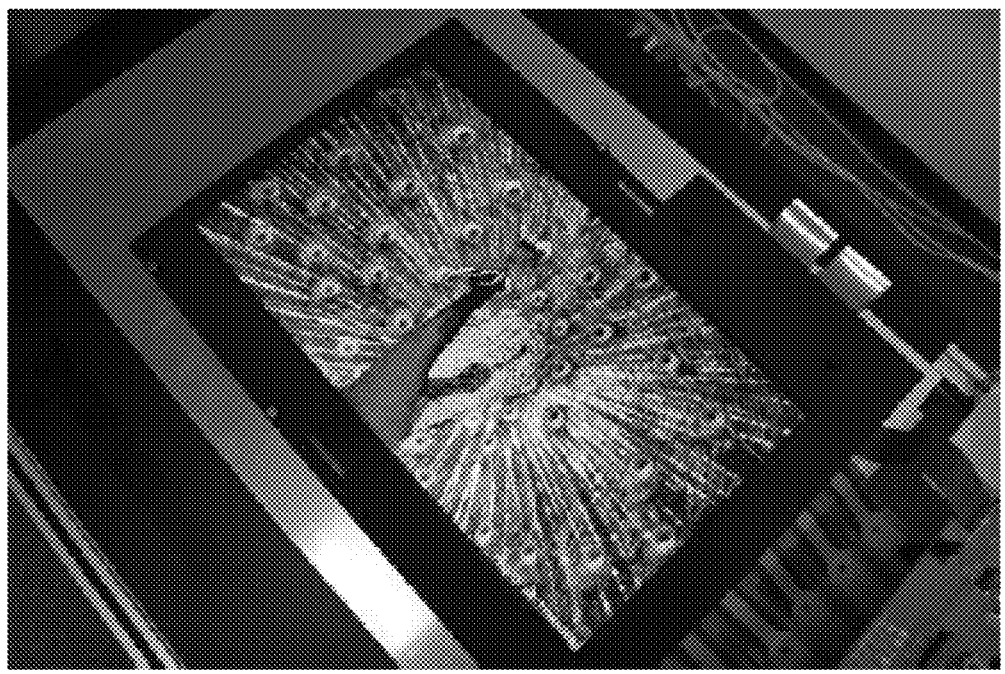
FIGS. 28A and 28B are photographs showing the exterior of a display device which is fabricated.
Figure 28B:
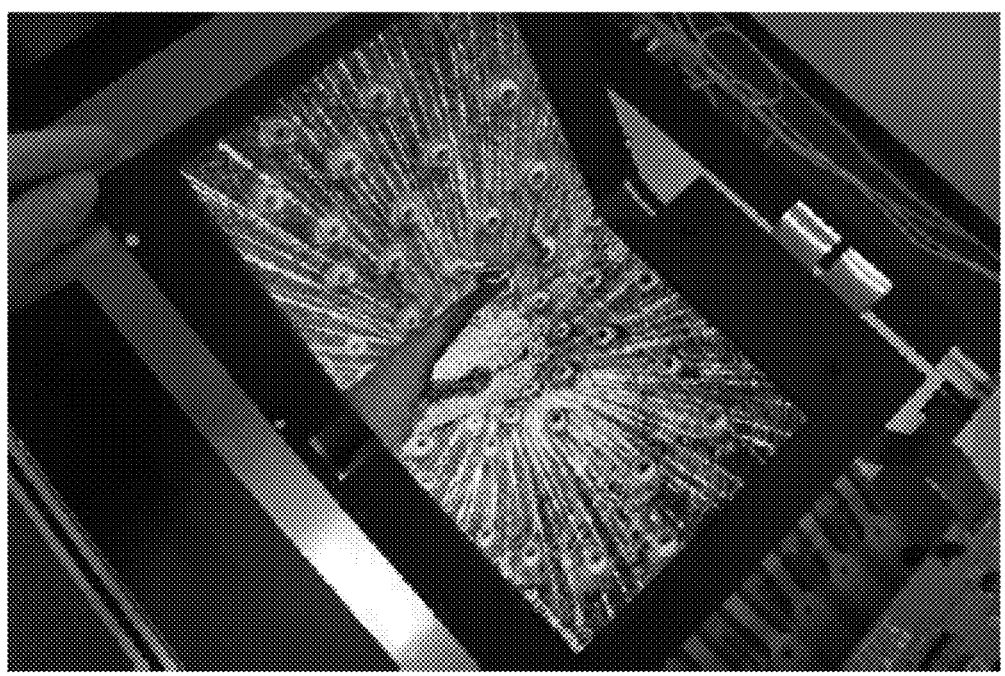

Photographs of the exterior of the display device 400 are shown in FIGS. 28A and 28B. FIG. 28A shows the display device 400 which is not folded. FIG. 28B shows the display device 400 which is folded. FIG. 28B indicates that the display device 400 can display an image even when folded.

The above results reveal that a high resolution display device can be fabricated using the current detection circuit of one embodiment of the present invention.

EXPLANATION OF REFERENCE

C1: sensor element; CLK0: signal; CLK1: signal; CLK2: signal; G1: wiring; M1: transistor; M2: transistor; M3: transistor; M4: transistor; M5: transistor; P1: period; P2: period; P3: period; S0: switch; S1: switch; S2: switch; T1: time; T2: time; T3: time; T4: time; T5: time; Tr1: transistor; Tr3: transistor; Tr4: transistor; Tr5: transistor; V0: power supply line; V1: potential; VREF1: potential; VREF2: potential; 19: sensor circuit; 102: substrate; 104*a*: gate electrode: 106: insulating film; 107: insulating film; 108: insulating film; 110: oxide semiconductor film; 112: conductive film; 112*a*: electrode; 112*b*: electrode; 114 insulating film; 116: insulating film; 118: insulating film; 120: insulating film; 122*a*: conductive film; 122*b*: conductive film; 122*c*: gate electrode; 142*a*: opening; 142*e*: opening; 151: transistor; 205: clock generator; 206: timing generator; 207: latch; 208: counter; 209: comparator; 210: operational amplifier; 211: capacitor; 212: switch; 213: integrator circuit; 216: integrator circuit; 217: capacitor; 218: switch; 219: switch; 220; switch; 221: switch; 231: AND gate; 232 inverter; 233: inverter; 234: capacitor; 235: capacitor; 236: switch; 237: switch; 238: switch; 239: switch; 240: switch; 241: switch; 242: switch; 243: switch; 244: switch; 245: switch; 246: switch; 247: switch; 248: switch; 300: display device; 301: display device; 302; display portion; 305: driver circuit; 312: current detection circuit; 313: memory; 314: image processing circuit; 315: CPU; 322: current detection circuit; 323; memory; 324: image processing circuit; 325: CPU; 331: input device; 332: input portion; 333: driver circuit; 333*d*: driver circuit; 333*g*: driver circuit; 340: dashed line; 341: dashed line; 342: dashed line; 343: dashed line; 350: current detection circuit; 351: current detection circuit; 400: display device; 401: flexible substrate; 402: passivation layer; 403: transistor laser; 404: organic EL layer; 405: color filter layer; 406; passivation layer; 407: flexible substrate; 410: pixel; 420: external correction circuit; 421: integrator circuit; 422: comparator; 423: counter; 424: image processing circuit; 430: current detection circuit; 500: input/output device; 502: pixel; 502B: sub-pixel; 502G: sub-pixel; 502R: sub-pixel; 502*t*: transistor; 503*c*: capacitor; 503*g*: scan line driver circuit; 503*t*: transistor; 510: base material; 510*a*: barrier film; 510*b*: base material; 510*c*: resin layer; 511: wiring; 519: terminal; 521: insulating film; 528: partition; 550R: light-emitting element; 560: sealant; 580R: light-emitting module; 602: sensor unit; 610: base material; 610*a*: barrier film: 610*b*: base material; 610*c*: resin layer; 650: capacitor; 651: electrode; 652: electrode; 653: insulating layer; 667: window portion; 670: protective layer; 670*p*: antireflective layer; 810: portable information terminal; 815: housing; 816: display panel; 818: hinge; 820: portable information terminal; 822: display portion; 825: non-display portion; 840: portable information terminal; 845: portable information terminal; 854: housing; 855: data; 856: data; 857: data; 858: display portion; 880: portable information terminal; 885: housing; 886: housing; 887: data; 888: display portion; 889: operation button; 7000: display device; 7001: housing; 7002: display portion; 7003: support base; 7100: portable information terminal; 7101: housing; 7102 display portion; 7103: band; 7104: buckle; 7105: operation button; 7106: input/output terminal; 7107: icon; 7201: stage; 7203: operation switch; 7210: lighting device; 7300: touch panel; 7301: housing; 7302: display portion; 7303: operation button; 7304: display portion pull; 7305: control portion; 7400: mobile phone; 7401: housing; 7402: display portion; 7403: operation button; 7404: external connection port; 7405: speaker; 7406: microphone.

This application is based on Japanese Patent Application serial no. 2014-095294 filed with Japan Patent Office on May 2, 2014, and Japanese Patent Application serial no. 2014-242782 filed with Japan Patent Office on Dec. 1, 2014 the entire contents of which are hereby incorporated by reference.

What is claimed is:

1. A display device comprising:
    a display portion comprising a pixel;
    a first gate driver and a second gate driver which are electrically connected to the display portion; and
    an IC chip and a flexible printed circuit which are electrically connected to the display portion,
    wherein the first gate driver is positioned adjacent to a first long side of the display portion,
    wherein the second gate driver is positioned adjacent to a second long side of the display portion,
    wherein the IC chip and the flexible printed circuit are positioned adjacent to a short side of the display portion,
    wherein, when the display device is folded, the display portion, the first gate driver, and the second gate driver are folded while the IC chip is not folded,
    wherein the pixel comprises a first transistor, a second transistor, a third transistor, and a light-emitting element,
    wherein one of a source and a drain of the first transistor is electrically connected to a signal line,
    wherein the other of the source and the drain of the first transistor is electrically connected to a gate of the third transistor,
    wherein one of a source and a drain of the second transistor is electrically connected to one of a source and a drain of the third transistor and the light-emitting element, and
    wherein a gate and a back gate of the first transistor and a gate and a back gate of the second transistor are electrically connected to a gate line.

2. The display device according to claim 1,
    wherein the light-emitting element comprises a first light-emitting unit including a blue fluorescent material and a second light-emitting unit including a green phosphorescent material and a red phosphorescent material.

3. The display device according to claim 1, further comprising an external circuit electrically connected to the third transistor through the second transistor.

4. The display device according to claim 1,
    wherein the display portion comprises:
    a first passivation layer over a first flexible substrate;
    the first transistor, the second transistor, and the third transistor over the first passivation layer;

the light-emitting element over the first transistor, the second transistor, and the third transistor;
a color filter over the light-emitting element;
a second passivation layer over the color filter; and
a second flexible substrate over the second passivation layer.

* * * * *